(12) United States Patent
Ihlenburg et al.

(10) Patent No.: US 11,142,123 B2
(45) Date of Patent: *Oct. 12, 2021

(54) MULTI-CAMERA VEHICULAR VISION SYSTEM

(71) Applicant: MAGNA ELECTRONICS INC., Auburn Hills, MI (US)

(72) Inventors: Joern Ihlenburg, Berlin (DE); Andreas Koppe, Bad Homburg (DE); Achim Gieseke, Gross-Umstadt (DE); Hossam Mahmoud, Aschaffenburg (DE); Horst D. Diessner, Rochester Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,453

(22) Filed: May 4, 2020

(65) Prior Publication Data
US 2020/0262344 A1 Aug. 20, 2020

Related U.S. Application Data

(63) Continuation of application No. 16/125,903, filed on Sep. 10, 2018, now Pat. No. 10,640,040, which is a
(Continued)

(51) Int. Cl.
*B60R 1/00* (2006.01)
*H04N 5/247* (2006.01)
(Continued)

(52) U.S. Cl.
CPC .............. *B60R 1/00* (2013.01); *G02B 3/14* (2013.01); *G06K 9/00805* (2013.01);
(Continued)

(58) Field of Classification Search
CPC ................ B60R 1/00; B60R 2300/806; B60R 2300/802; B60R 2300/303;
(Continued)

(56) References Cited

U.S. PATENT DOCUMENTS 4,443,769 A 4/1984 Aschwanden et al.
4,485,398 A 11/1984 Chapin, Jr. et al.
(Continued)

FOREIGN PATENT DOCUMENTS

CN 101082489 A 12/2007
DE 10036875 A1 2/2002
(Continued)

OTHER PUBLICATIONS

Achler et al., "Vehicle Wheel Detector using 2D Filter Banks," IEEE Intelligent Vehicles Symposium of Jun. 2004.
(Continued)

*Primary Examiner* — Zaihan Jiang
(74) *Attorney, Agent, or Firm* — Honigman LLP

(57) ABSTRACT

A vehicular vision system includes forward viewing camera and a rear camera each having a respective field of view exterior of the vehicle. Each of the cameras has an LVDS chip and connects with a control via a respective mono coaxial cable. Each mono coaxial cable carries via LVDS image data captured by the respective camera. Image data captured by the forward viewing camera and carried to the control by the respective mono coaxial cable is processed at the control for object detection. The control generates an output provided to a video display device of the vehicle, the video display device having a video display screen viewable by a driver of the vehicle. The video display screen displays video images of an area rearward of the vehicle derived from image data captured by the rear camera and carried to the control by the respective mono coaxial cable.

24 Claims, 70 Drawing Sheets

Related U.S. Application Data continuation of application No. 14/359,341, filed as application No. PCT/US2012/066571 on Nov. 27, 2012, now Pat. No. 10,071,687, and a continuation-in-part of application No. PCT/US2012/066570, filed on Nov. 27, 2012.

(60) Provisional application No. 61/650,667, filed on May 23, 2012, provisional application No. 61/605,409, filed on Mar. 1, 2012, provisional application No. 61/579,682, filed on Dec. 23, 2011, provisional application No. 61/565,713, filed on Dec. 1, 2011, provisional application No. 61/563,965, filed on Nov. 28, 2011.

(51) Int. Cl.
*H04N 7/18* (2006.01)
*G06K 9/00* (2006.01)
*G06T 7/246* (2017.01)
*G02B 3/14* (2006.01)

(52) U.S. Cl.
CPC ............. *G06T 7/246* (2017.01); *H04N 5/247* (2013.01); *H04N 7/18* (2013.01); *B60R 2300/105* (2013.01); *B60R 2300/303* (2013.01); *B60R 2300/802* (2013.01); *B60R 2300/806* (2013.01); *B60R 2300/8066* (2013.01); *B60R 2300/8093* (2013.01); *G06T 2207/10016* (2013.01); *G06T 2207/30252* (2013.01)

(58) Field of Classification Search
CPC ...... B60R 2300/8066; B60R 2300/105; G06T 7/246; G06T 2207/30252; G06T 2207/10016; H04N 5/247; H04N 7/18; G06K 9/00805; G02B 3/14
See application file for complete search history.

(56) References Cited

U.S. PATENT DOCUMENTS

| | | |
|---|---|---|
| 4,720,790 A | 1/1988 | Miki et al. |
| 4,967,319 A | 10/1990 | Seko |
| 4,970,653 A | 11/1990 | Kenue |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,086,253 A | 2/1992 | Lawler |
| 5,096,287 A | 3/1992 | Kakinami et al. |
| 5,097,362 A | 3/1992 | Lynas |
| 5,121,200 A | 6/1992 | Choi |
| 5,124,549 A | 6/1992 | Michaels et al. |
| 5,130,709 A | 7/1992 | Toyama et al. |
| 5,168,378 A | 12/1992 | Black |
| 5,170,374 A | 12/1992 | Shimohigashi et al. |
| 5,172,235 A | 12/1992 | Wilm et al. |
| 5,177,606 A | 1/1993 | Koshizawa |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield et al. |
| 5,204,778 A | 4/1993 | Bechtel |
| 5,208,701 A | 5/1993 | Maeda |
| 5,208,750 A | 5/1993 | Kurami et al. |
| 5,214,408 A | 5/1993 | Asayama |
| 5,243,524 A | 9/1993 | Ishida et al. |
| 5,245,422 A | 9/1993 | Borcherts et al. |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,408,346 A | 4/1995 | Trissel et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,144 A | 7/1996 | Kise |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Feder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Feder |

(56) References Cited

U.S. PATENT DOCUMENTS

| | | | |
|---|---|---|---|
| 5,666,028 | A | 9/1997 | Bechtel et al. |
| 5,670,935 | A | 9/1997 | Schofield et al. |
| 5,677,851 | A | 10/1997 | Kingdon et al. |
| 5,699,044 | A | 12/1997 | Van Lente et al. |
| 5,724,316 | A | 3/1998 | Brunts |
| 5,732,379 | A | 3/1998 | Eckert et al. |
| 5,737,226 | A | 4/1998 | Olson et al. |
| 5,757,949 | A | 5/1998 | Kinoshita et al. |
| 5,760,826 | A | 6/1998 | Nayar |
| 5,760,828 | A | 6/1998 | Cortes |
| 5,760,931 | A | 6/1998 | Saburi et al. |
| 5,760,962 | A | 6/1998 | Schofield et al. |
| 5,761,094 | A | 6/1998 | Olson et al. |
| 5,765,116 | A | 6/1998 | Wilson-Jones et al. |
| 5,765,118 | A | 6/1998 | Fukatani |
| 5,781,437 | A | 7/1998 | Wiemer et al. |
| 5,786,772 | A | 7/1998 | Schofield et al. |
| 5,790,403 | A | 8/1998 | Nakayama |
| 5,790,973 | A | 8/1998 | Blaker et al. |
| 5,793,308 | A | 8/1998 | Rosinski et al. |
| 5,793,420 | A | 8/1998 | Schmidt |
| 5,796,094 | A | 8/1998 | Schofield et al. |
| 5,835,255 | A | 11/1998 | Miles |
| 5,837,994 | A | 11/1998 | Stam et al. |
| 5,844,505 | A | 12/1998 | Van Ryzin |
| 5,844,682 | A | 12/1998 | Kiyomoto et al. |
| 5,845,000 | A | 12/1998 | Breed et al. |
| 5,848,802 | A | 12/1998 | Breed et al. |
| 5,850,176 | A | 12/1998 | Kinoshita et al. |
| 5,850,254 | A | 12/1998 | Takano et al. |
| 5,867,591 | A | 2/1999 | Onda |
| 5,877,707 | A | 3/1999 | Kowalick |
| 5,877,897 | A | 3/1999 | Schofield et al. |
| 5,878,357 | A | 3/1999 | Sivashankar et al. |
| 5,878,370 | A | 3/1999 | Olson |
| 5,883,739 | A | 3/1999 | Ashihara et al. |
| 5,884,212 | A | 3/1999 | Lion |
| 5,890,021 | A | 3/1999 | Onoda |
| 5,896,085 | A | 4/1999 | Mori et al. |
| 5,899,956 | A | 5/1999 | Chan |
| 5,915,800 | A | 6/1999 | Hiwatashi et al. |
| 5,920,367 | A | 7/1999 | Kajimoto et al. |
| 5,923,027 | A | 7/1999 | Stam et al. |
| 5,924,212 | A | 7/1999 | Domanski |
| 5,929,786 | A | 7/1999 | Schofield et al. |
| 5,949,331 | A | 9/1999 | Schofield et al. |
| 5,956,181 | A | 9/1999 | Lin |
| 5,959,555 | A | 9/1999 | Furuta |
| 5,963,247 | A | 10/1999 | Banitt |
| 5,986,796 | A | 11/1999 | Miles |
| 5,990,469 | A | 11/1999 | Bechtel et al. |
| 5,990,649 | A | 11/1999 | Nagao et al. |
| 6,020,704 | A | 2/2000 | Buschur |
| 6,049,171 | A | 4/2000 | Stam et al. |
| 6,052,124 | A | 4/2000 | Stein et al. |
| 6,066,933 | A | 5/2000 | Ponziana |
| 6,084,519 | A | 7/2000 | Coulling et al. |
| 6,091,833 | A | 7/2000 | Yasui et al. |
| 6,097,024 | A | 8/2000 | Stam et al. |
| 6,100,799 | A | 8/2000 | Fenk |
| 6,100,811 | A | 8/2000 | Hsu et al. |
| 6,115,159 | A | 9/2000 | Baker |
| 6,144,022 | A | 11/2000 | Tenenbaum et al. |
| 6,175,300 | B1 | 1/2001 | Kendrick |
| 6,178,034 | B1 | 1/2001 | Allemand et al. |
| 6,198,409 | B1 | 3/2001 | Schofield et al. |
| 6,201,642 | B1 | 3/2001 | Bos |
| 6,223,114 | B1 | 4/2001 | Boros et al. |
| 6,226,061 | B1 | 5/2001 | Fagusa |
| 6,227,689 | B1 | 5/2001 | Miller |
| 6,250,148 | B1 | 6/2001 | Lynam |
| 6,259,423 | B1 | 7/2001 | Tokito et al. |
| 6,266,082 | B1 | 7/2001 | Yonezawa et al. |
| 6,266,442 | B1 | 7/2001 | Laumeyer et al. |
| 6,285,393 | B1 | 9/2001 | Shimoura et al. |
| 6,285,778 | B1 | 9/2001 | Nakajima et al. |
| 6,294,989 | B1 | 9/2001 | Schofield et al. |
| 6,297,781 | B1 | 10/2001 | Turnbull et al. |
| 6,302,545 | B1 | 10/2001 | Schofield et al. |
| 6,310,611 | B1 | 10/2001 | Caldwell |
| 6,313,454 | B1 | 11/2001 | Bos et al. |
| 6,317,057 | B1 | 11/2001 | Lee |
| 6,320,282 | B1 | 11/2001 | Caldwell |
| 6,333,759 | B1 | 12/2001 | Mazzilli |
| 6,341,523 | B2 | 1/2002 | Lynam |
| 6,353,392 | B1 | 3/2002 | Schofield et al. |
| 6,370,329 | B1 | 4/2002 | Teuchert |
| 6,392,315 | B1 | 5/2002 | Jones et al. |
| 6,396,397 | B1 | 5/2002 | Bos et al. |
| 6,411,204 | B1 | 6/2002 | Bloomfield et al. |
| 6,420,975 | B1* | 7/2002 | DeLine ............... H04M 1/6075 340/815.4 |
| 6,424,273 | B1 | 7/2002 | Gutta et al. |
| 6,430,303 | B1 | 8/2002 | Naoi et al. |
| 6,442,465 | B2 | 8/2002 | Breed et al. |
| 6,477,326 | B1* | 11/2002 | Partynski ............ G02B 17/0852 396/7 |
| 6,477,464 | B2 | 11/2002 | McCarthy et al. |
| 6,497,503 | B1 | 12/2002 | Dassanayake et al. |
| 6,498,620 | B2 | 12/2002 | Schofield et al. |
| 6,516,664 | B2 | 2/2003 | Lynam |
| 6,523,964 | B2 | 2/2003 | Schofield et al. |
| 6,534,884 | B2 | 3/2003 | Marcus et al. |
| 6,539,306 | B2 | 3/2003 | Turnbull |
| 6,547,133 | B1 | 4/2003 | Devries, Jr. et al. |
| 6,553,130 | B1 | 4/2003 | Lemelson et al. |
| 6,559,435 | B2 | 5/2003 | Schofield et al. |
| 6,570,998 | B1 | 5/2003 | Ohtsuka et al. |
| 6,574,033 | B1 | 6/2003 | Chui et al. |
| 6,578,017 | B1 | 6/2003 | Ebersole et al. |
| 6,587,573 | B1 | 7/2003 | Stam et al. |
| 6,589,625 | B1 | 7/2003 | Kothari et al. |
| 6,593,011 | B2 | 7/2003 | Liu et al. |
| 6,593,698 | B2 | 7/2003 | Stam et al. |
| 6,594,583 | B2 | 7/2003 | Ogura et al. |
| 6,605,775 | B1 | 8/2003 | Seeber et al. |
| 6,611,202 | B2 | 8/2003 | Schofield et al. |
| 6,611,610 | B1 | 8/2003 | Stam et al. |
| 6,627,918 | B2 | 9/2003 | Getz et al. |
| 6,631,316 | B2 | 10/2003 | Stam et al. |
| 6,631,994 | B2 | 10/2003 | Suzuki et al. |
| 6,636,258 | B2 | 10/2003 | Strumolo |
| 6,648,477 | B2 | 11/2003 | Hutzel et al. |
| 6,650,455 | B2 | 11/2003 | Miles |
| 6,672,731 | B2 | 1/2004 | Schnell et al. |
| 6,674,562 | B1 | 1/2004 | Miles |
| 6,678,056 | B2 | 1/2004 | Downs |
| 6,678,614 | B2 | 1/2004 | McCarthy et al. |
| 6,680,792 | B2 | 1/2004 | Miles |
| 6,690,268 | B2 | 2/2004 | Schofield et al. |
| 6,700,605 | B1 | 3/2004 | Toyoda et al. |
| 6,703,925 | B2 | 3/2004 | Steffel |
| 6,704,621 | B1 | 3/2004 | Stein et al. |
| 6,710,908 | B2 | 3/2004 | Miles et al. |
| 6,711,474 | B1 | 3/2004 | Treyz et al. |
| 6,714,331 | B2 | 3/2004 | Lewis et al. |
| 6,717,610 | B1 | 4/2004 | Bos et al. |
| 6,735,506 | B2 | 5/2004 | Breed et al. |
| 6,741,377 | B2 | 5/2004 | Miles |
| 6,744,353 | B2 | 6/2004 | Sjonell |
| 6,757,109 | B2 | 6/2004 | Bos |
| 6,762,867 | B2 | 7/2004 | Lippert et al. |
| 6,794,119 | B2 | 9/2004 | Miles |
| 6,795,221 | B1 | 9/2004 | Urey |
| 6,802,617 | B2 | 10/2004 | Schofield et al. |
| 6,806,452 | B2 | 10/2004 | Bos et al. |
| 6,807,287 | B1 | 10/2004 | Hermans |
| 6,819,231 | B2 | 11/2004 | Berberich et al. |
| 6,822,563 | B2 | 11/2004 | Bos et al. |
| 6,823,241 | B2 | 11/2004 | Shirato et al. |
| 6,824,281 | B2 | 11/2004 | Schofield et al. |
| 6,850,156 | B2 | 2/2005 | Bloomfield et al. |
| 6,864,930 | B2 | 3/2005 | Matsushita et al. |
| 6,882,287 | B2 | 4/2005 | Schofield |

(56) References Cited

U.S. PATENT DOCUMENTS

| | | |
|---|---|---|
| 6,889,161 B2 | 5/2005 | Winner et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisei et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,113,867 B1 | 9/2006 | Stein |
| 7,116,246 B2 | 10/2006 | Winter et al. |
| 7,123,168 B2 | 10/2006 | Schofield |
| 7,133,661 B2 | 11/2006 | Hatae et al. |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,151,996 B2 | 12/2006 | Stein |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,227,611 B2 | 6/2007 | Hull et al. |
| 7,230,640 B2 | 6/2007 | Regensburger et al. |
| 7,248,283 B2 | 7/2007 | Takagi et al. |
| 7,295,229 B2 | 11/2007 | Kumata et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,336,299 B2 | 2/2008 | Kostrzewski et al. |
| 7,338,177 B2 | 3/2008 | Lynam |
| 7,365,769 B1 | 4/2008 | Mager |
| 7,370,983 B2 | 5/2008 | DeWind et al. |
| 7,375,803 B1 | 5/2008 | Bamji |
| 7,380,948 B2 | 6/2008 | Schofield et al. |
| 7,381,089 B2 | 6/2008 | Hosier, Sr. |
| 7,388,182 B2 | 6/2008 | Schofield et al. |
| 7,402,786 B2 | 7/2008 | Schofield et al. |
| 7,423,821 B2 | 9/2008 | Bechtel et al. |
| 7,460,951 B2 | 12/2008 | Altan |
| 7,480,149 B2 | 1/2009 | DeWard et al. |
| 7,482,916 B2 | 1/2009 | Au et al. |
| 7,490,007 B2 | 2/2009 | Taylor et al. |
| 7,492,281 B2 | 2/2009 | Lynam et al. |
| 7,526,103 B2 | 4/2009 | Schofield et al. |
| 7,532,109 B2 | 5/2009 | Takahama et al. |
| 7,541,743 B2 | 6/2009 | Salmeen et al. |
| 7,561,181 B2 | 7/2009 | Schofield et al. |
| 7,565,006 B2 | 7/2009 | Stam et al. |
| 7,566,851 B2 | 7/2009 | Stein et al. |
| 7,567,291 B2 | 7/2009 | Bechtel et al. |
| 7,576,767 B2 | 8/2009 | Lee et al. |
| 7,581,859 B2 | 9/2009 | Lynam |
| 7,592,928 B2 | 9/2009 | Chinomi et al. |
| 7,605,856 B2 | 10/2009 | Imoto |
| 7,616,781 B2 | 11/2009 | Schofield et al. |
| 7,619,508 B2 | 11/2009 | Lynam et al. |
| 7,633,383 B2 | 12/2009 | Dunsmoir et al. |
| 7,639,149 B2 | 12/2009 | Katoh |
| 7,681,960 B2 | 3/2010 | Wanke et al. |
| 7,711,201 B2 | 5/2010 | Wong et al. |
| 7,720,580 B2 | 5/2010 | Higgins-Luthman |
| 7,724,962 B2 | 5/2010 | Zhu et al. |
| 7,777,611 B2 | 8/2010 | Desai |
| 7,786,898 B2 | 8/2010 | Stein et al. |
| 7,792,329 B2 | 9/2010 | Schofield et al. |
| 7,843,451 B2 | 11/2010 | Lafon |
| 7,855,755 B2 | 12/2010 | Weller et al. |
| 7,855,778 B2 | 12/2010 | Yung et al. |
| 7,881,496 B2 | 2/2011 | Camilleri et al. |
| 7,914,187 B2 | 3/2011 | Higgins-Luthman et al. |
| 7,925,441 B2 * | 4/2011 | Maemura .......... B60T 7/22 |
| | | 701/301 |
| 7,930,160 B1 | 4/2011 | Hosagrahara et al. |
| 7,949,486 B2 | 5/2011 | Denny et al. |
| 7,952,490 B2 | 5/2011 | Fechner et al. |
| 7,965,336 B2 | 6/2011 | Bingle et al. |
| 8,009,868 B2 | 8/2011 | Abe |
| 8,013,780 B2 | 9/2011 | Lynam |
| 8,017,898 B2 | 9/2011 | Lu et al. |
| 8,027,029 B2 | 9/2011 | Lu et al. |
| 8,058,977 B2 | 11/2011 | Lynam |
| 8,064,643 B2 | 11/2011 | Stein et al. |
| 8,072,486 B2 | 12/2011 | Namba et al. |
| 8,082,101 B2 | 12/2011 | Stein et al. |
| 8,090,976 B2 | 1/2012 | Maciver et al. |
| 8,134,596 B2 | 3/2012 | Lei et al. |
| 8,164,628 B2 | 4/2012 | Stein et al. |
| 8,203,440 B2 | 6/2012 | Schofield et al. |
| 8,224,031 B2 | 7/2012 | Saito |
| 8,233,045 B2 | 7/2012 | Luo et al. |
| 8,254,635 B2 | 8/2012 | Stein et al. |
| 8,294,563 B2 | 10/2012 | Shimoda et al. |
| 8,300,886 B2 | 10/2012 | Hoffmann |
| 8,320,628 B2 | 11/2012 | Cheng et al. |
| 8,340,866 B2 | 12/2012 | Hanzawa et al. |
| 8,378,851 B2 | 2/2013 | Stein et al. |
| 8,421,865 B2 | 4/2013 | Euler et al. |
| 8,452,055 B2 | 5/2013 | Stein et al. |
| 8,502,860 B2 | 8/2013 | Demirdjian |
| 8,553,088 B2 | 10/2013 | Stein et al. |
| 8,849,495 B2 | 9/2014 | Chundrik, Jr. et al. |
| 8,908,039 B2 | 12/2014 | De Wind et al. |
| 9,019,090 B2 | 4/2015 | Weller et al. |
| 9,041,806 B2 | 5/2015 | Baur et al. |
| 9,090,234 B2 | 7/2015 | Johnson et al. |
| 9,092,986 B2 | 7/2015 | Salomonsson et al. |
| 9,126,525 B2 | 9/2015 | Lynam et al. |
| 9,146,898 B2 | 9/2015 | Ihlenburg et al. |
| 9,205,776 B2 | 12/2015 | Turk |
| 9,210,307 B2 | 12/2015 | Gebauer et al. |
| 9,900,490 B2 | 2/2018 | Ihlenburg et al. |
| 10,071,687 B2 | 9/2018 | Ihlenburg et al. |
| 10,567,705 B2 | 2/2020 | Ziegenspeck et al. |
| 10,640,040 B2 | 5/2020 | Ihlenburg et al. |
| 2002/0005778 A1 | 1/2002 | Breed et al. |
| 2002/0011611 A1 | 1/2002 | Huang et al. |
| 2002/0015153 A1 | 2/2002 | Downs |
| 2002/0037054 A1 | 3/2002 | Schurig |
| 2002/0044065 A1 | 4/2002 | Quist et al. |
| 2002/0113873 A1 | 8/2002 | Williams |
| 2002/0116106 A1 | 8/2002 | Breed et al. |
| 2002/0149679 A1 | 10/2002 | Deangelis et al. |
| 2002/0167589 A1 | 11/2002 | Schofield et al. |
| 2003/0103141 A1 | 6/2003 | Bechtel et al. |
| 2003/0103142 A1 | 6/2003 | Hitomi et al. |
| 2003/0137586 A1 | 7/2003 | Lewellen |
| 2003/0222982 A1 | 12/2003 | Hamdan et al. |
| 2004/0032321 A1 | 2/2004 | McMahon et al. |
| 2004/0114381 A1 | 6/2004 | Salmeen et al. |
| 2004/0164228 A1 | 8/2004 | Fogg et al. |
| 2005/0078389 A1 | 4/2005 | Kulas et al. |
| 2005/0134983 A1 | 6/2005 | Lynam |
| 2005/0200467 A1 | 9/2005 | Au et al. |
| 2005/0219852 A1 | 10/2005 | Stam et al. |
| 2005/0237385 A1 | 10/2005 | Kosaka et al. |
| 2005/0264891 A1 | 12/2005 | Uken et al. |
| 2006/0017807 A1 | 1/2006 | Lee et al. |
| 2006/0018511 A1 | 1/2006 | Stam et al. |
| 2006/0018512 A1 | 1/2006 | Stam et al. |
| 2006/0023105 A1 | 2/2006 | Kostrzewski et al. |
| 2006/0061008 A1 | 3/2006 | Karner et al. |
| 2006/0072011 A1 | 4/2006 | Okada |
| 2006/0091813 A1 | 5/2006 | Stam et al. |
| 2006/0103727 A1 | 5/2006 | Tseng |
| 2006/0133476 A1 * | 6/2006 | Page .......... G08B 13/1968 |
| | | 375/240.01 |
| 2006/0164221 A1 | 7/2006 | Jensen |

(56) References Cited

U.S. PATENT DOCUMENTS

| | | |
|---|---|---|
| 2006/0184297 A1 | 8/2006 | Higgins-Luthman |
| 2006/0206243 A1 | 9/2006 | Pawlicki et al. |
| 2006/0212624 A1 | 9/2006 | Kim |
| 2006/0232670 A1* | 10/2006 | Chu .................. B60R 1/00 348/118 |
| 2006/0250501 A1 | 11/2006 | Wildmann et al. |
| 2006/0254805 A1 | 11/2006 | Scherer et al. |
| 2006/0255920 A1 | 11/2006 | Maeda et al. |
| 2006/0290479 A1 | 12/2006 | Akatsuka et al. |
| 2007/0024724 A1 | 2/2007 | Stein et al. |
| 2007/0103313 A1 | 5/2007 | Washington |
| 2007/0104476 A1 | 5/2007 | Yasutomi et al. |
| 2007/0206835 A1 | 9/2007 | Abe |
| 2007/0242339 A1 | 10/2007 | Bradley |
| 2007/0257923 A1 | 11/2007 | Whitby-Strevens |
| 2007/0297784 A1 | 12/2007 | Wong et al. |
| 2008/0042812 A1 | 2/2008 | Dunsmoir et al. |
| 2008/0043099 A1 | 2/2008 | Stein et al. |
| 2008/0063129 A1 | 3/2008 | Voutilainen |
| 2008/0147321 A1 | 6/2008 | Howard et al. |
| 2008/0150814 A1 | 6/2008 | Hedou et al. |
| 2008/0166024 A1 | 7/2008 | Iketani |
| 2008/0192132 A1 | 8/2008 | Bechtel et al. |
| 2008/0266396 A1 | 10/2008 | Stein |
| 2009/0024756 A1 | 1/2009 | Spalla et al. |
| 2009/0093938 A1 | 4/2009 | Isaji et al. |
| 2009/0113509 A1 | 4/2009 | Tseng et al. |
| 2009/0160987 A1 | 6/2009 | Bechtel et al. |
| 2009/0171559 A1 | 7/2009 | Lehtiniemi et al. |
| 2009/0174765 A1 | 7/2009 | Namba et al. |
| 2009/0177347 A1 | 7/2009 | Breuer et al. |
| 2009/0190015 A1 | 7/2009 | Bechtel et al. |
| 2009/0243824 A1 | 10/2009 | Peterson et al. |
| 2009/0244361 A1 | 10/2009 | Gebauer et al. |
| 2009/0256938 A1 | 10/2009 | Bechtel et al. |
| 2009/0265069 A1 | 10/2009 | Desbrunes |
| 2009/0273524 A1* | 11/2009 | Furuya .................. H01Q 1/38 343/700 MS |
| 2009/0290032 A1 | 11/2009 | Zhang et al. |
| 2009/0295181 A1 | 12/2009 | Lawlor et al. |
| 2010/0002081 A1 | 1/2010 | Pawlicki et al. |
| 2010/0020170 A1 | 1/2010 | Higgins-Luthman et al. |
| 2010/0045799 A1 | 2/2010 | Lei et al. |
| 2010/0076621 A1 | 3/2010 | Kubotani et al. |
| 2010/0088021 A1* | 4/2010 | Viner .................. G06Q 30/02 701/533 |
| 2010/0097469 A1 | 4/2010 | Blank et al. |
| 2010/0097519 A1 | 4/2010 | Byrne et al. |
| 2010/0110939 A1* | 5/2010 | Fukuda .................. H04L 5/1423 370/276 |
| 2010/0118145 A1 | 5/2010 | Betham et al. |
| 2010/0228437 A1 | 9/2010 | Hanzawa et al. |
| 2010/0231409 A1 | 9/2010 | Okada et al. |
| 2010/0296519 A1 | 11/2010 | Jones |
| 2011/0025489 A1 | 2/2011 | Shimoda et al. |
| 2011/0074916 A1 | 3/2011 | Demirdjian |
| 2011/0103650 A1 | 5/2011 | Cheng et al. |
| 2011/0115615 A1 | 5/2011 | Luo et al. |
| 2011/0141381 A1 | 6/2011 | Minikey, Jr. et al. |
| 2011/0157309 A1 | 6/2011 | Bennett et al. |
| 2011/0193961 A1 | 8/2011 | Peterson |
| 2011/0216201 A1 | 9/2011 | McAndrew et al. |
| 2011/0224978 A1 | 9/2011 | Sawada |
| 2011/0228088 A1* | 9/2011 | Gloger .................. H04N 5/23238 348/148 |
| 2011/0257973 A1 | 10/2011 | Chutorash et al. |
| 2011/0286544 A1 | 11/2011 | Avudainayagam et al. |
| 2012/0044066 A1 | 2/2012 | Mauderer et al. |
| 2012/0045112 A1 | 2/2012 | Lundblad et al. |
| 2012/0050550 A1 | 3/2012 | Oba et al. |
| 2012/0062743 A1 | 3/2012 | Lynam et al. |
| 2012/0069184 A1 | 3/2012 | Hottmann |
| 2012/0069185 A1 | 3/2012 | Stein |
| 2012/0127062 A1* | 5/2012 | Bar-Zeev .................. G06T 19/006 345/6 |
| 2012/0154591 A1 | 6/2012 | Baur et al. |
| 2012/0186447 A1 | 7/2012 | Hodgson et al. |
| 2012/0200707 A1 | 8/2012 | Stein et al. |
| 2012/0218412 A1 | 8/2012 | Dellantoni et al. |
| 2012/0239242 A1* | 9/2012 | Uehara .................. G06F 9/445 701/29.6 |
| 2012/0245817 A1 | 9/2012 | Cooprider et al. |
| 2012/0262340 A1 | 10/2012 | Hassan et al. |
| 2012/0287140 A1 | 11/2012 | Lin et al. |
| 2012/0303222 A1 | 11/2012 | Cooprider et al. |
| 2012/0314071 A1 | 12/2012 | Rosenbaum et al. |
| 2012/0320209 A1 | 12/2012 | Vico et al. |
| 2013/0103259 A1* | 4/2013 | Eng .................. B60G 17/0165 701/37 |
| 2013/0116859 A1 | 5/2013 | Ihlenburg et al. |
| 2013/0124052 A1 | 5/2013 | Hahne |
| 2013/0129150 A1 | 5/2013 | Saito |
| 2013/0131918 A1 | 5/2013 | Hahne |
| 2013/0134964 A1 | 5/2013 | Ahrentorp et al. |
| 2013/0141578 A1 | 6/2013 | Chundrlik, Jr. et al. |
| 2013/0141580 A1 | 6/2013 | Stein et al. |
| 2013/0147957 A1 | 6/2013 | Stein |
| 2013/0169812 A1 | 7/2013 | Lu et al. |
| 2013/0187445 A1 | 7/2013 | Mutzabaugh |
| 2013/0222593 A1 | 8/2013 | Byrne et al. |
| 2013/0242413 A1* | 9/2013 | Baba .................. G02B 13/18 359/753 |
| 2013/0278769 A1 | 10/2013 | Nix et al. |
| 2013/0286193 A1 | 10/2013 | Pflug |
| 2013/0314503 A1 | 11/2013 | Nix et al. |
| 2013/0328672 A1 | 12/2013 | Sesti et al. |
| 2014/0009633 A1 | 1/2014 | Chopra et al. |
| 2014/0043473 A1 | 2/2014 | Gupta et al. |
| 2014/0063254 A1 | 3/2014 | Shi et al. |
| 2014/0067206 A1 | 3/2014 | Pflug |
| 2014/0098229 A1 | 4/2014 | Lu et al. |
| 2014/0152778 A1 | 6/2014 | Ihlenburg et al. |
| 2014/0156157 A1 | 6/2014 | Johnson et al. |
| 2014/0160291 A1 | 6/2014 | Schaffner |
| 2014/0176711 A1 | 6/2014 | Kirchner et al. |
| 2014/0218529 A1 | 8/2014 | Mahmoud et al. |
| 2014/0218531 A1* | 8/2014 | Michiguchi .................. H04N 7/181 348/148 |
| 2014/0218535 A1 | 8/2014 | Ihlenburg et al. |
| 2014/0222280 A1 | 8/2014 | Salomonsson et al. |
| 2014/0247352 A1 | 9/2014 | Rathi et al. |
| 2014/0247354 A1 | 9/2014 | Knudsen |
| 2014/0247355 A1 | 9/2014 | Ihlenburg |
| 2014/0313339 A1 | 10/2014 | Diessner |
| 2014/0320658 A1 | 10/2014 | Pliefke |
| 2014/0333729 A1 | 11/2014 | Pflug |
| 2014/0340510 A1 | 11/2014 | Ihlenburg et al. |
| 2014/0347486 A1 | 11/2014 | Okouneva |
| 2014/0362209 A1 | 12/2014 | Ziegenspeck et al. |
| 2014/0373345 A1 | 12/2014 | Steigerwald |
| 2014/0379233 A1 | 12/2014 | Chundrlik, Jr. et al. |
| 2015/0042807 A1 | 2/2015 | Ihlenburg et al. |
| 2015/0156383 A1 | 6/2015 | Biemer et al. |
| 2015/0222795 A1 | 8/2015 | Sauer et al. |
| 2015/0232030 A1 | 8/2015 | Bongwald |
| 2015/0294169 A1 | 10/2015 | Zhou et al. |
| 2015/0296135 A1 | 10/2015 | Wacquant et al. |

FOREIGN PATENT DOCUMENTS

| | | |
|---|---|---|
| EP | 1115250 A1 | 7/2001 |
| EP | 2247047 A1 | 11/2010 |
| EP | 2377094 A1 | 10/2011 |
| EP | 2667325 A1 | 11/2013 |
| JP | H1168538 A | 7/1989 |
| JP | 200274339 A | 3/2002 |
| WO | 2010110957 A2 | 9/2010 |
| WO | 2010144900 A1 | 12/2010 |
| WO | 2011028686 A1 | 3/2011 |
| WO | 2012139636 A1 | 10/2012 |
| WO | 2012139660 A1 | 10/2012 |

(56) References Cited

FOREIGN PATENT DOCUMENTS

| WO | 2012143036 A1 | 10/2012 |
| WO | 2013043661 A1 | 3/2013 |
| WO | 2013081985 A1 | 6/2013 |

OTHER PUBLICATIONS

Behringer et al., "Simultaneous Estimation of Pitch Angle and Lane Width from the Video Image of a Marked Road," pp. 966-973, Sep. 12-16, 1994.

Broggi et al., "Multi-Resolution Vehicle Detection using Artificial Vision," IEEE Intelligent Vehicles Symposium of Jun. 2004.

Kastrinaki et al., "A survey of video processing techniques for traffic applications".

Philomin et al., "Pedestrain Tracking from a Moving Vehicle".

Sahli et al., "A Kalman Filter-Based Update Scheme for Road Following," IAPR Workshop on Machine Vision Applications, pp. 5-9, Nov. 12-14, 1996.

Sun et al., "On-road vehicle detection using optical sensors: a review", IEEE Conference on Intelligent Transportation Systems, 2004.

Van Leeuwen et al., "Motion Estimation with a Mobile Camera for Traffic Applications", IEEE, US, vol. 1, Oct. 3, 2000, pp. 58-63.

Van Leeuwen et al., "Motion Interpretation for In-Car Vision Systems", IEEE, US, vol. 1, Sep. 30, 2002, p. 135-140.

Van Leeuwen et al., "Real-Time Vehicle Tracking in Image Sequences", IEEE, US, vol. 3, May 21, 2001, pp. 2049-2054, XP010547308.

Van Leeuwen et al., "Requirements for Motion Estimation in Image Sequences for Traffic Applications", IEEE, US, vol. 1, May 24, 1999, pp. 145-150, XP010340272.

International Search Report and Written Opinion dated February 8, 213 for PCT Application No. PCT/US2012/066571.

Foresight CCTV, Inc., "Two Video with Alarm Signals Transmission Set", 2003.

\* cited by examiner

Smart Camera – View Transformation

- View transformations for advanced camera functions
  - Triptych-view for crossing-traffic applications
  - Trailer hitch mode
  - Top-view mode
- Overlays can be superimposed on top of the transformations
- Smooth view transitions will be required Live camera picture
Overlay graphics

Smart Camera – Machine Vision

- Machine vision capabilities are being requested by OEMs
  - Object detection
  - Crossing traffic detection
  - Pedestrian detection
  - Lane detection
  - Trailer angle tracking
- Algorithms should be reusable for to multi camera ECUs
  - Scalable solutions
  - Same IP in multi- and single camera projects

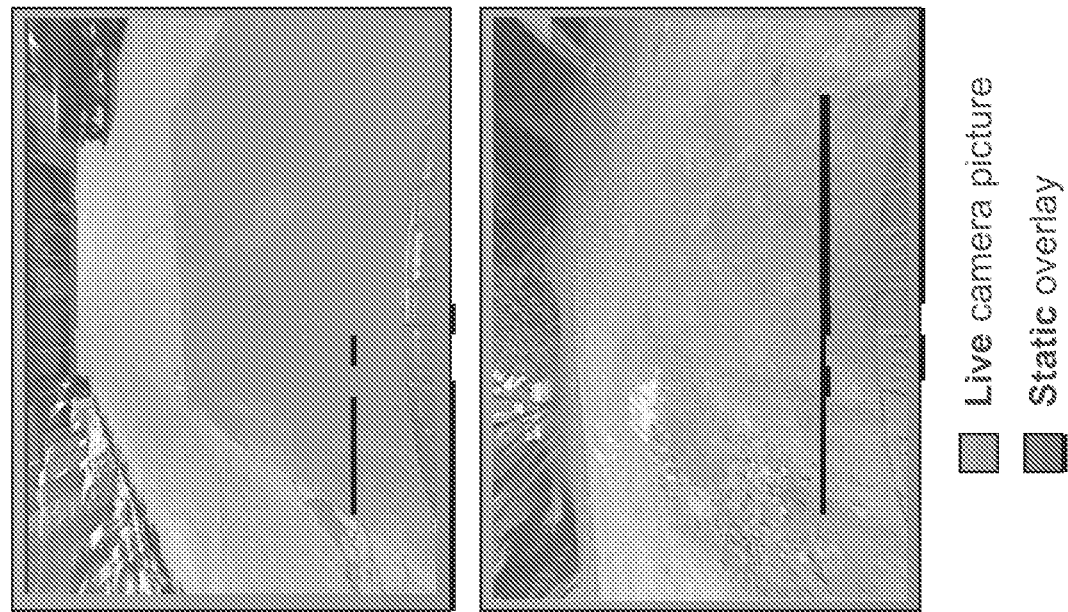

Smart Camera –
Machine Vision Example

- Unique feature-point based object detection solution
  - Unsusceptible to background clutter
  - Objects don't need to have a certain shape or position
  - Filters out lines and shadows
  - Yields x,y and z coordinates
  - Spatial reconstruction map can be extracted from the car's ego-motion
- Feature based solution can be extended to different tasks
  - Line detection
  - Trailer angle tracking

FIG. 45

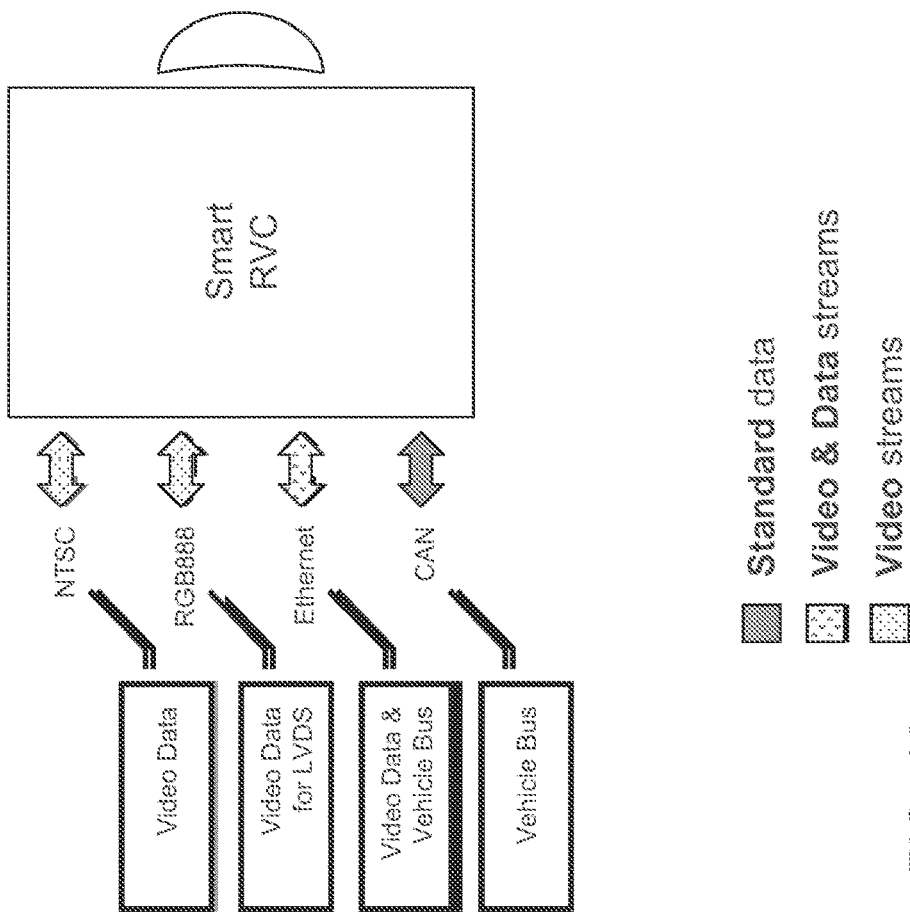

Smart Camera – Size Requirements

- Camera size requirements are getting smaller and smaller
  - 28mm x 28mm x 25mm for a premium OEM with an SOP in 2015
  - Can get down to 21mm for other OEMs

- Heat dissipation limits functionality
  - Magna's cameras use a thermally enhanced plastic housing
  - Superior solution to standard metal housing

Smart Camera – General SoC Requirements

- AEC-Q100 Grade 2 qualified
  - -40° to +105°C ambient
  - OEM requirement for rear view camera is -40° to +85°C
- <500mW power dissipation
  - Fully operating
  - w/o machine vision
- 10x10mm BGA-type package
  - 15x15mm must not be exceeded
  - >0.5mm ball pitch

FIG. 60

Smart Camera – SoC MCU/Accel. Specifications

- MCU should be 32bit class
  - ARM Cortex M3/M4 or R4/R5 preferred due to broad support
  - PowerPC e200 or V850 may be preferred
  - >100MHz preferred
  - Dual core setup preferred
  - Low power mode preferred
- AUTOSAR support preferred
  - Vector MicroSAR support preferred
  - MCALs may be provided
- HW machine vision accelerator option may be provided
  - Similar to EVE/IMAPCAR/etc.
  - May be fixed HW + MCU support
  - DSP/MAC-engine is preferred due to flexibility

FIG. 61

Smart Camera – SoC Memory Specifications

- >6MB RAM for image processing
  - at least two MP camera images may be held in memory
  - Internal SRAM for fast access preferred but not mandatory
  - DDR-RAM only as SiP/stacked solution due to size constraints
  - DDR-RAM should be mDDR or LPDDR2 due to power budget
- >1MB NOR Flash for code & data
  - Internal FLASH preferred
  - Two segments for code & data
  - External FLASH interface should be QSPI for enhanced performance

FIG. 62

Smart Camera – SoC Functional Safety

- Functional safety support preferred
  - Smart camera application may require ASIL level up to ASIL-B/C
- Dual core MCU/Accel. preferred
  - Doesn't have to be lock-step
  - Worker/checker concept
- HW BIST support preferred
  - HW self test for main components
  - CRC-checker for video data
- RAM & FLASH may support ECC
  - Internal caches with ECC support
  - If no ECC support is feasible, test vectors may be supplied for cyclic self test
- MPU support preferred
  - Memory protection unit is preferred
  - Read only access for periph. registers

FIG. 63

MULTI-CAMERA VEHICULAR VISION SYSTEM

CROSS REFERENCE TO RELATED APPLICATIONS

The present application is a continuation of U.S. patent application Ser. No. 16/125,903, filed Sep. 10, 2018, now U.S. Pat. No. 10,640,040, which is a continuation of U.S. patent application Ser. No. 14/359,341, filed May 20, 2014, now U.S. Pat. No. 10,071,687, which is a 371 national phase filing of PCT Application No. PCT/US2012/066571, filed Nov. 27, 2012, which claims the filing benefit of U.S. provisional applications, Ser. No. 61/650,667, filed May 23, 2012; Ser. No. 61/605,409, filed Mar. 1, 2012; Ser. No. 61/579,682, filed Dec. 23, 2011; Ser. No. 61/565,713, filed Dec. 1, 2011; and Ser. No. 61/563,965, filed Nov. 28, 2011, which are hereby incorporated herein by reference in their entireties, and U.S. patent application Ser. No. 14/359,341 is a continuation-in-part of PCT/US2012/066570, filed Nov. 27, 2012, which claims the filing benefit of U.S. provisional applications, Ser. No. 61/605,409, filed Mar. 1, 2012, and Ser. No. 61/563,965, filed Nov. 28, 2011.

FIELD OF THE INVENTION

The present invention relates to imaging systems or vision systems for vehicles.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras to capture images exterior of the vehicle, and provides the communication/data signals, including camera data or image data that is processed and, responsive to such image processing, detects an object at or near the vehicle and in the path of travel of the vehicle, such as when the vehicle is backing up. The present invention transfers the intelligence from the camera to an image displaying device or image display or cluster, central display or head unit (later referred as head unit or HU) or to a mobile device wired or wireless connected or attached to—or plugged into the head unit (as an app). The data transfer rate can be enhanced by LVDS having raw data transmitted as described in U.S. Pat. No. 7,979,536, which is hereby incorporated herein by reference in its entirety. Optionally, the users may be served with dump rear cameras, with DAS software functions, running independent and remote from the camera, but not in another control device. Thus, a business model may be provided that sells an app, not the hardware, to the end users or consumers.

According to an aspect of the present invention, a vision system for a vehicle includes at least one camera or image sensor disposed at a vehicle and having a field of view exterior of the vehicle, and a display device operable to display images for viewing by a driver of the vehicle. The camera provides almost raw image data to a display device and has a control channel for a data line, and wherein a graphic engine or image processing runs as a routine at the display device.

These and other objects, advantages, purposes and features of the present invention will become apparent upon review of the following specification in conjunction with the drawings.

BRIEF DESCRIPTION OF THE DRAWINGS

FIG. 33 is a schematic of an automotive vision system of the present invention, wherein, similar to the general layer model from FIG. 32, a virtual communication layer comes into use, with the application communication layer communicating via virtual communication layer to other applications which may be located on other devices in a manner as if all applications are local, and showing examples of a communication between applications on a mobile device and those at a head unit equipped with graphic processing hardware and graphic processing applications, with the hardware link comprising data buses or channels such as CAN, LIN, Ethernet, Bluetooth, NFC (Near Field Communication), and/or the like;

FIG. 34 is a schematic of an automotive vision system of the present invention similar to that of FIG. 33, with a virtual communication layer extended over several devices, and with communication between applications on a mobile device, a head unit and a camera, wherein the connection may be capable to exchange image data, camera control, parameters from sensors and other devices, and driver assistant controls and/or the like;

FIG. 45 shows a summary of the various aspects and properties of the unique feature-point based object detection for use with a vision system according the present invention;

FIG. 46 is a schematic showing a possible architecture solution when the invention's processing algorithm are integrated to a smart vehicle camera featuring different output bus interfaces; and FIGS. 47-65 show various connections and system architecture and other aspects and constructions and features of a smart camera and associated accessories and systems for use with a vision system according the present invention.

DESCRIPTION OF THE PREFERRED EMBODIMENTS

A driver assist system and/or vision system and/or object detection system and/or alert system may operate to capture images exterior of the vehicle and process the captured image data to detect objects at or near the vehicle and in the predicted path of the vehicle, such as to assist a driver of the vehicle in maneuvering the vehicle in a rearward direction. The object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver.

Figure 1:
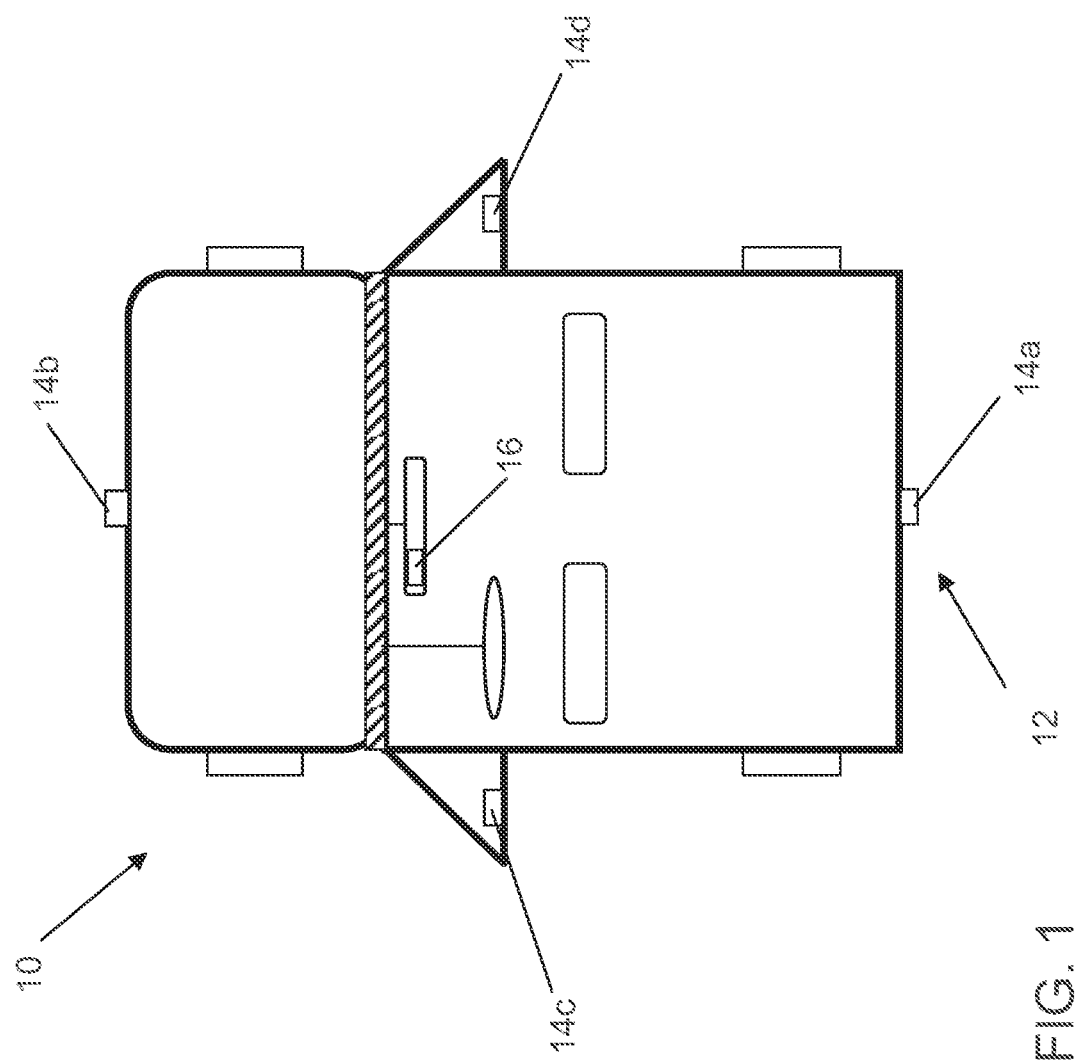
FIG. 1 is a plan view of a vehicle with a vision system and imaging sensors or cameras that provide exterior fields of view in accordance with the present invention.
Figure 2:
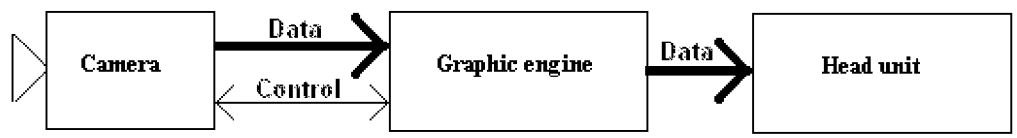
FIG. 2 is a schematic of an automotive vision camera for providing data and getting controlled from an image processing control device, with the image processing control device providing image data to a head unit or other display device.
Figure 3:
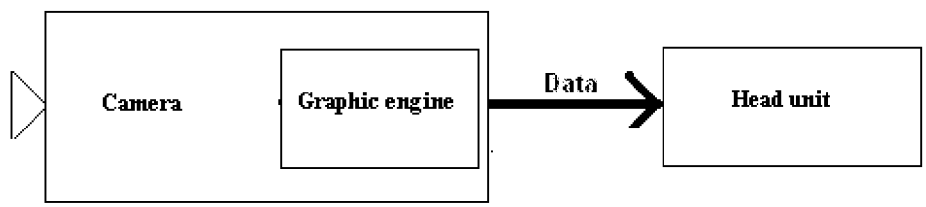
FIG. 3A is a schematic of an automotive vision camera with graphic processing board incorporated within the same device, whereby the processed image data gets provided to a head unit or other display device.
FIG. 3B is a schematic of an automotive vision camera with graphic processing board incorporated within the same device, whereby the processed image data gets provided to a head unit or other display device and with the camera being controlled via a back channel.
FIG. 3C is a schematic of an automotive vision camera with graphic processing board incorporated within the same device, whereby the processed image data gets provided to a head unit or other display device and with an additional bidirectional channel for exchanging control data or parameter.
FIG. 3D is a schematic of an example of a graphic processing architecture solution embedded into an automotive vision camera (system on chip), whereby the processed image data is provided to a head unit or other display device by at least one channel but maybe two in parallel to different output bus interfaces for the camera features, where the busses may be used mono-directional or semi-directional (beside RGB888 and NTSC) for control, and shown with RMII, but RGMII may be used alternatively.
Figure 4:
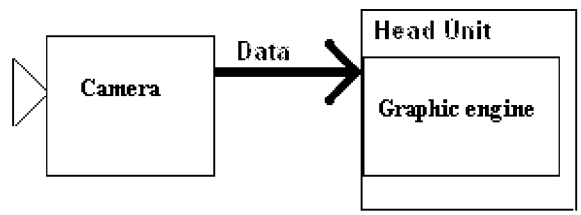
FIG. 4 is a schematic of an automotive vision camera that provides mostly raw image data to the head unit, which is carrying out any kind of graphic processing, and there is no communication channel for data from the head unit to the camera, either directly or via gateways, in accordance with the present invention.
Figure 3B:
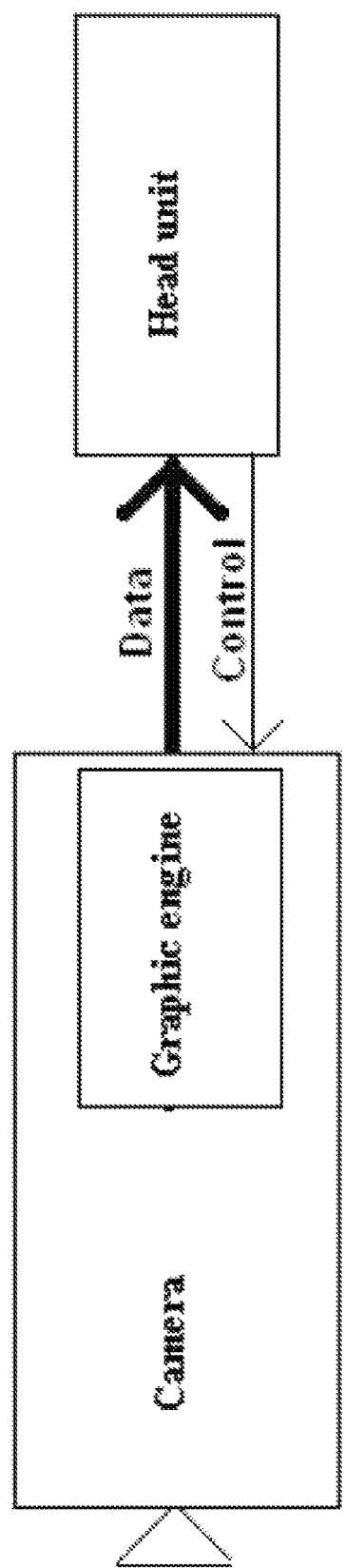
Figure 3C:
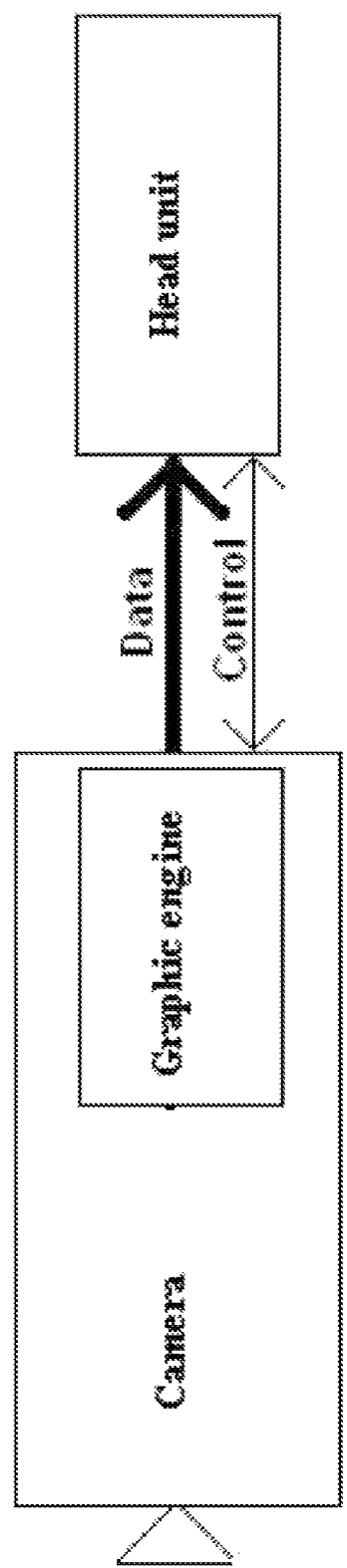
Figure 3D:
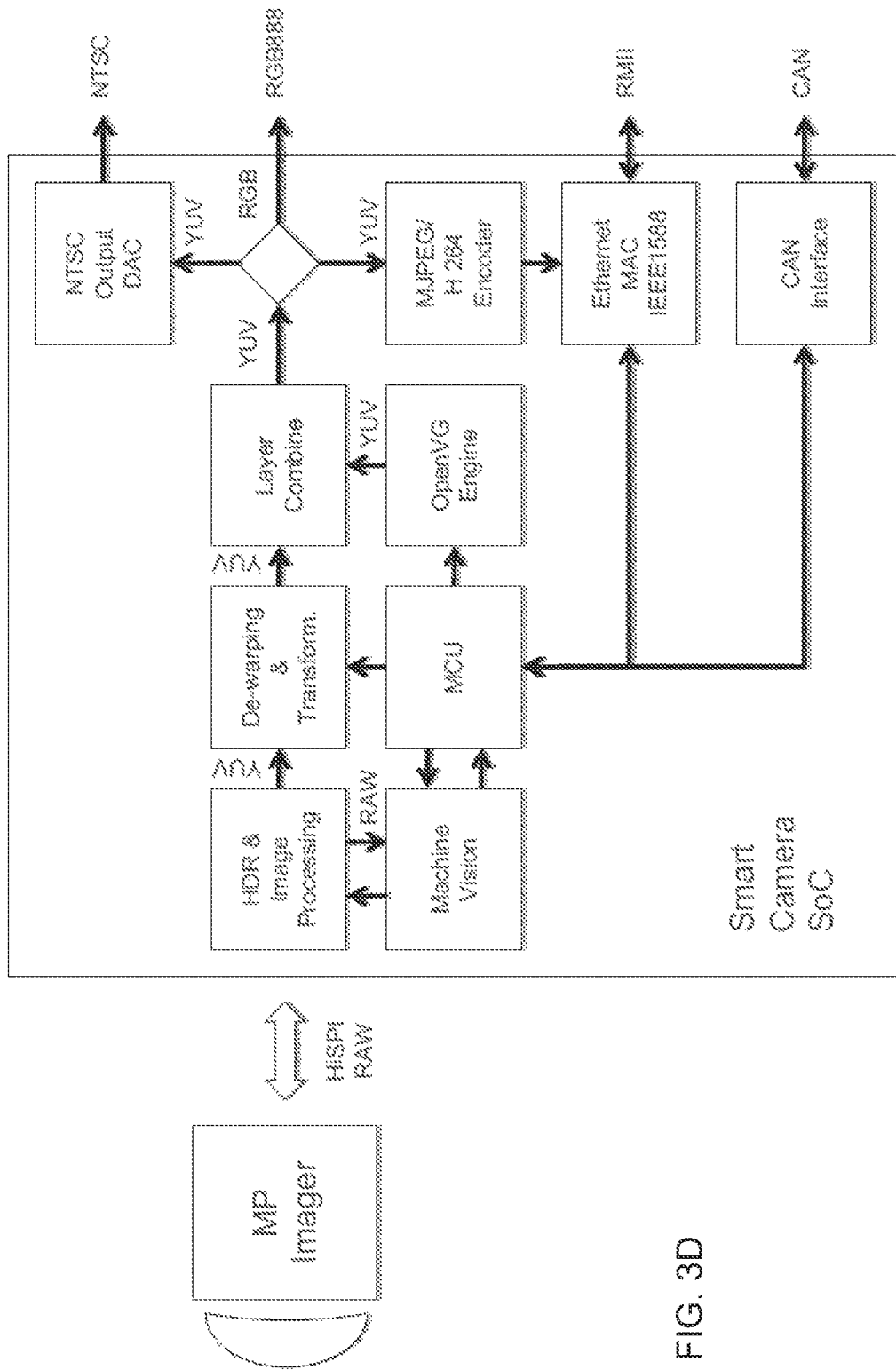
Figure 5A:
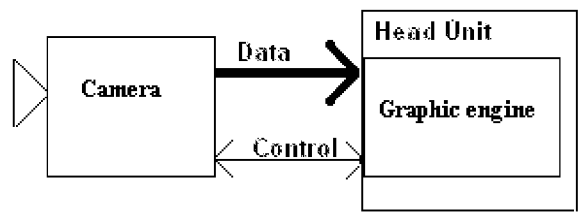
FIG. 5A is a schematic of an automotive vision camera system of the present invention with graphic processing incorporated within the head unit by hardware and software, with raw image data (directly) provided to a head unit or other display device for further image processing, and with an additional bidirectional channel for exchanging control data or parameter.
Figure 6:
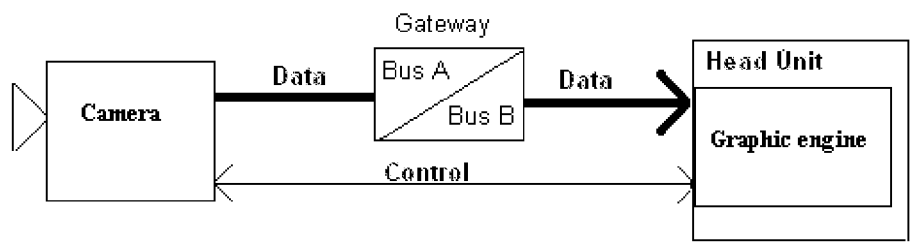
FIG. 6 is a schematic of an automotive vision camera system of the present invention with graphic processing incorporated within the head unit, and with raw image data provided to a head unit or other display device for further image processing, and with the image data transferred via different busses linked by a bus gateway, and with the camera being controlled via a back channel (which may comprise one bidirectional channel)
Figure 7:
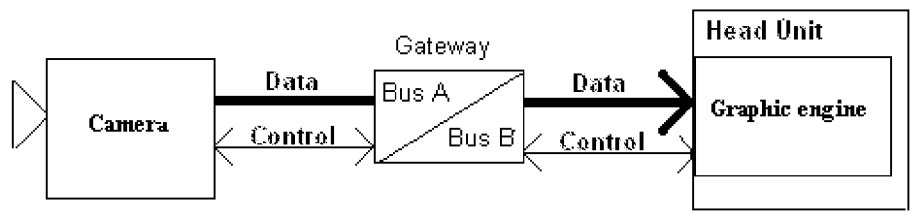
FIG. 7 is a schematic of an automotive vision camera system of the present invention with graphic processing incorporated within the head unit, and with raw image data provided to a head unit or other display device for further image processing, and with the image data transferred via different busses linked by a bus gateway, and with the camera control back channel established via bus gateway (which may comprise a bidirectional channel on one or both bus systems)
Figure 5B:
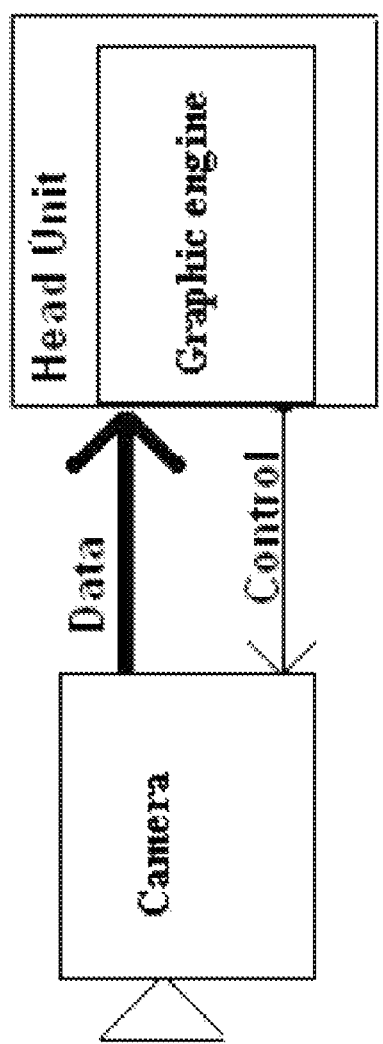
FIG. 5B is a schematic of an automotive vision camera system of the present invention with graphic processing incorporated within the head unit by hardware and software, with raw image data (directly) provided to a head unit or other display device for further image processing, and with the camera being controlled via a back channel.
Figure 8:
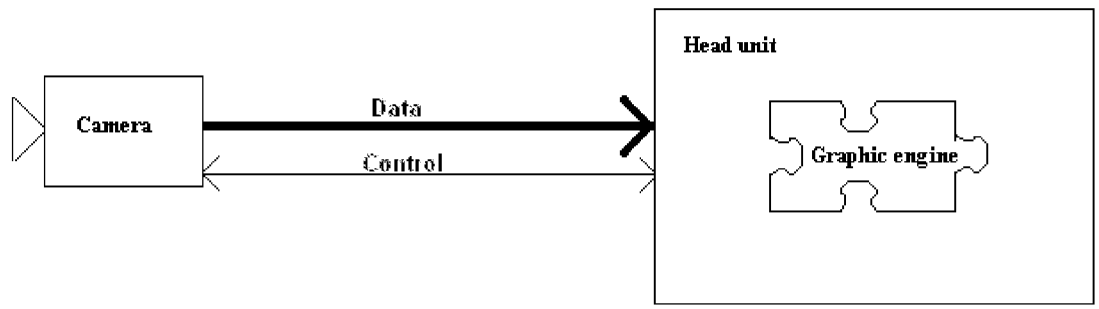
FIG. 8 is a schematic of an automotive vision camera, which provides almost raw data to the head unit or other display device and has a control channel which might be any kind of data line or bus, and with the graphic engine (or the image processing) running as a routine on the head unit or other display device, in accordance with the present invention.
Figure 9:
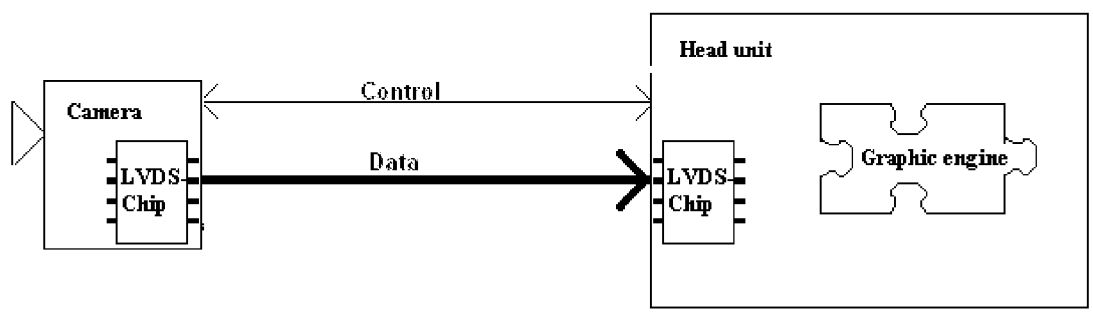
FIG. 9 is a schematic of an automotive vision system according to FIG. 8, which uses LVDS/Ethernet as an Image data transfer channel, in accordance with the present invention.
Figure 10:
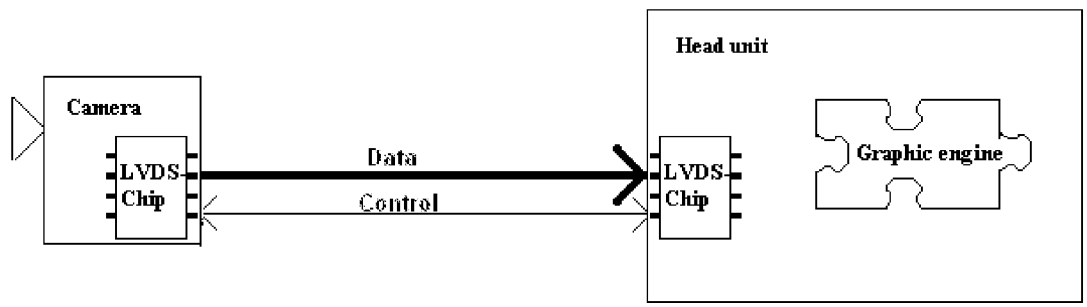
FIG. 10 is a schematic of an automotive vision system according to FIGS. 8 and 9, which uses LVDS/Ethernet as a bidirectional control channel and an image data transfer channel, in accordance with the present invention.
Figure 11A:
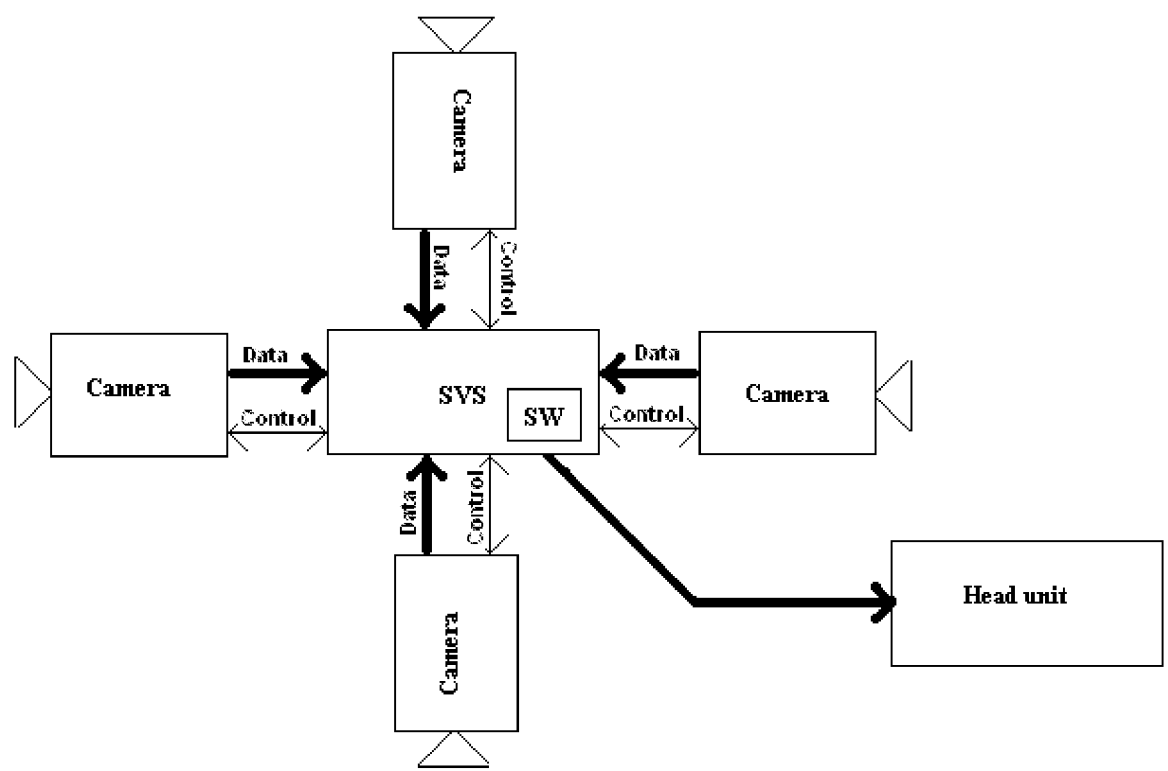
FIG. 11A is a schematic of an automotive vision multi camera architecture, where all cameras are controlled by one control/image data processing device, and where the image data processing device sends processed image data to the head unit or other display device.
Figure 11B:
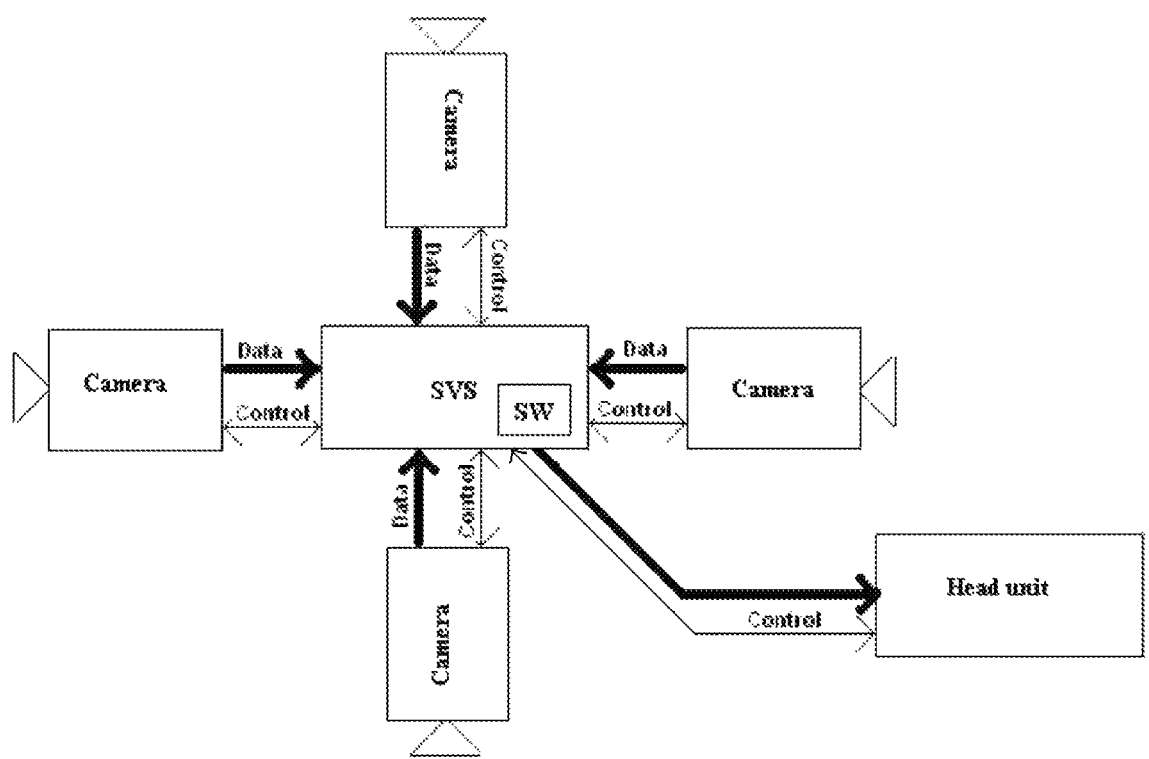
FIG. 11B is a schematic of an automotive vision multi camera architecture, where all of the system cameras are controlled by one control/image data processing device, and where the image data processing device sends processed image data to the head unit or other display device, with an additional mono-directional or bidirectional channel for exchanging control data or parameter with the display device.
Figure 11C:
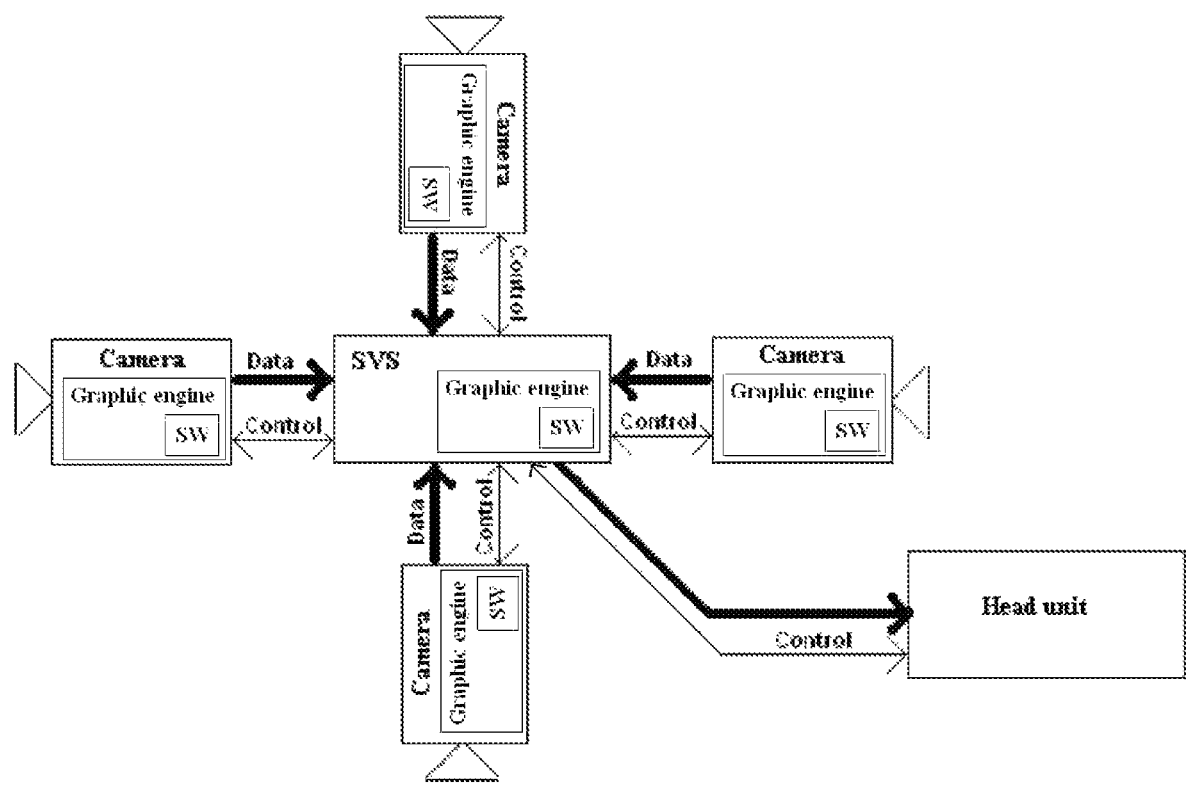
FIG. 11C is a schematic of an automotive vision multi (smart) camera architecture, where the cameras incorporate one part of the image data processing chain and the control device processes a second or alternative part of the image data processing, and where the image data processing device sends processed image data to the head unit or other display device.
Figure 11D:
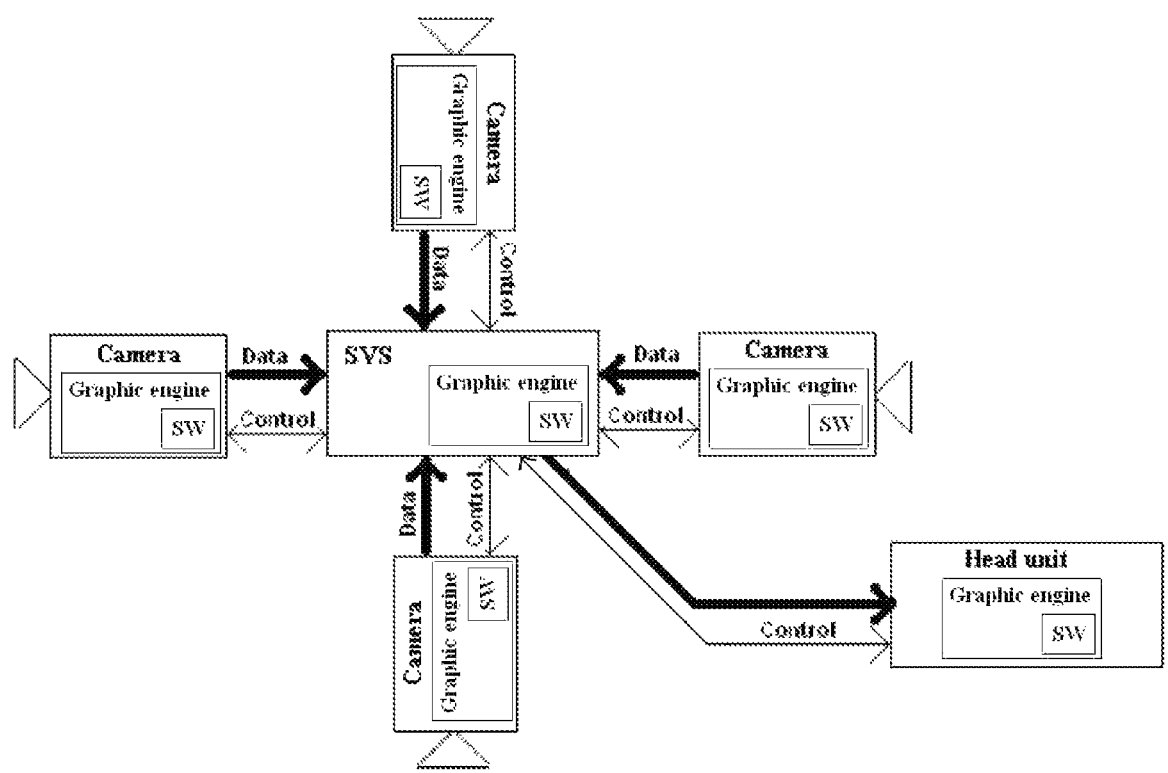
FIG. 11D is a schematic of an automotive vision multi (smart) camera architecture, where the cameras incorporate one part of the image data processing chain and the control device processes a second or alternative part of the image data processing, and where the image data processing device sends processed or raw image data to the head unit or other display device, which processes a third or alternative part of the image data processing.
Figure 11E:
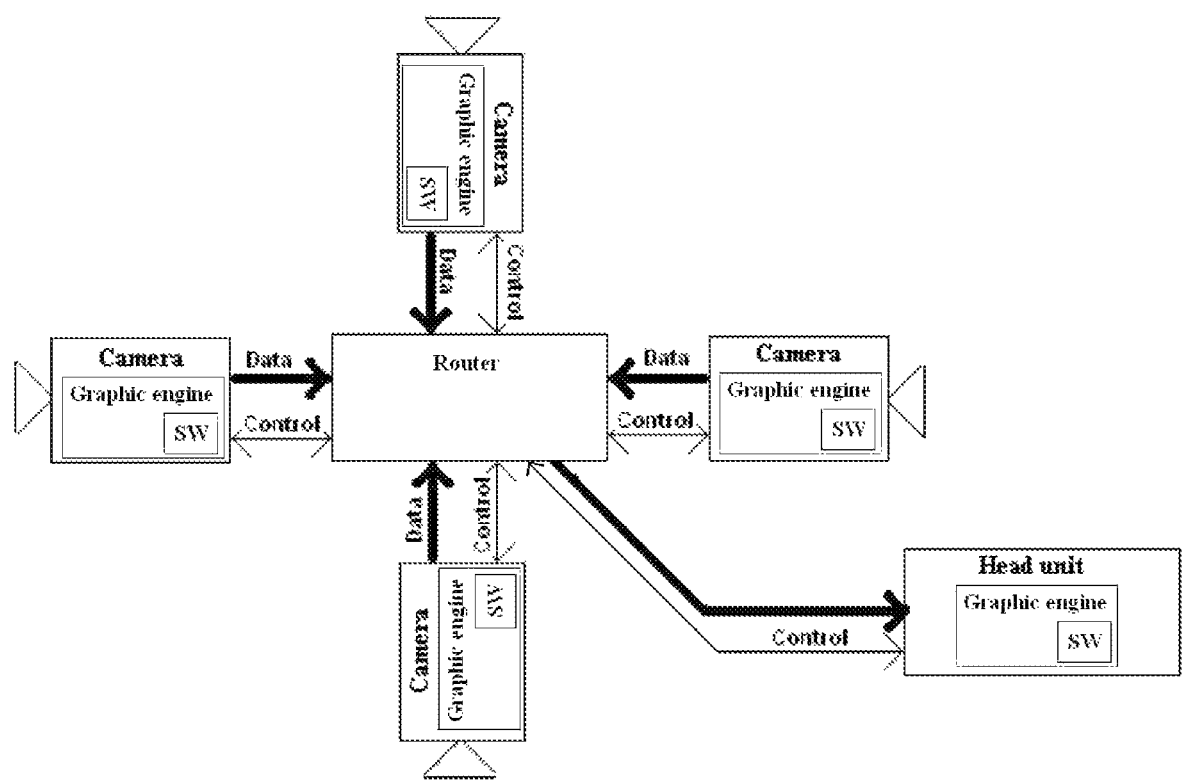
FIG. 11E is a schematic of an automotive vision multi (smart) camera architecture, where the cameras incorporate one part of the image data processing chain and the head unit or other display device processes a second or alternative part of the image data processing, and where the image data and controls from and to the cameras are collected and/or transferred to the head unit or other display device by a router.
Figure 11F:
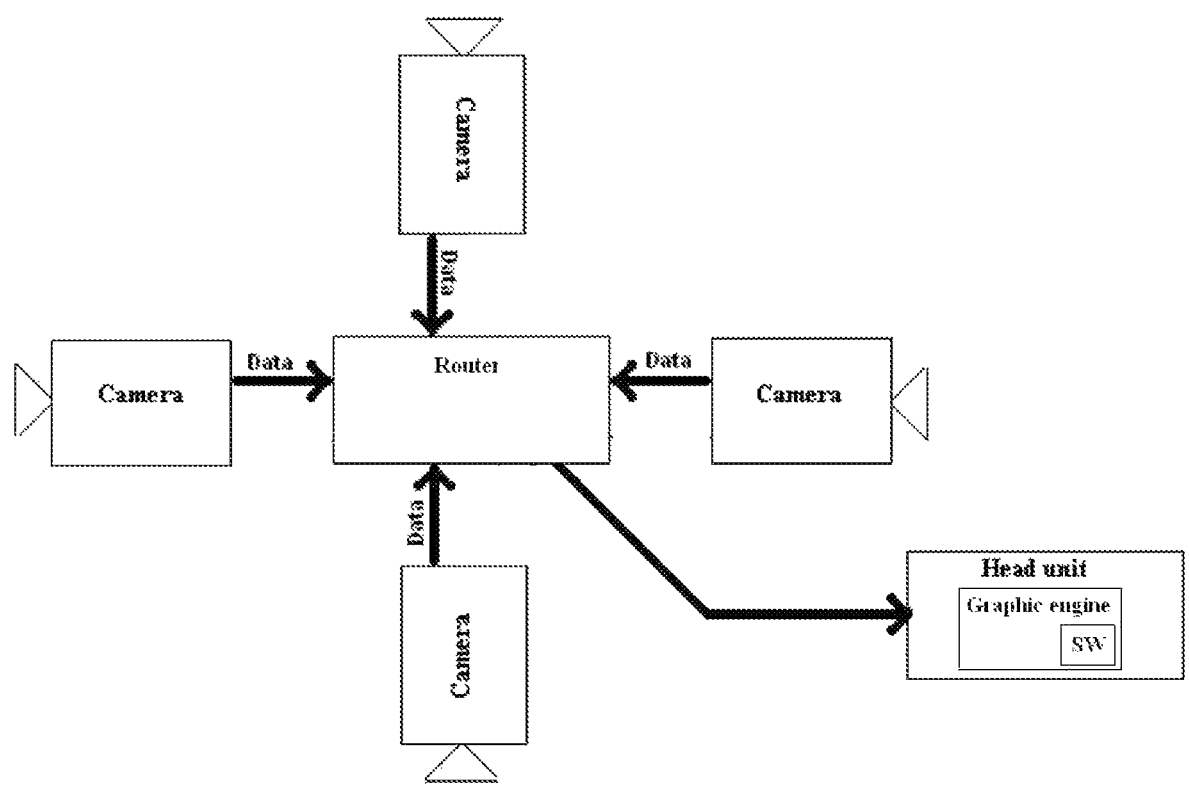
FIG. 11F is a schematic of an automotive vision multi camera architecture where the cameras send almost raw data over a router to a head unit or other display device via monodirectional data lines or bus channel, where the data may be compressed by the cameras or by the router before sending.
Figure 12A:
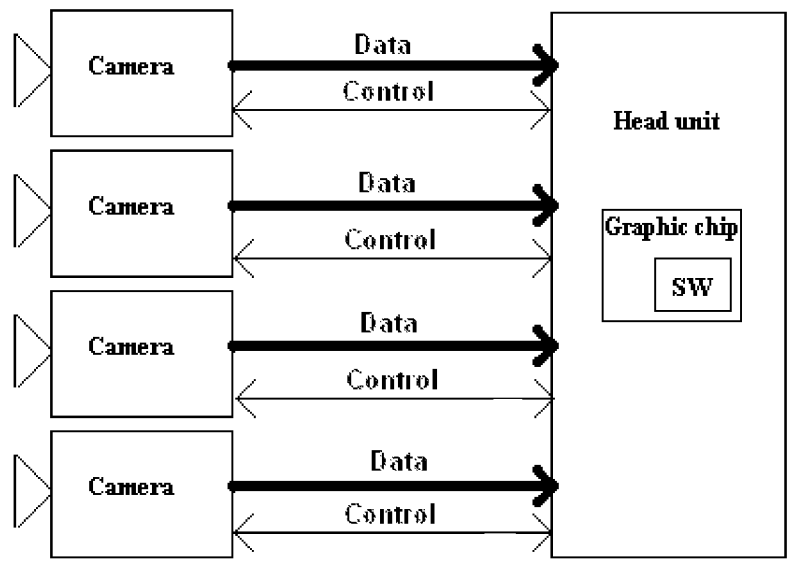
FIG. 12A is a schematic of an automotive vision multi camera architecture, where all of the cameras provide almost raw data to the head unit or other display device direct without having a central image processing device or router in between and have a control channel for exchanging control data or parameter with the head unit or display device which might be any kind of data line or bus, and with the graphic engine (or the image processing) running on an integrated hardware on the head unit or other display device, in accordance with the present invention.
Figure 13:
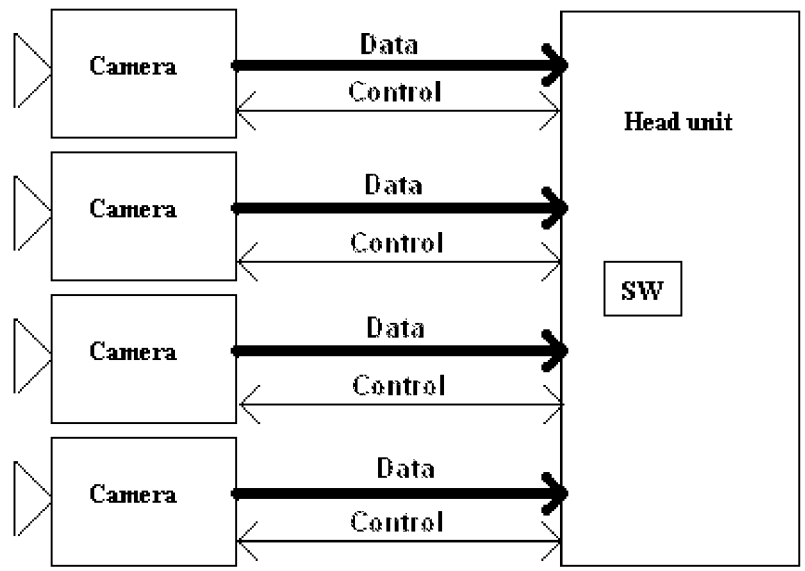
FIG. 13 is a schematic of an automotive vision multi camera architecture, where all of the cameras providing almost raw data to the head unit or other display device and with the graphic engine (or the image processing) running as a routine mainly on the CPU, without having dedicated vehicle camera image processing hardware on the head unit or other display device, in accordance with the present invention.
Figure 12B:
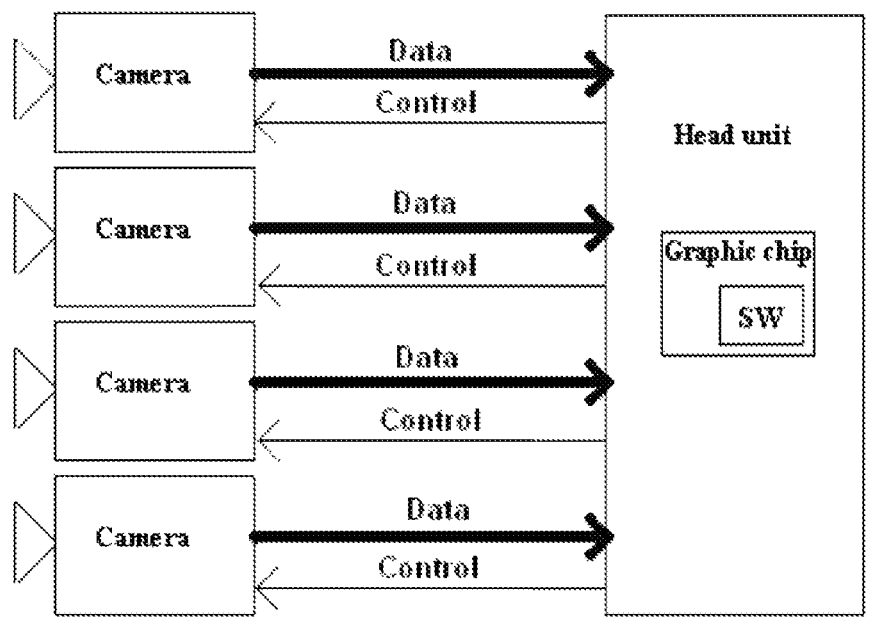
FIG. 12B is a schematic of an automotive vision multi camera architecture, where all of the cameras provide almost raw data to the head unit or other display device direct without having a central image processing device or router in between and have a monodirectional camera control channel which may comprise any kind of data line or bus, and with the graphic engine (or the image processing) running on an integrated hardware on the head unit or other display device, in accordance with the present invention.
Figure 12C:
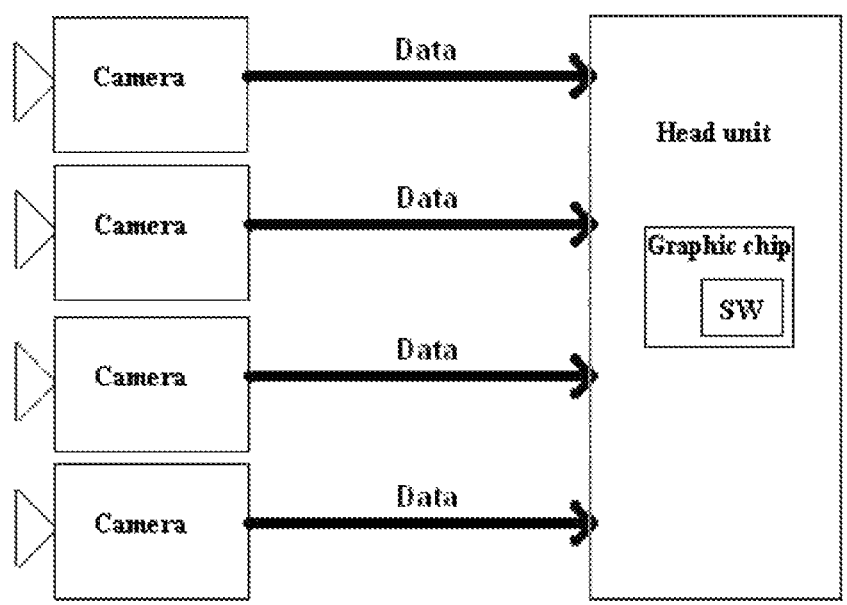
FIG. 12C is a schematic of an automotive vision multi camera architecture, where some or all of the cameras provide almost raw data to the head unit or other display device direct without having a central image processing or router device in between using monodirectional data channels as like NTSC and with the graphic engine (or the image processing) running on an integrated hardware on the head unit or other display device, in accordance with the present invention.
Figure 14:
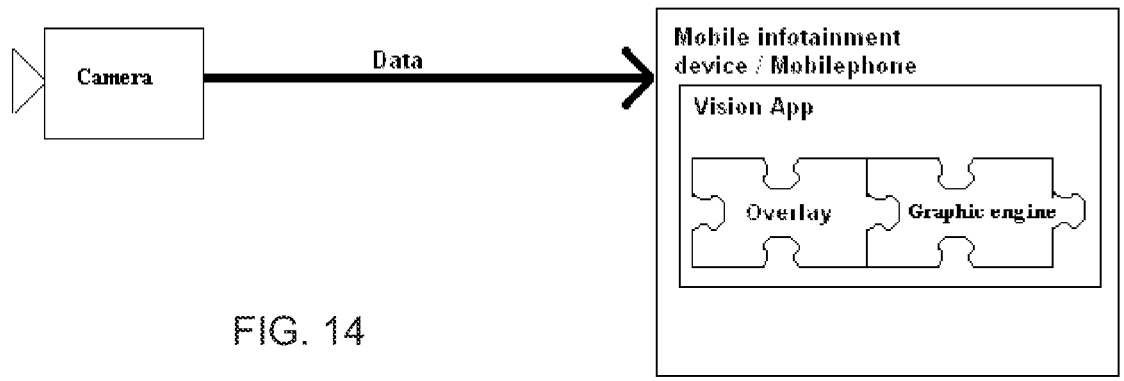
FIG. 14 is a schematic of an automotive vision system according to FIG. 8, with the head unit or other display device conjuncted to a mobile infotainment device or mobile phone or mobile device, and with the graphic engine (or the image processing) running as an 'app' (application) on the mobile device, in accordance with the present invention, and with the camera comprising a basic or baseline camera, which has no control input.
Figure 15:
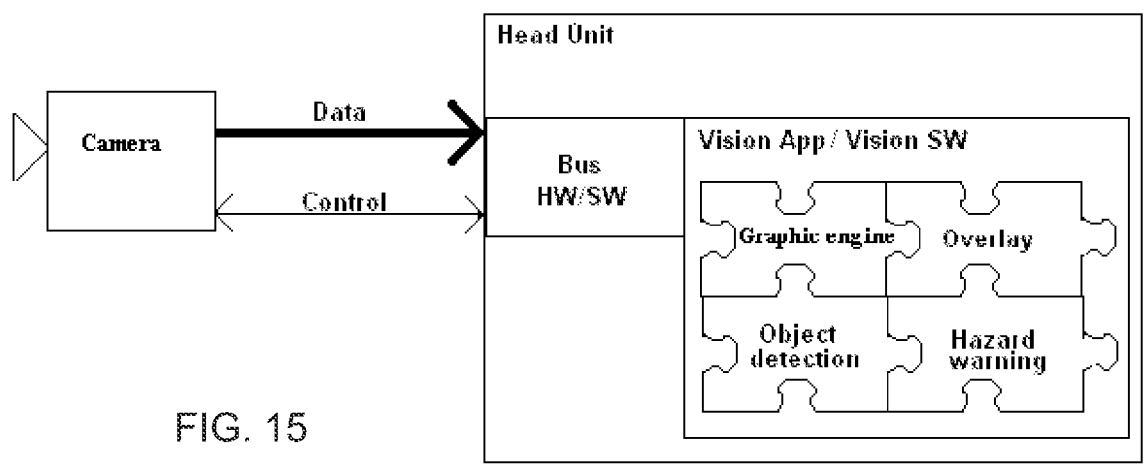
FIG. 15 is a schematic of an automotive vision system, with a single camera providing image date to the head unit or other display device, and with the camera controlled via a control channel, and with the head unit carrying communication hardware for communicating with the camera, and with the vision software or vision applications utilizing the incoming data for further (high level) processing, in accordance with the present invention.
Figure 16:
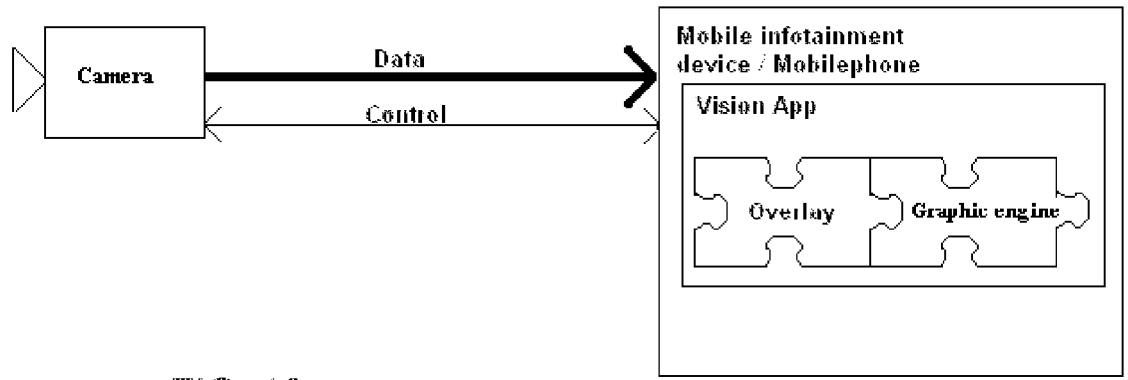
FIG. 16 is a schematic of an automotive vision system according to FIGS. 8 and 14, with the head unit or other display device conjuncted to a mobile infotainment device or mobile phone or mobile device, and with the graphic engine (or the image processing) running as an 'app' (application) on the mobile device, in accordance with the present invention, and with a single camera in use that is controlled via a control channel.
Figure 17:
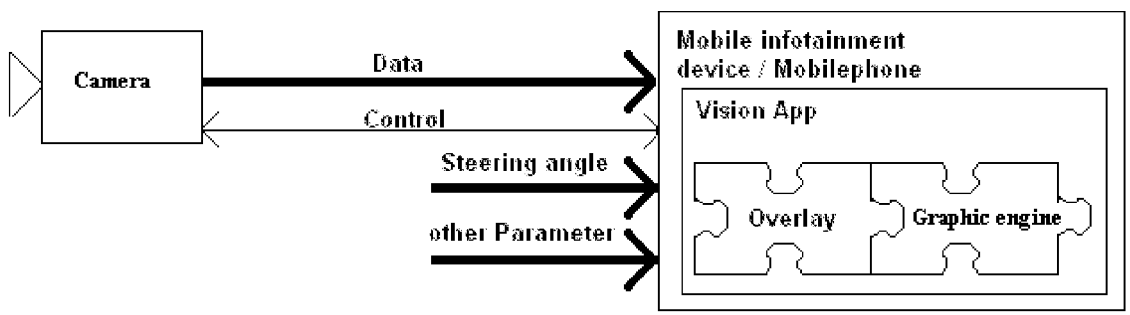
FIG. 17 is a schematic of an automotive vision system according to FIG. 16, with the graphic engine (or the image processing) running as an 'app' (application) on the mobile device, and with the software additionally computing additional parameters and with the steering angle taken into account, which may be used for processing graphical steering aid overlays to a rear camera image while backing up the vehicle, in accordance with the present invention.
Figure 18:
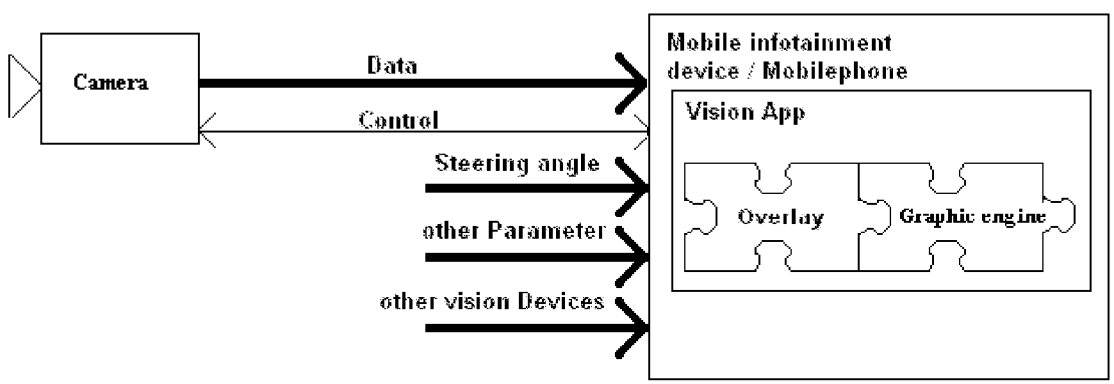
FIG. 18 is a schematic of an automotive vision system according to FIG. 17, with the system processing image data captured by more than one camera and by other driver assistant system sources such as ultrasound sensors, Radar sensors, infrared and visual cameras, Lidar or Laser sensors, in accordance with the present invention, with the graphic engine (or the image processing) running as an 'app' (application) on the mobile device.
Figure 19A:
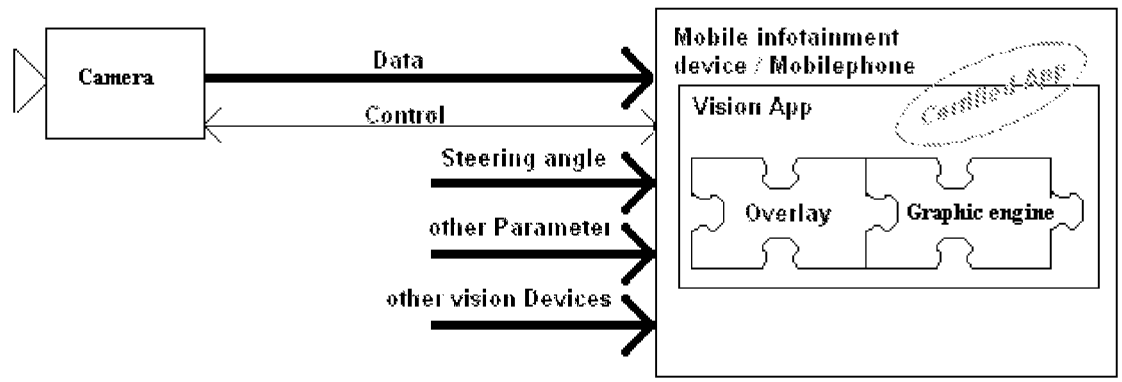
FIG. 19A is a schematic of an automotive vision system according to FIGS. 8 to 18, with the system using apps certified by according certification boards of governmental organs or mobile device companies and/or OEMs, in accordance with the present invention.
Figure 19B:
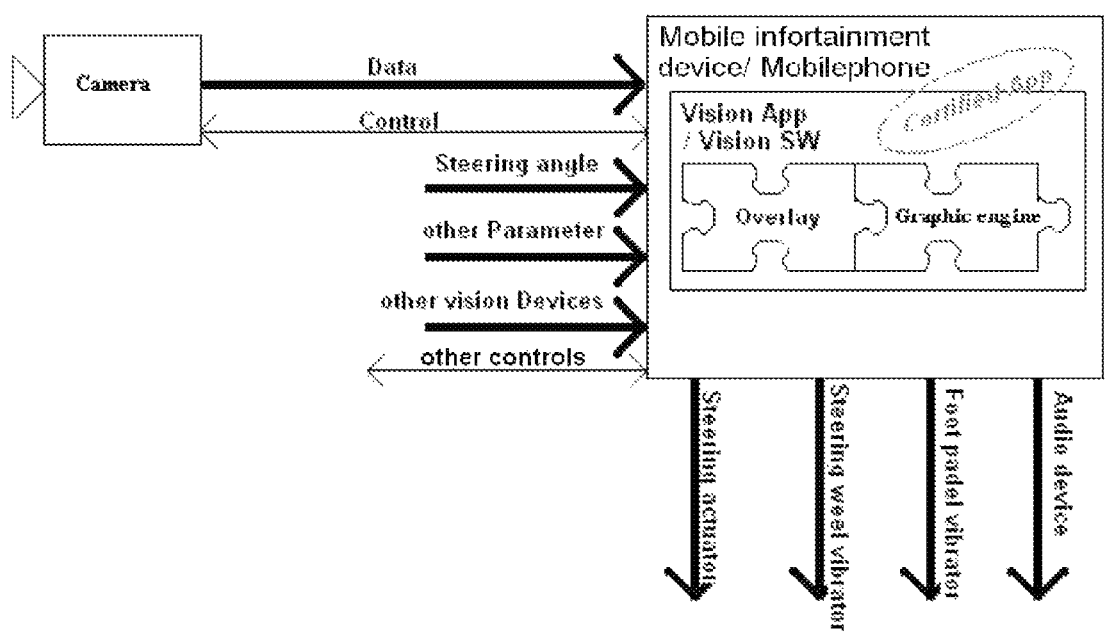
FIG. 19B is a schematic of an automotive vision/driver assistant system according to FIGS. 18 and 19A, with the system is connected to a mobile phone which transmits control commands to vehicle inherent devices (as like warnings, invasive interaction)
Figure 20:
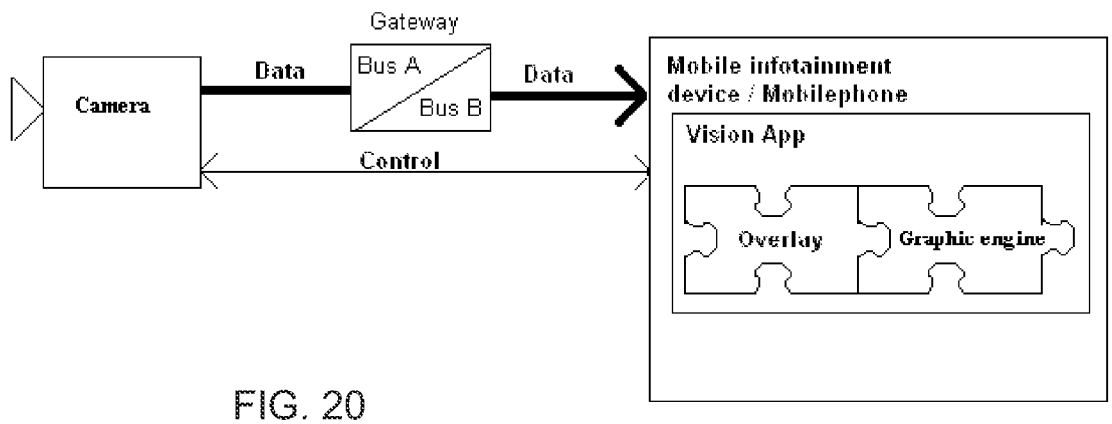
FIG. 20 is a schematic of an automotive vision system having a bus gateway within the path of image raw data between camera and mobile infotainment device or mobile phone, with the back channel to the camera established separately, and with the mobile infotainment device or mobile phone doing the graphic processing, in accordance with the present invention.
Figure 21:
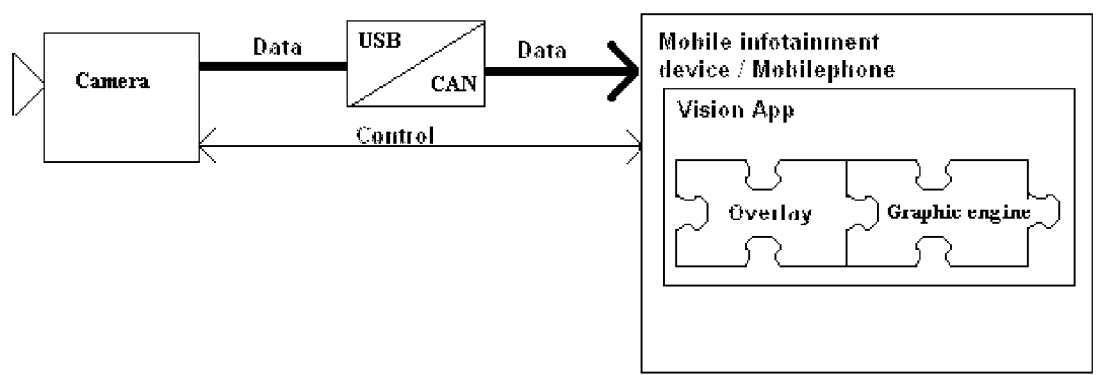
FIG. 21 is a schematic of an automotive vision system according to FIG. 16, having non permanently mounted USB based cameras plugged into a USB port that is part of the vehicle's bus architecture that may have bus gateways such as USB to CAN, with the Camera sending images via the USB, in accordance with the present invention.
Figure 22:
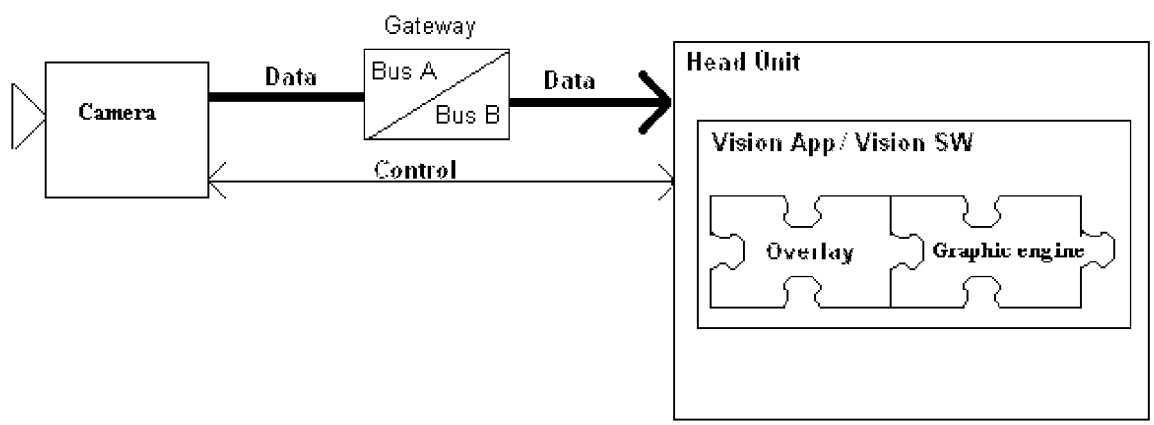
FIG. 22 is a schematic of an automotive vision system having a bus gateway within the path of image raw data between the camera and head unit or other display device, with the back channel to the camera established separately, and with the head unit doing the graphic processing, in accordance with the present invention.
Figure 23:
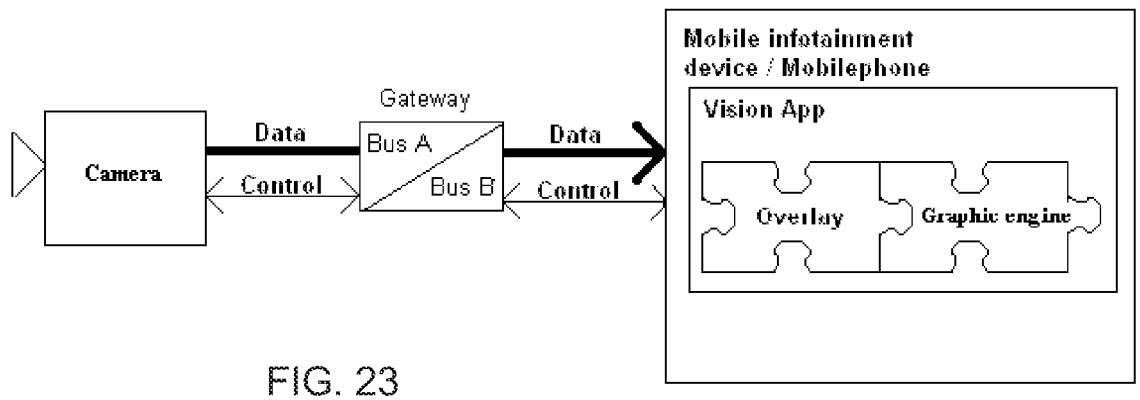
FIG. 23 is a schematic of an automotive vision system having a bus gateway within the path of image raw data between camera and mobile infotainment device or mobile phone, with the camera control back channel established via the gateways (which may comprise a bidirectional channel on one or both bus systems), and with the mobile device doing the graphic processing, in accordance with the present invention.
Figure 24:
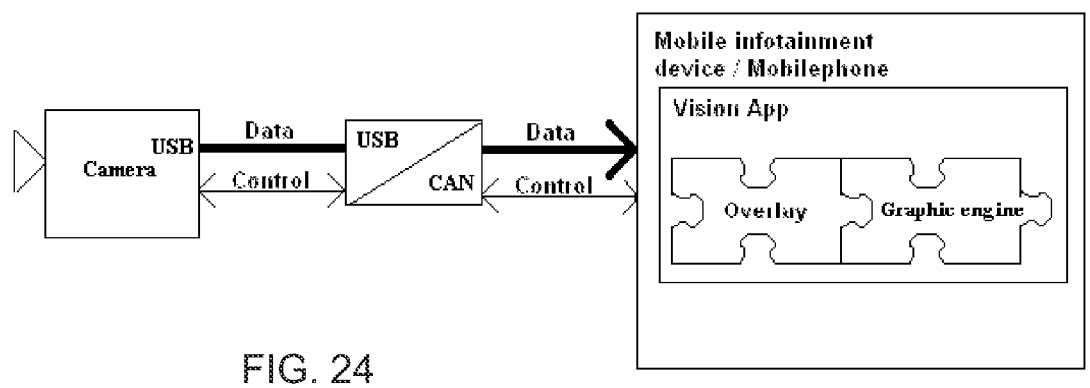
FIG. 24 is a schematic of an automotive vision system having non-permanently mounted USB based cameras plugged into any USB port that is part of the vehicle's bus architecture, which might have bus gateways such as USB to CAN, with the Camera sending images via the USB, and with the camera control back channel established via the gateways (which may comprise a bidirectional channel on one or both bus systems), and with the mobile device doing the graphic processing, in accordance with the present invention.
Figure 25:
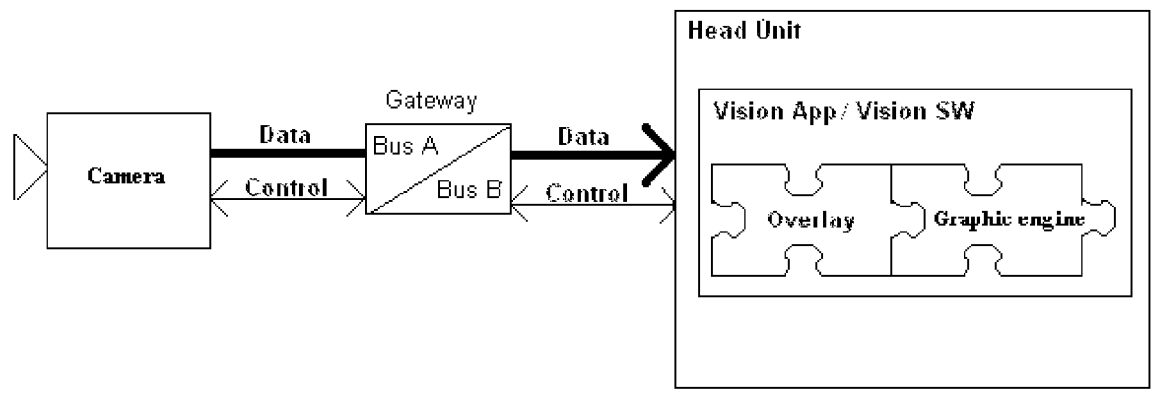
FIG. 25 is a schematic of an automotive vision system having a bus gateway within the path of image raw data between camera and head unit, with the camera control back channel established via the gateways (which may comprise a bidirectional channel on one or both bus systems), and with the mobile device doing the graphic processing, in accordance with the present invention.
Figure 26:
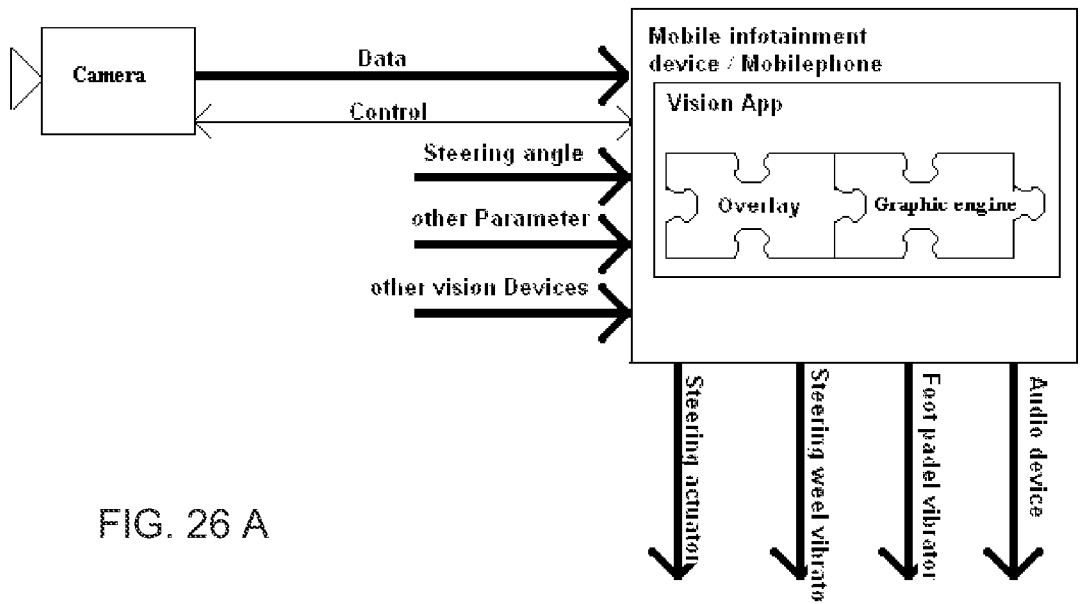
FIG. 26A is a schematic of an automotive vision system with a consecutive solution to FIG. 18, where the app visualizes driver assistant functions, and also controls outputs such as driving interventions or active warnings such as steering wheel or foot pedal vibrations, in accordance with the present invention.
FIG. 26B is a schematic of an automotive vision system with the system using apps certified by according certification boards of governmental organs or mobile device companies and/or OEMs, in accordance with the present invention.
Figure 26B:
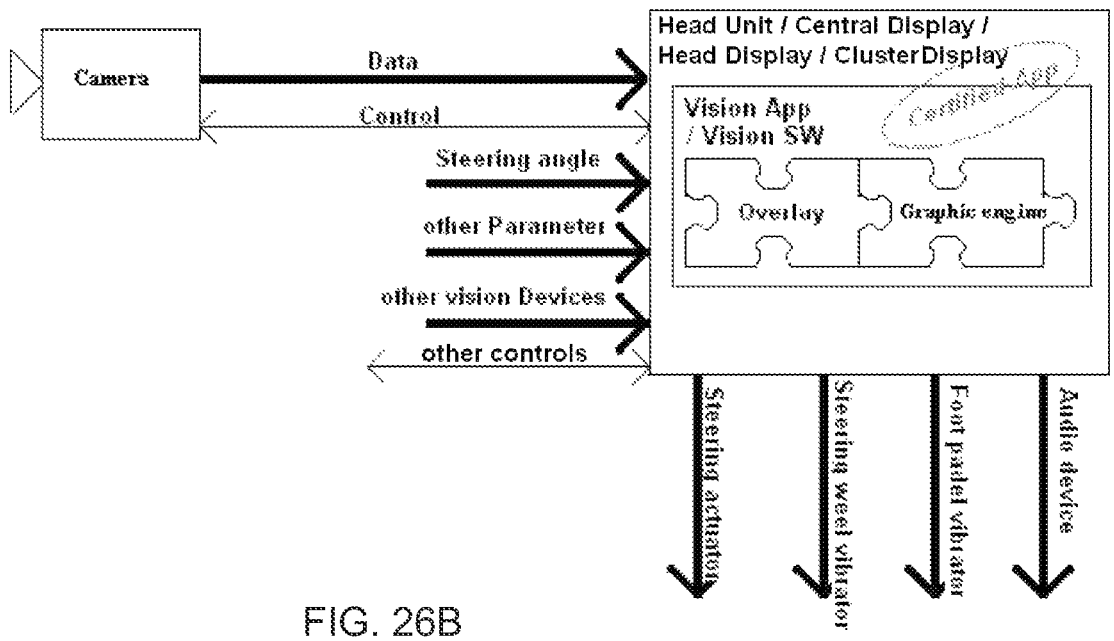
Figure 27:
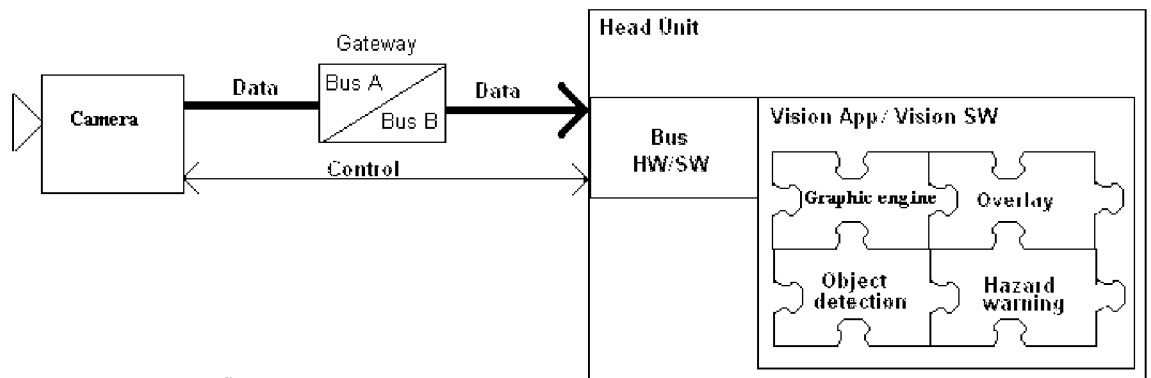
FIG. 27 is a schematic of an automotive vision system having a bus gateway within the path of image raw data between camera and head unit, with the back channel to the camera established separately, and with the head unit or other display device doing the graphic processing, with the head unit carrying communication hardware for communicating with the camera, and with the vision software or vision applications utilizing the incoming data for further (high level) processing, which may run on designated image processing hardware, in accordance with the present invention.
Figure 28:
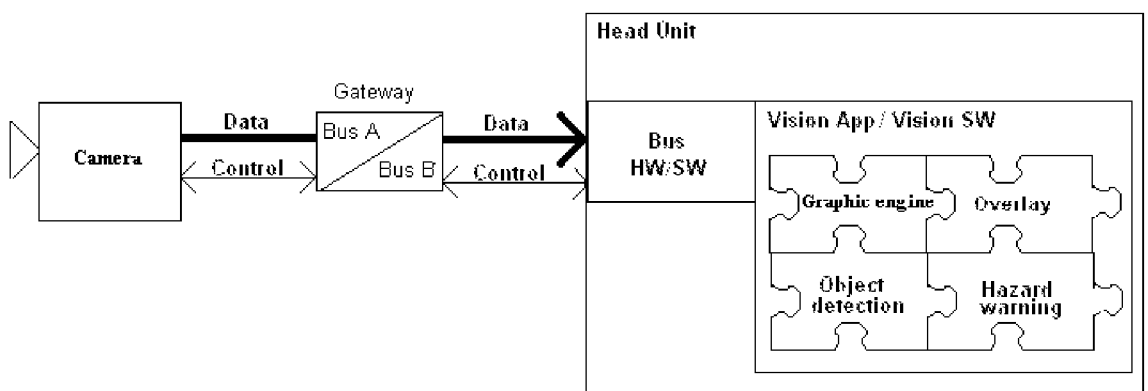
FIG. 28 is a schematic of an automotive vision system having a bus gateway within the path of image raw data between camera and head unit, with the camera control back channel established via the gateways (which may comprise a bidirectional channel on one or both bus systems), and with the head unit or other display device doing the graphic processing, and with the vision software or vision applications utilizing the incoming data for further (high level) processing, which may run on designated image processing hardware, and with the head unit carrying commutation hardware for communicating with the camera, in accordance with the present invention.

Referring now to the drawings and the illustrative embodiments depicted therein, a vehicle 10 includes an imaging system or vision system 12 that includes one or more imaging sensors or cameras (such as a rearward facing imaging sensor or camera 14a and/or a forwardly facing camera 14b at the front (or at the windshield) of the vehicle, and/or a sidewardly/rearwardly facing camera 14c, 14b at the sides of the vehicle), which capture images exterior of the vehicle, with the cameras having a lens for focusing images at or onto an imaging array or imaging plane of the camera (FIG. 1). The vision system 12 is operable to process image data captured by the cameras and may provide displayed images at a display device 16 for viewing by the driver of the vehicle. Optionally, the vision system may process image data to detect objects, such as objects to the rear of the subject or equipped vehicle during a reversing maneuver, or such as approaching or following vehicles or vehicles at a side lane adjacent to the subject or equipped vehicle or the like. Optionally, the object detection may utilize detection and analysis of moving vectors representative of objects detected in the field of view of the vehicle camera, in order to determine which detected objects are objects of interest to the driver of the vehicle, such as when the driver of the vehicle undertakes a reversing maneuver (such as by utilizing aspects of the systems described in U.S. provisional applications, Ser. No. 61/605,409, filed Mar. 1, 2012; and Ser. No. 61/563,965, filed Nov. 28, 2011, which are hereby incorporated herein by reference in their entireties.

Vehicle vision systems typically use sophisticated image processing algorithms. For example, either the algorithm runs on a hardware which is integrated to a vision camera or the algorithm runs on an external control device collecting and processing the incoming camera raw data, and then sends a processed image data stream to a display device, cluster or head unit. Vehicle displays vehicle vision systems may be provided at multi-media head units (such as by utilizing aspects of the mirror assemblies described in U.S. Pat. No. 7,937,667, which is hereby incorporated herein by reference in its entirety), and may process several input sources, such that processing power is adapted accordingly. Optionally, a system may visualize and control the apps running on a mobile infotainment device or mobile phone which is connected to or in communication with the head unit, either wirelessly (near field communication, BLUETOOTH®, and the like) or plugged in. It is known to control the app interactively and depending on the driving situation.

The present invention provides a system that delocates the computing load from the camera or separate image control to the head unit or conjuncted or connected mobile device which typically come with high processing performance and are embedded into the display or head unit environment anyway. The system may utilize aspects of the systems described in U.S. Pat. No. 7,697,027 and/or U.S. patent application Ser. No. 13/377,673, filed Dec. 12, 2011, now U.S. Pat. No. 9,036,026, which are hereby incorporated herein by reference in their entireties.

Vision system camera electronics are preferably developed to cost efficient. Due to lower development costs, vision camera systems are typically uniformed as much as possible to lower the number of variants. Also, the complexity is preferably reduced or limited or held as low as possible. Every electronic part that is integrated into cameras produces heat and takes precious space. Simplifying and standardizing of cameras and their interfaces enables use of modern embedding methods, which reduces system costs and enables the shrinking of the camera, which provide customer benefits.

A different or alternative approach is to eliminate dedicated vision system control devices by transferring its functions (intelligence) either into the (smart) cameras or by transferring its functions to the end devices as like the head unit, the (display) cluster, or other display device. By that also the IOs and controls (such as, for example, invasive assistant systems) may be transferred/placed on those devices.

For reducing the cabling costs, there is the trend to use busses/data backbones onto several sensing and actuator devices attached. Some systems may be able to request data direct from another device on the backbone without interaction of the main unit (head unit). This requires at least bus interfaces on some or all nodes and maybe also processors and may require a sophisticated state and priority handling across the devices.

Vehicle development cycles are typically quite long compared to the rush changing infotainment industry. Because of this, infotainment and vehicle driver assistant and safety systems (DAS) outdate quite rapidly. The appearance and functionality is often already a step behind after-market systems when a vehicle inherent or vehicle-based system enters the market. To counter these circumstances, it would be desirable to vehicle manufacturers to keep (DAS) systems up to date.

The present invention provides an economized vehicle vision system architecture that reduces the cost and complexity of the vehicle camera and vision system.

(1) For lowering the number of variants of different car vision camera systems, the inventive solution is to not implement the electronics in a camera or a separate image processing device and may transfer the graphic engine to the head up unit. By avoiding this, the camera electronics can be reduced to the main functionalities for image capturing and own supply power control. Preferably, a simple data transfer interface finds use to send the camera's (raw) data to the head unit (or other image giving/processing end device). On the head unit or other image giving/processing end device the graphic engine (or the image processing) is processed. Other image giving/processing devices may comprise a mirror display within or outside of the passenger compartment, such as a mirror display at the top center region (such as a video mirror utilizing aspects of the displays described in U.S. Pat. Nos. 7,855,755 and/or 7,777,611, which are hereby incorporated herein by reference in their entireties). There it may be sufficient to place image processing tasks, and the hardware and software, when it comes to comparably low sophisticated light balancing, distortion and stitching tasks, may be fed by comparably low performance rear and side cameras. The early state of the art was to capture images and send it over data lines to a display, typically via an analog signal such as an NTSC signal or the like. This was done without controlling or loop controlling the camera. The solution of the present invention also incorporates a control line running from the head unit to the camera. A loop controlling of the camera and the graphic engine (or the image processing) is realized by that. The controlling is necessary for light and color balancing (such as described in PCT Application No. PCT/US2012/063520, filed Nov. 5, 2012, and published on May 16, 2013 as International Publication No. WO 2013/070539, which is hereby incorporated herein by reference in its entirety) and gain control. Also, the gamma correction may be controlled by the back channel. Other control commands may by for sleep/wake up/idle, low high resolution switching, reduced area selection, compression control or triggering a data dump of intrinsic calibration data (such as described in U.S. Pat. No. 7,979,536, which is hereby incorporated herein by reference in its entirety).

(2) Optionally, a continuative idea of the solution of the present invention is to realize the image data stream from the camera to the head unit (or other end device) on a data encoder chip, preferably by a Low Voltage Differential Signal (LVDS) or Ethernet interface, preferably using a mono coaxial cable and Ethernet encoder chips (in the camera and in the head unit). The Data stream would be mono-directional (such as by utilizing aspects of U.S. provisional application 61/537,279, filed Sep. 21, 2011, which is hereby incorporated herein by reference in its entirety).

(3) Optionally, a further continuative idea is that the control line (HU-Cam) may be realized by a CAN/LIN/other car bus interface or just by a single signal line/wire.

(4) Optionally, and as an alternative to (3), above, the control signal may be transferred via the data encoder chip, preferably by LVDS/Ethernet (data line from (2), above) so the interfaces and data stream are bi-directional.

(5) As solution for the graphic engine (or the image processing) (from (1), above) running on the head unit for a mono or multi camera system, processing the camera control, image dewarp, enhancing, adding overlays, DAS functionality and the like, the software could be running on a hardware added to the head unit.

Figure 29A:
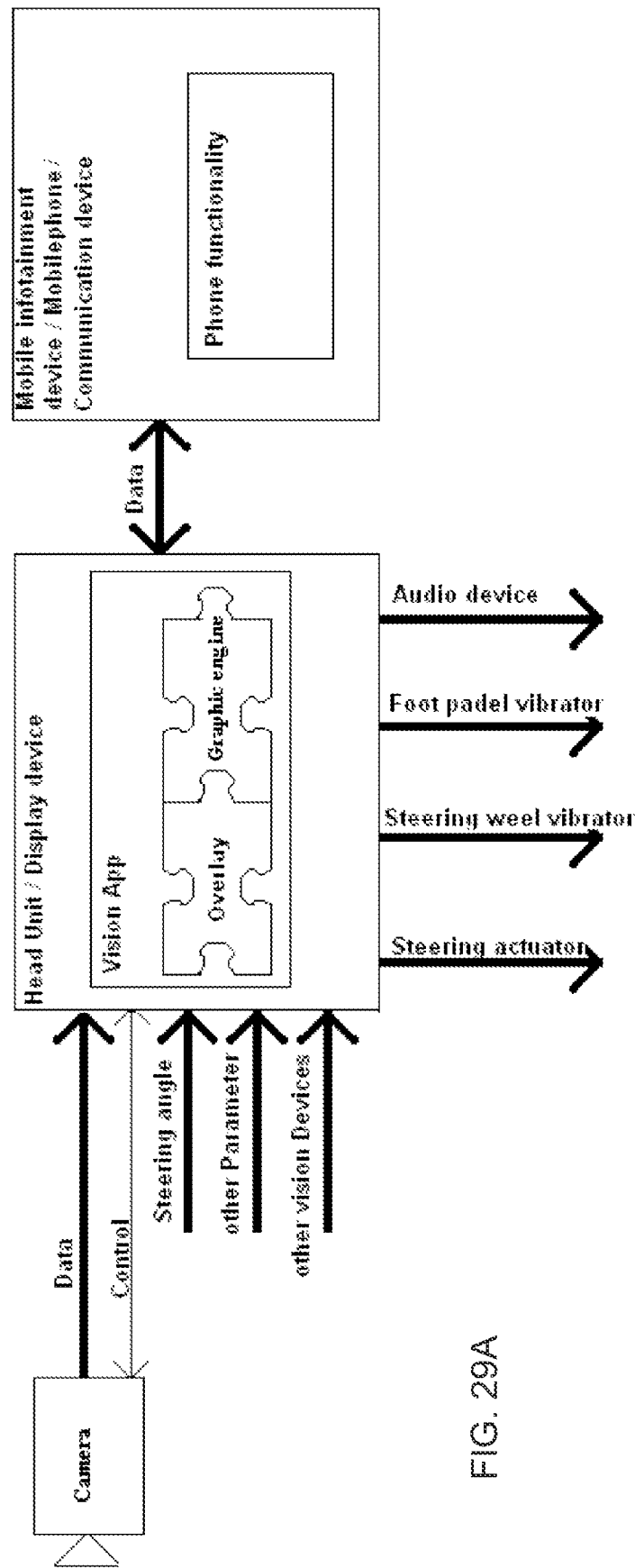
FIG. 29A is a schematic of an automotive vision system of the present invention, with a graphic engine (or the image processing) running as an 'app' (application) or (evtl. additional) software on the head unit/display device's main control or on a graphic hardware, and with the head unit connected to a phone or communication device.
Figure 29B:
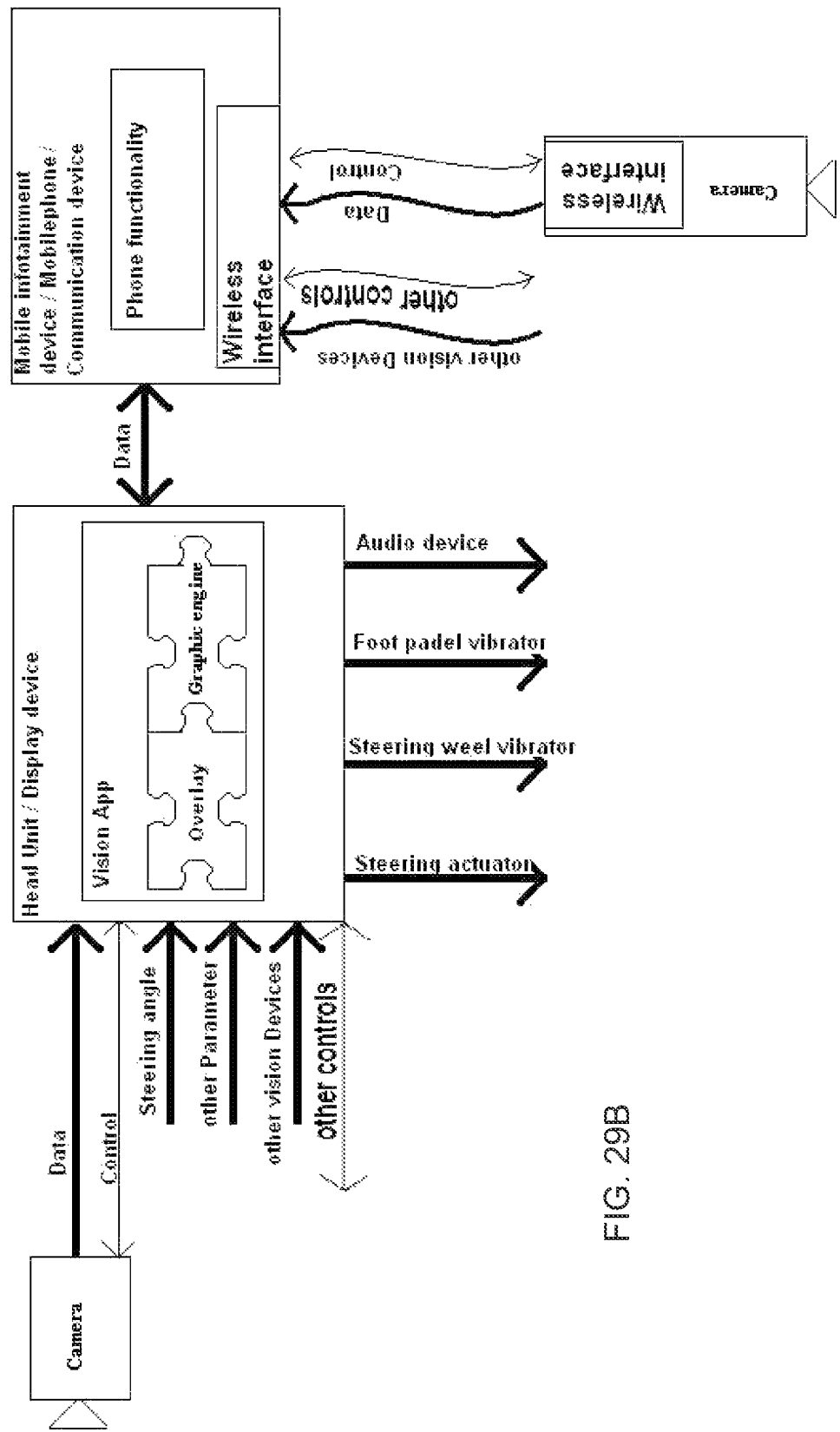
FIG. 29B is a schematic of an automotive vision system of the present invention, with a graphic engine (or the image processing) running as an 'app' (application) or (evtl. additional) software on the head unit/display device's main control or on a graphic hardware, with the head unit connected to a phone or communication device and with a wireless camera connected to the head unit via the connection to the phone or communication device and via a wireless communication hardware at or to the phone or communication device.
Figure 29C:
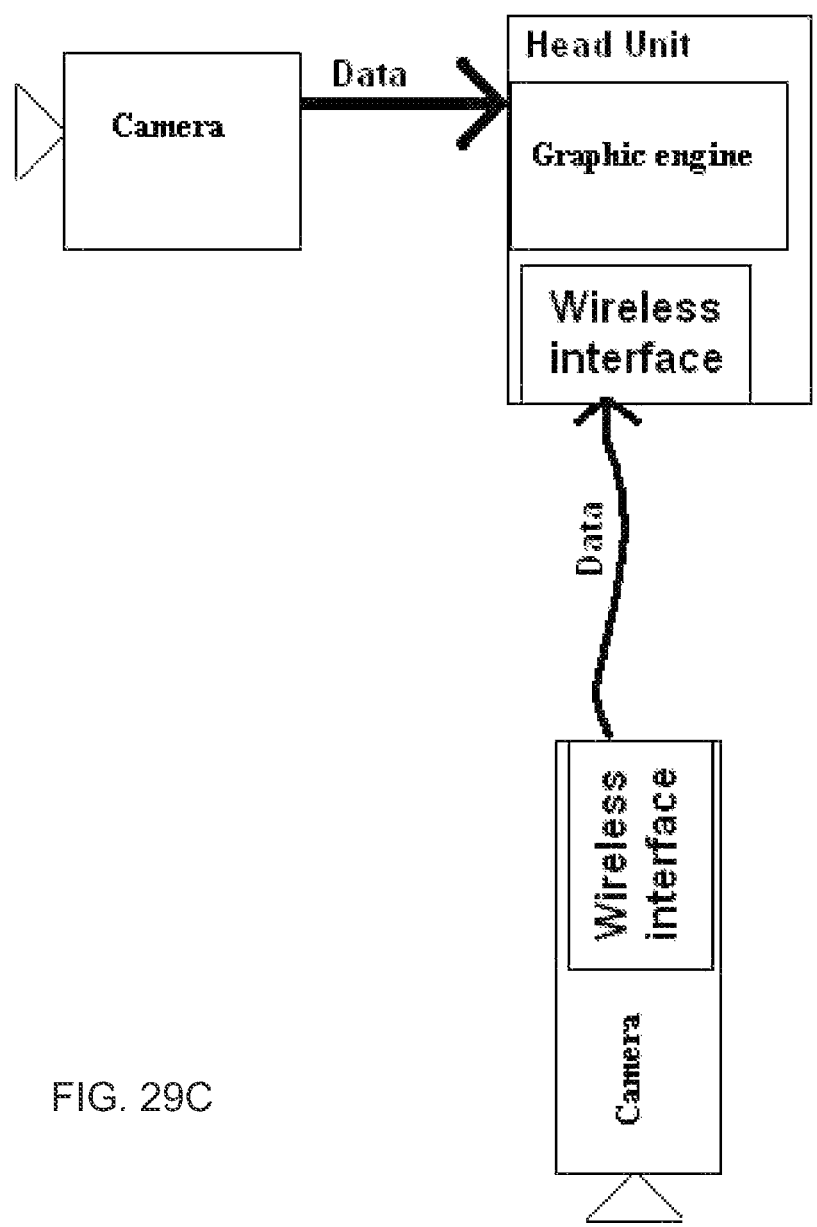
FIG. 29C is a schematic of an automotive vision system of the present invention, with a graphic engine (or the image processing) running on the head unit/display device's main control or on a graphic hardware, having at least one automotive camera and with a wireless camera connected to the head unit connected via wireless communication to a wireless camera without control loop.
Figure 29D:
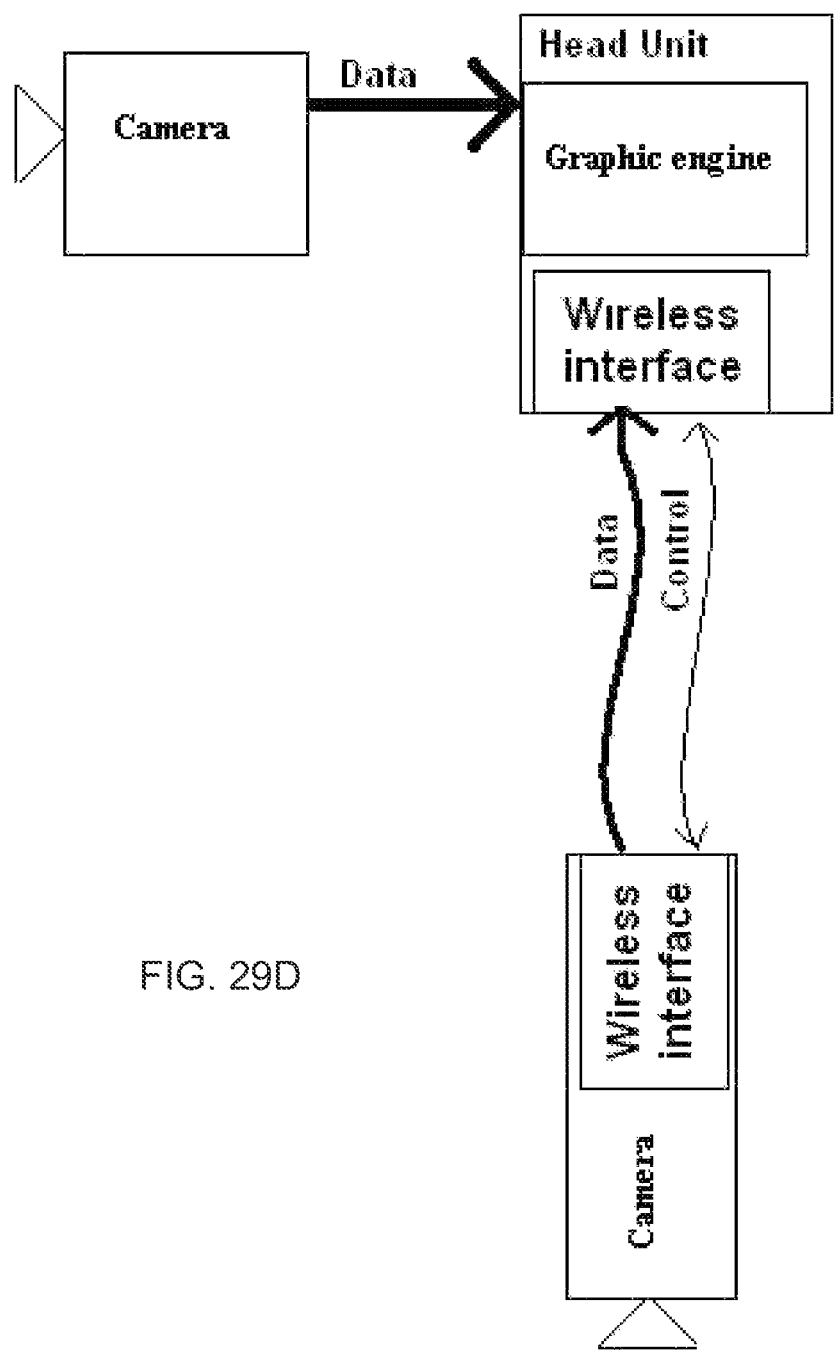
FIG. 29D is a schematic of an automotive vision system of the present invention, with a graphic engine (or the image processing) running on the head unit/display device's main control or on a graphic hardware, having at least one automotive camera and with a wireless camera connected to the head unit connected via wireless communication to a wireless camera with control loop.
Figure 29E:
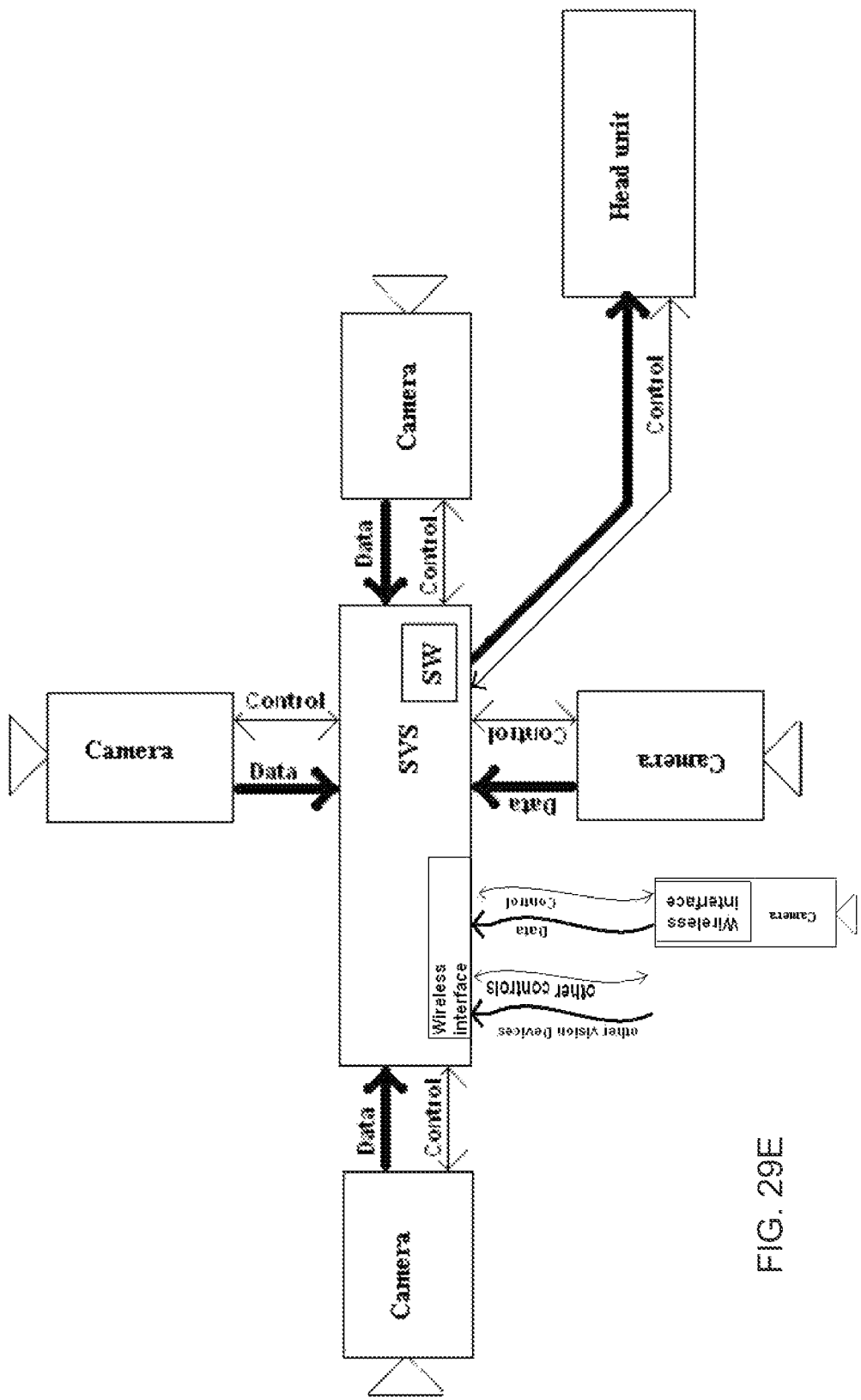
FIG. 29E is a schematic of an automotive vision system of the present invention consecutive to FIG. 11, having several vehicle inherent automotive cameras connected to a control device and with a wireless camera connected additionally via wireless communication hardware on the control device to a wireless camera with control loop.
Figure 29F:
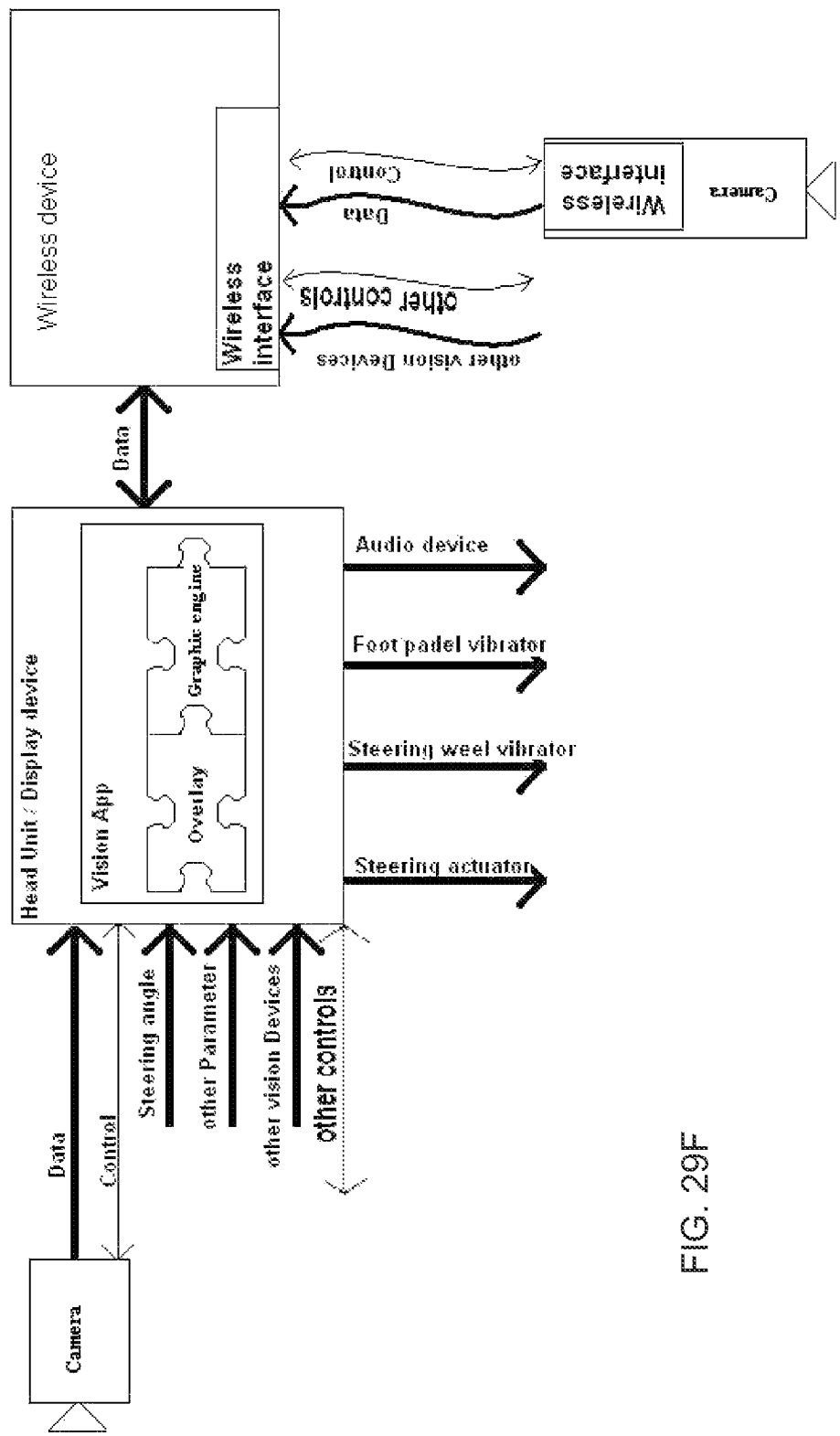
FIG. 29F is a schematic of an automotive vision system of the present invention, with a graphic engine (or the image processing) running on the head unit/display device's main control or on a graphic hardware, having at least one automotive camera and with an external vehicle inherent wireless device connected to the head unit on which wireless camera with control loop is connected.
Figure 29G:
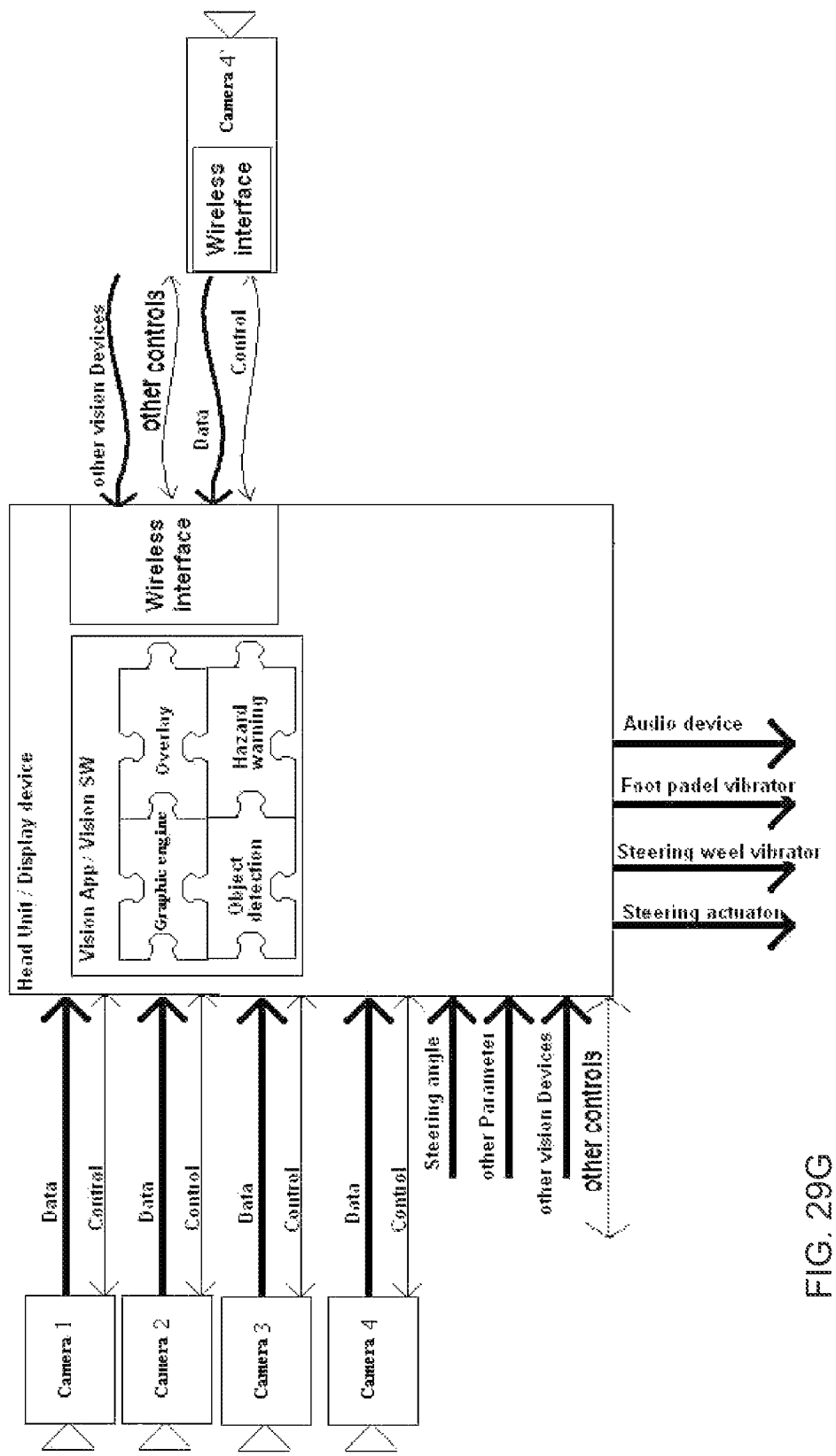
FIG. 29G is a schematic of an automotive vision or driver assistant system of the present invention, with a graphic engine (or the image processing) running on the head unit/display device's main control or on a graphic hardware, having several automotive cameras connected and with wireless camera connected to the head unit.
Figure 29H:
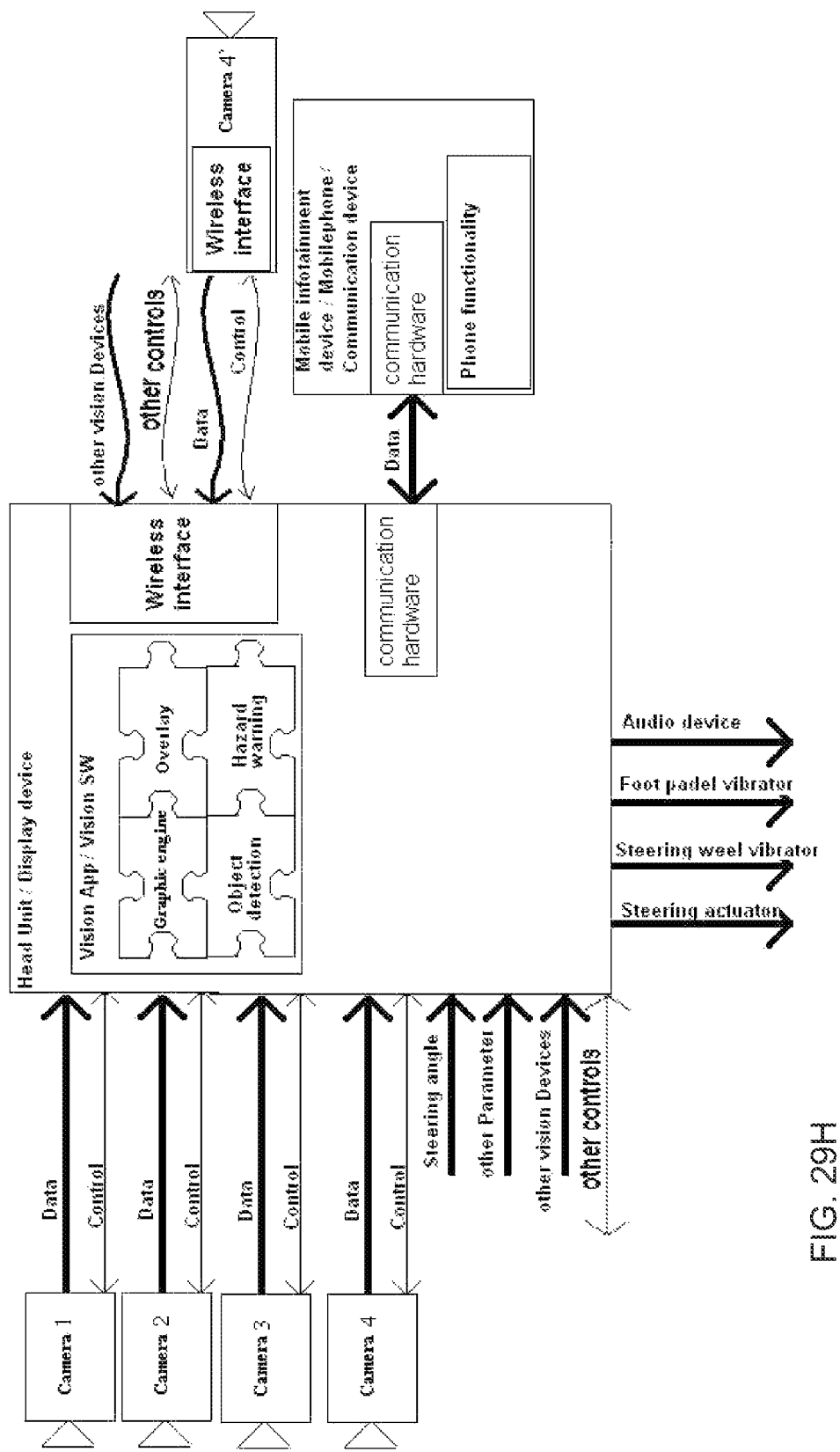
FIG. 29H is a schematic of an automotive vision or driver assistant system of the present invention consecutive to FIG. 29G, with a mobile phone or communication device attached additionally.
Figure 29I:
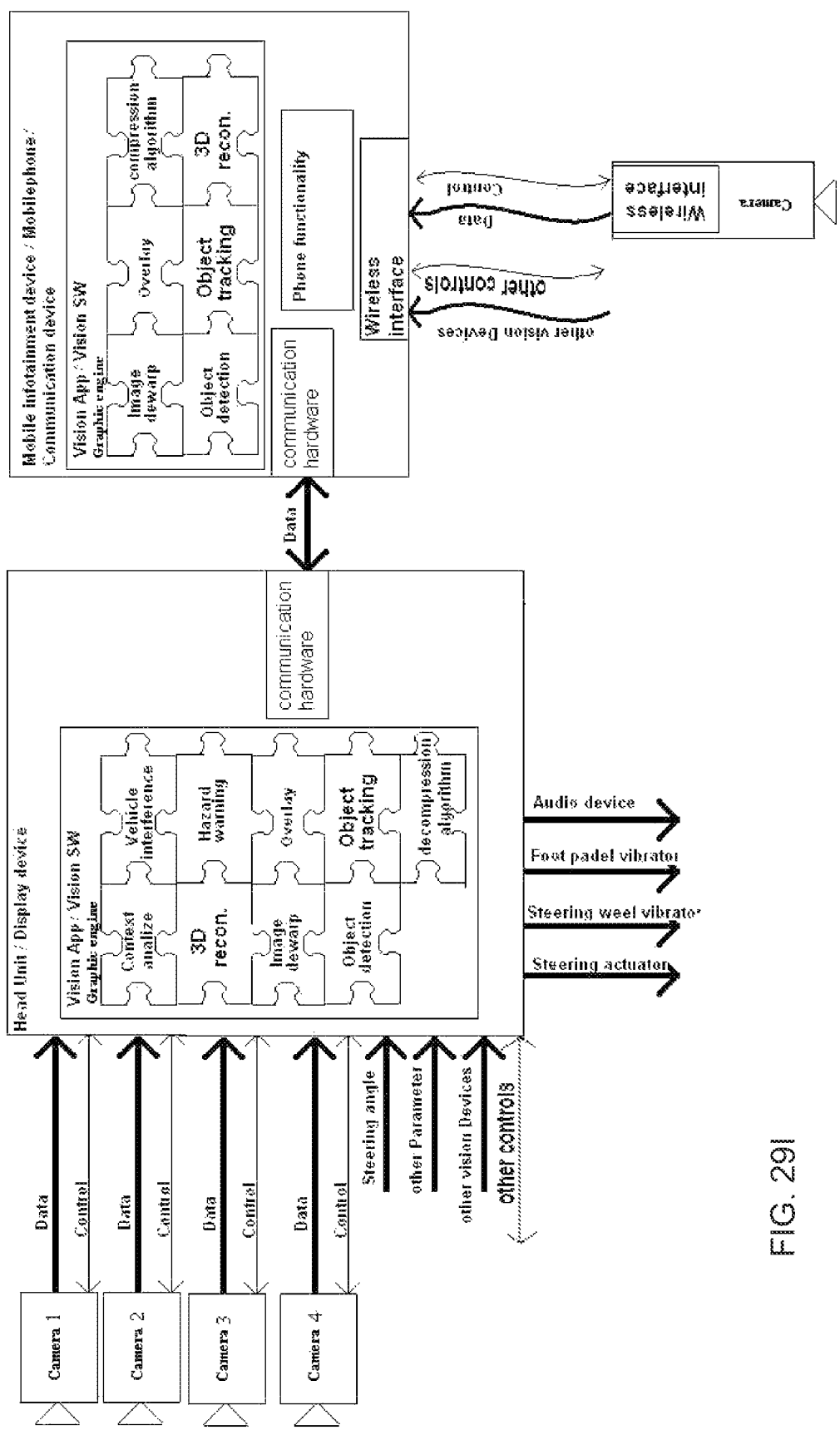
FIG. 29I is a schematic of an automotive vision system of the present invention consecutive to FIG. 29B, with a first graphic engine (or the image processing) running as an 'app' (application) or (evtl. additional) software on the head unit/display device's main control or on a graphic hardware, and with the head unit connected to a phone or communication device and with a wireless camera connected to the head unit via the connection to the phone or communication device and via a wireless communication hardware at the phone or communication device and with a second graphic engine (or the image processing) running as an 'app' (application) or (evtl. additional) software on the mobile device executing a first part of the image processing while the graphic engine on the head unit is processing a second or alternative part of image processing.
Figure 29J:
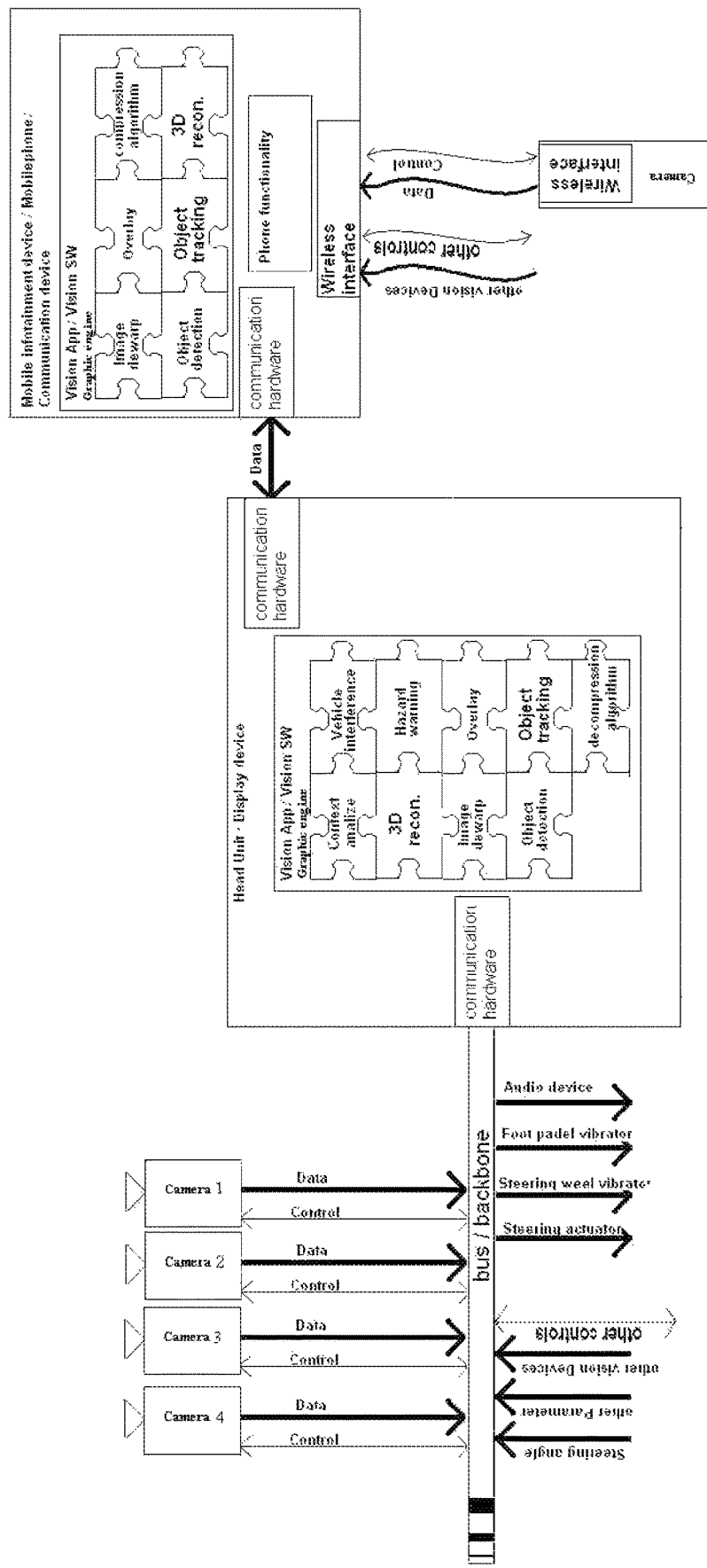
FIG. 29J is a schematic of an automotive vision system of the present invention consecutive to FIG. 29I, with a first graphic engine (or the image processing) running as an 'app' (application) or (evtl. additional) software on the head unit/display device's main control or on a graphic hardware, and with the head unit connected to a phone or communication device and with a wireless camera connected to the head unit via the connection to the phone or communication device and via a wireless communication hardware at the phone or communication device and with a second graphic engine (or the image processing) running as an 'app' (application) or (evtl. additional) software on the mobile device executing a first part of the image processing while the graphic engine on the head unit is processing a second or alternative part of image processing, with more than one vehicle inherent cameras, other vision devices, other sensors and other outputs and actuators attached to a common bus or backbone for exchanging data and commands.
Figure 29K:
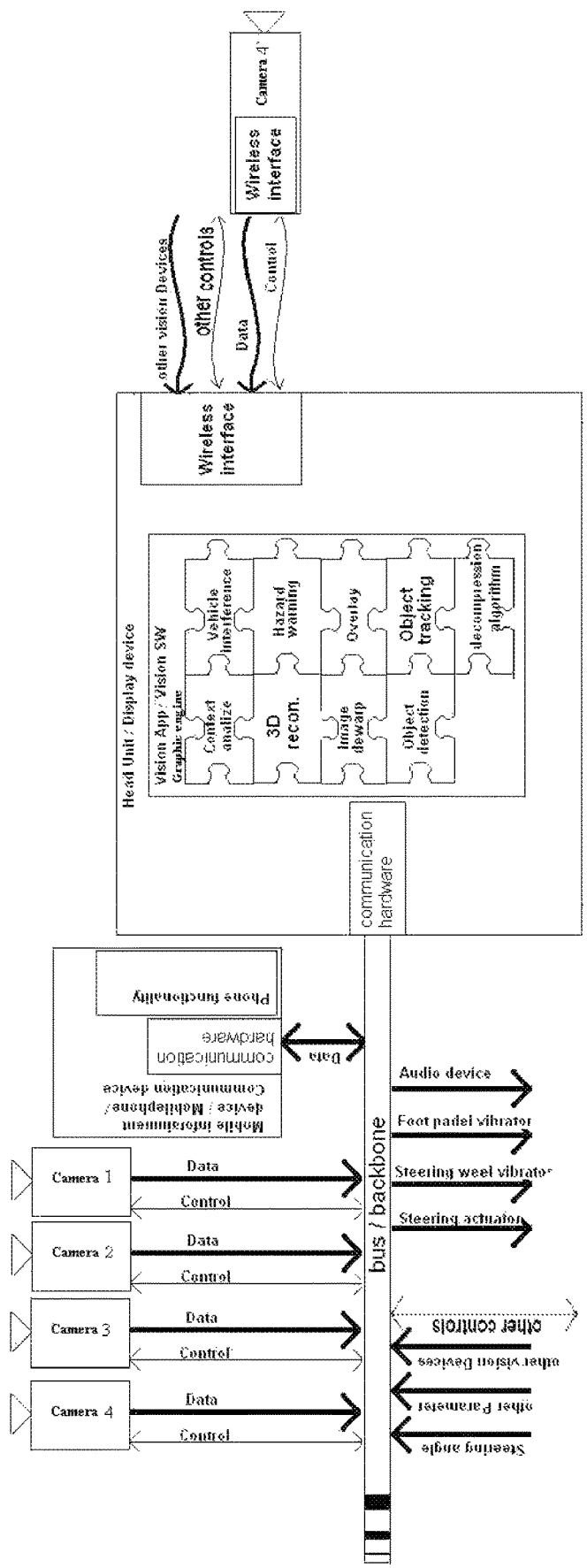
FIG. 29K is a schematic of an automotive vision system of the present invention consecutive to FIGS. 29I and 29J, with a graphic engine (or the image processing) running as an 'app' (application) or (evtl. additional) software on the head unit/display device's main control or on a graphic hardware, and with a wireless camera connected to the head unit/display device via a wireless communication hardware at it and with more than one vehicle inherent cameras, other vision devices, other sensors and other outputs and actuators attached to a common bus or backbone for exchanging data and commands.
Figure 29L:
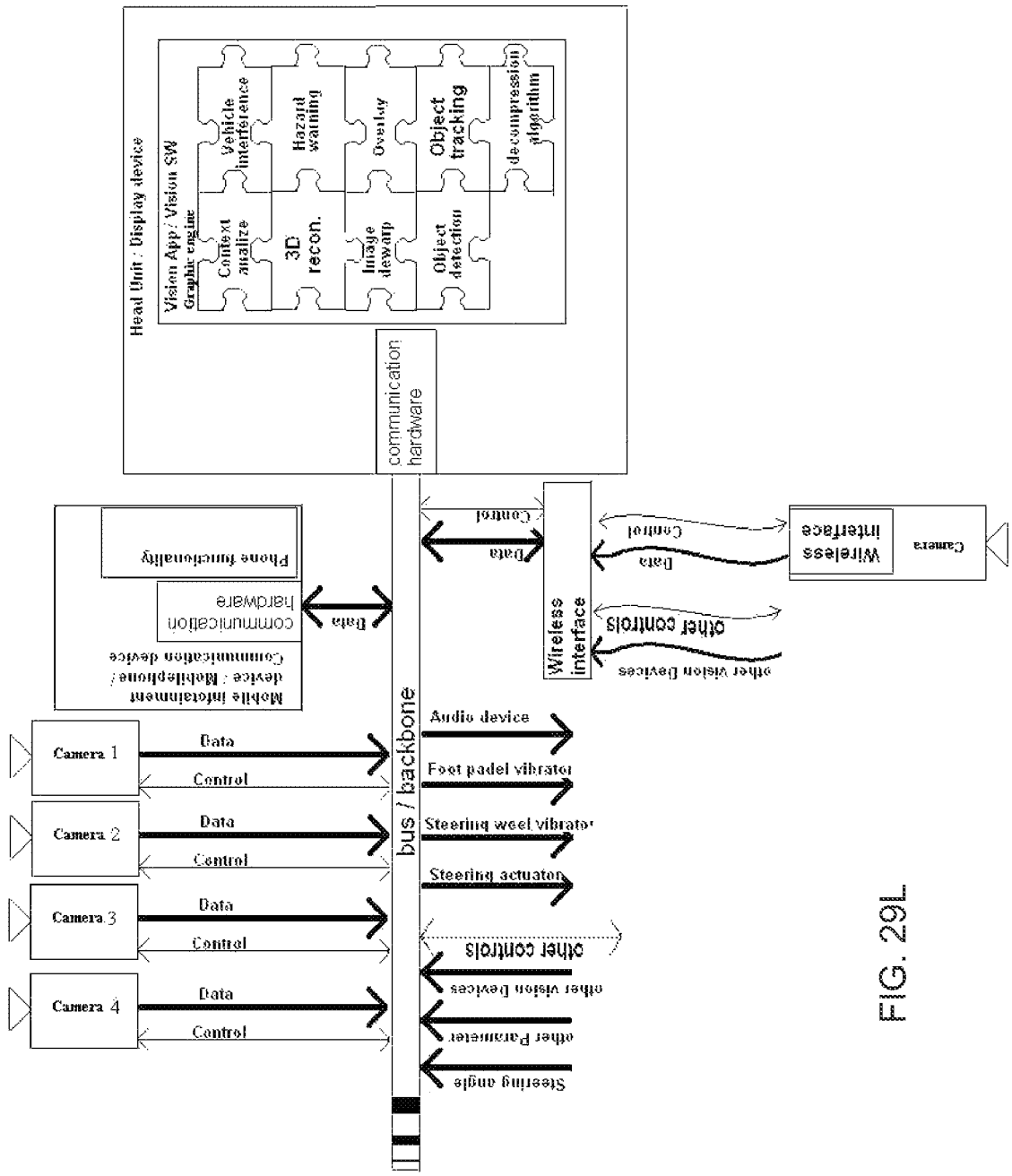
FIG. 29L is a schematic of an automotive vision system of the present invention consecutive to FIGS. 29I to 29J, with a graphic engine (or the image processing) running as an 'app' (application) or (evtl. additional) software on the head unit/display device's main control or on a graphic hardware, and with a bus or backbone connected to the head unit and with several vehicle inherent cameras connected to the head unit via the back bone and with wireless camera connected via wireless communication to a wireless communication device which is itself to the head unit/display device via the backbone and with other vision devices, other sensors and other outputs and actuators attached to a common bus or backbone for exchanging data and commands.

(6) A continuative idea from (5), above, is to have the head unit connected to a phone or communication device and to one or more cameras (see FIG. 29A).

Figure 30:
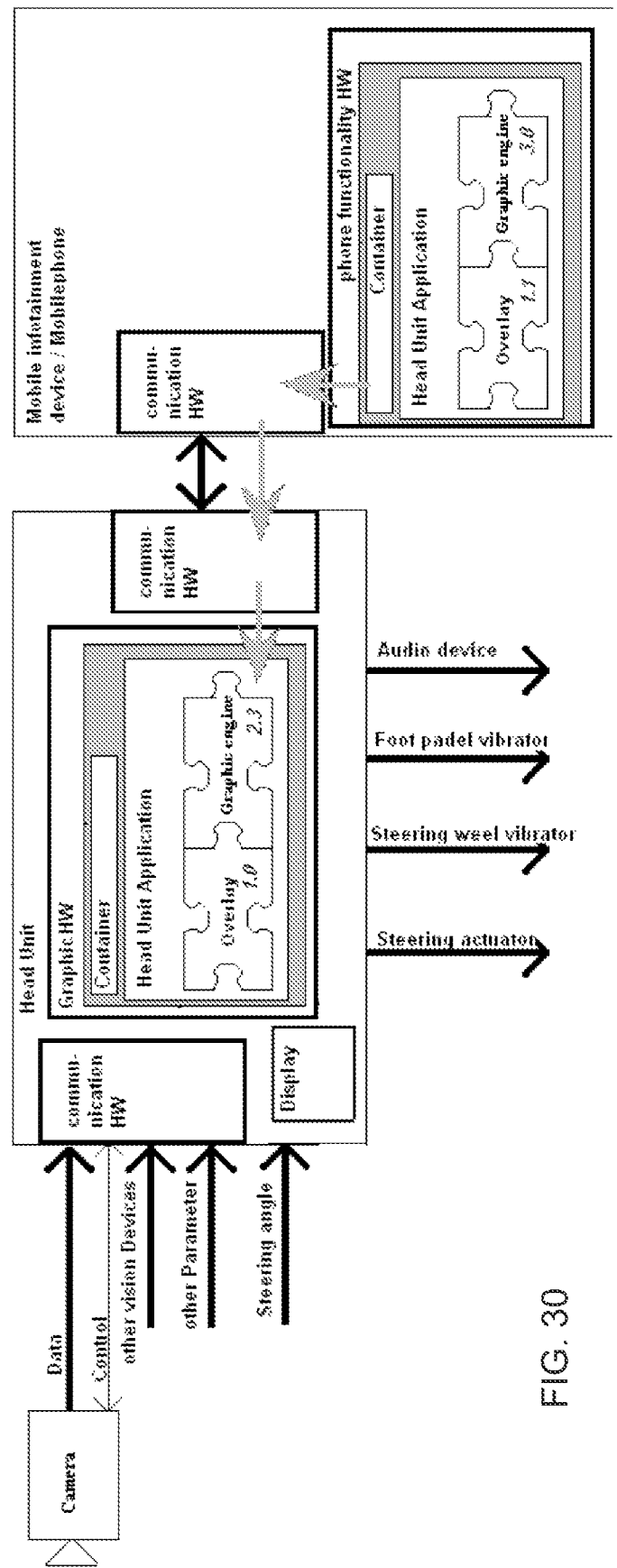
FIG. 30 is a schematic of an automotive vision system of the present invention, with the head unit connected to at least one camera and a phone or communication device in accordance with FIG. 29A, and with the image processing software running mainly on the head unit or other display device, wherein the image processing software becomes updated from a remote device by transferring a data container containing an updated version of software.

(7) As a continuative idea to (6), above, the image processing software is running primarily on the head unit. The image processing software becomes updated from a remote source or device by transferring a data container containing an updated version of the image processing software. The container is a frame which is made individually for each vehicle communication environment. The content is preferably vehicle type and manufacturer independent, so the content may be substantially standardized to keep the variety low. Preferably, the communication device enables an app to carry the container. The container may also be transported by an audio (voice) channel, SMS, MMS, DSRC, near field communication, via a pier to pier protocol and/or the like (see FIG. 30). An alternative is to provide updates by a data medium, a removable cable or an OEM's service interface, either connected to a vehicle's port, a head unit's port, a communication device's port or a vision device's port.

Figure 31:
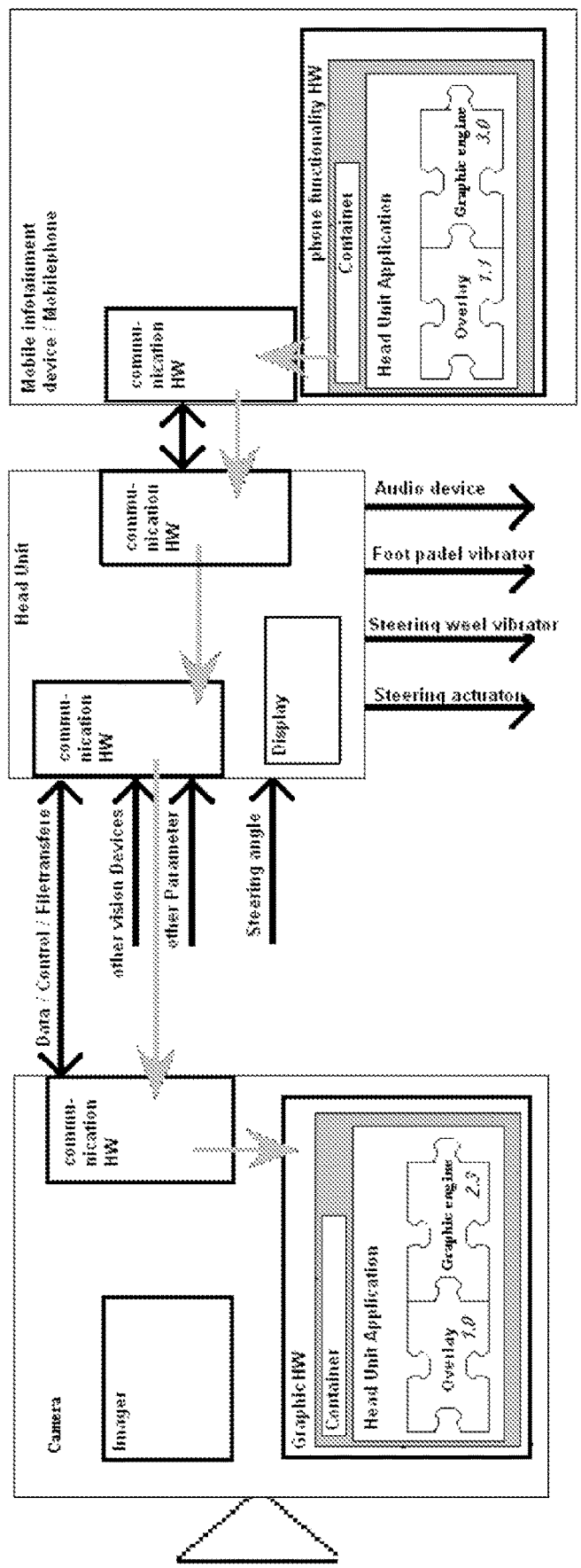
FIG. 31 is a schematic of an automotive vision system of the present invention, with the head unit or other display device connected to at least one camera and a phone or communication device in accordance with FIG. 29A, and with a bidirectional data channel established between the camera and the head unit, and wherein the image processing software is running mainly on the camera, but there may be parts of image processing software that is running on the head unit or at a mobile 'app', with the image processing software in the camera (and evtl. also these of the head unit and/or communication device) becoming updated from a remote device or communication by transferring a data container containing an updated version of software from the communication device to the camera, preferably over the head unit, and eventually directly via a common bus.

(8) In cases where the hardware set up allows bidirectional communication between the head unit and the camera(s) and a phone or communication or between the communication device and the camera(s) directly, there is a continuative idea to (7), above, which may update the camera(s) image processing software by remote transferring data containers via the communication channels mentioned in (7) or by a common bus, or by an OEM service interface within a data container, from the communication device over the head unit to the camera. This may occur at once or step by step. There may be a part of the image processing software at the head unit, and this may be updated as well with the same or a different data container, at the same or another time (see FIG. 31).

(9) An addition solution to (7) and (8), above, is to have data security protocols in place making sure no data in the head unit, camera(s) or communication device or conjuncted system's software becomes overwritten or corrupted by wrong versions or by draft versions, or unauthorized versions, or by incomplete data sets or incompatible data sets, or by pirated versions or data sets, or virulent data sets, and/or the like. This task may also be managed by the data container's functionality.

(10a) The data of (9) preferably have been authorized by an application provider or distributor, the camera or image system software provider or distributor or the according OEM in compliance to the local or worldwide legal or OEM's safety standards and testing procedures for safety relevant software and non-safety relevant software, whichever may apply for the particular application.

Figure 29M:
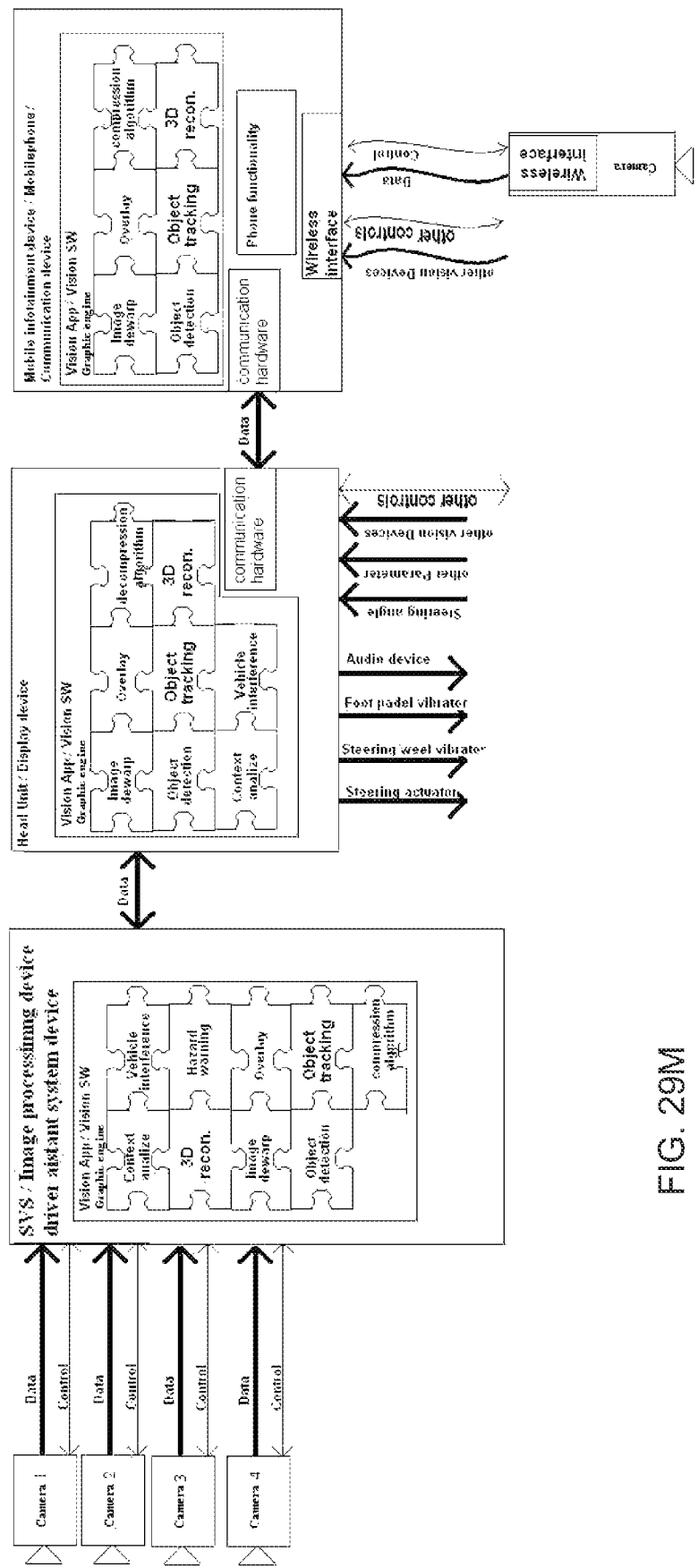
FIG. 29M is a schematic of an automotive vision system of the present invention consecutive to FIGS. 29I to 29L, with the image processing is running as an 'app' (application) or (evtl. additional) software or hardware in part on a communication device and in part on a dedicated vehicle inherent image processing device (SVS) and/or in part on a head unit/display device, with the devices interconnected to each other by data lines buses or back bones, and with a wireless camera attached via wireless connection to the communication device, and with the actuators mainly connected to the central display device, and with the central display device optionally displaying data coming from the wireless camera and coming from the vehicle inherent cameras.

(10b) As an additional or alternative solution, the image processing may be done in part on the mobile device or cellular phone or smart phone and in part on the head unit or other display device and/or in part in a dedicated image processing unit (see FIG. 29M).

Figure 39:
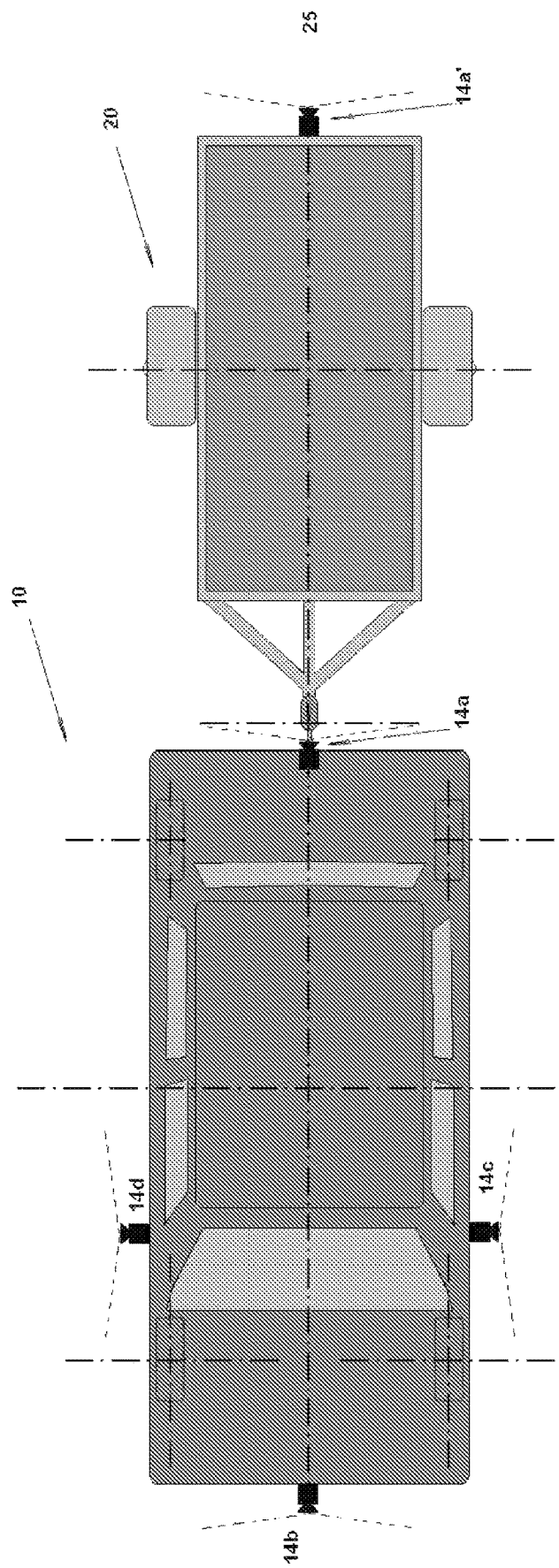
FIG. 39 is a schematic of a vehicle (10) viewed from top down with a one axis trailer (20) hooked on, wherein the trailer has its own rear camera (14a'), which may be connected by wire or wireless to the vehicle's vision devices or a cell phone displaying the area of view (25) of the trailer rear camera on a display or incorporating the image data information on a machine vision assist system in accordance with the present invention.
Figure 40:
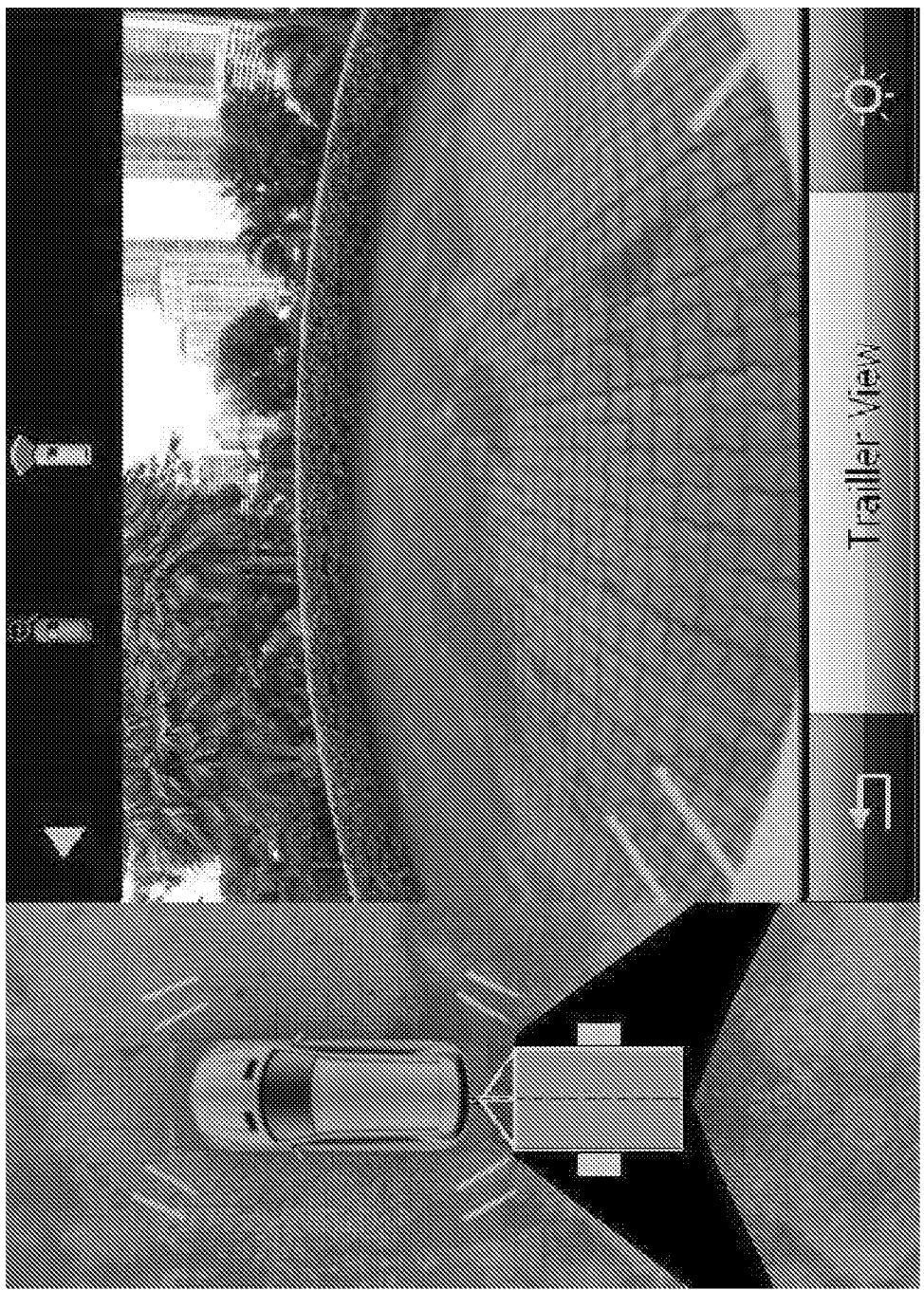
FIG. 40 is an exemplary view of a vehicle top view when an additional trailer camera (such as of the type shown in the set up of FIG. 39) sends images that are incorporated to the top view of the vehicle's main display device.
Figure 41:
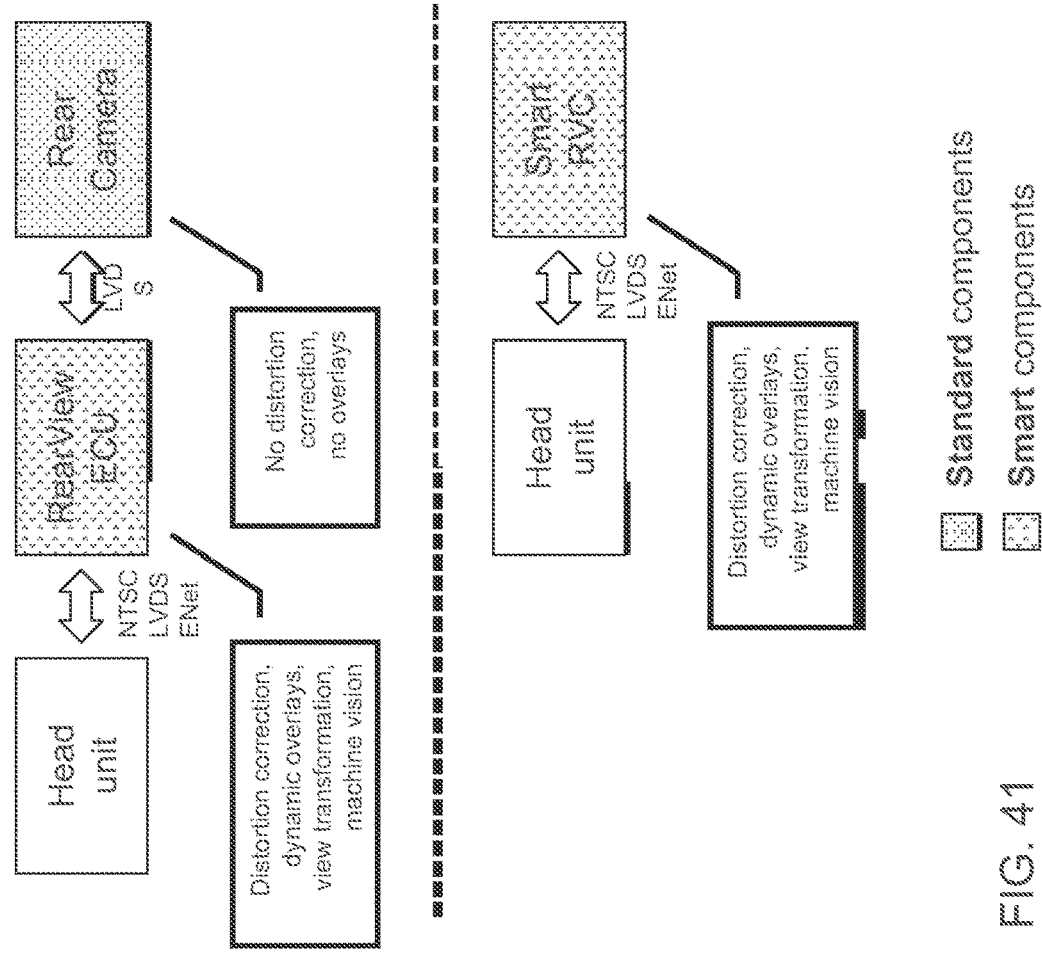
FIG. 41 shows an overview of a smart camera suitable for use with a vision system of the present invention.
Figure 42:
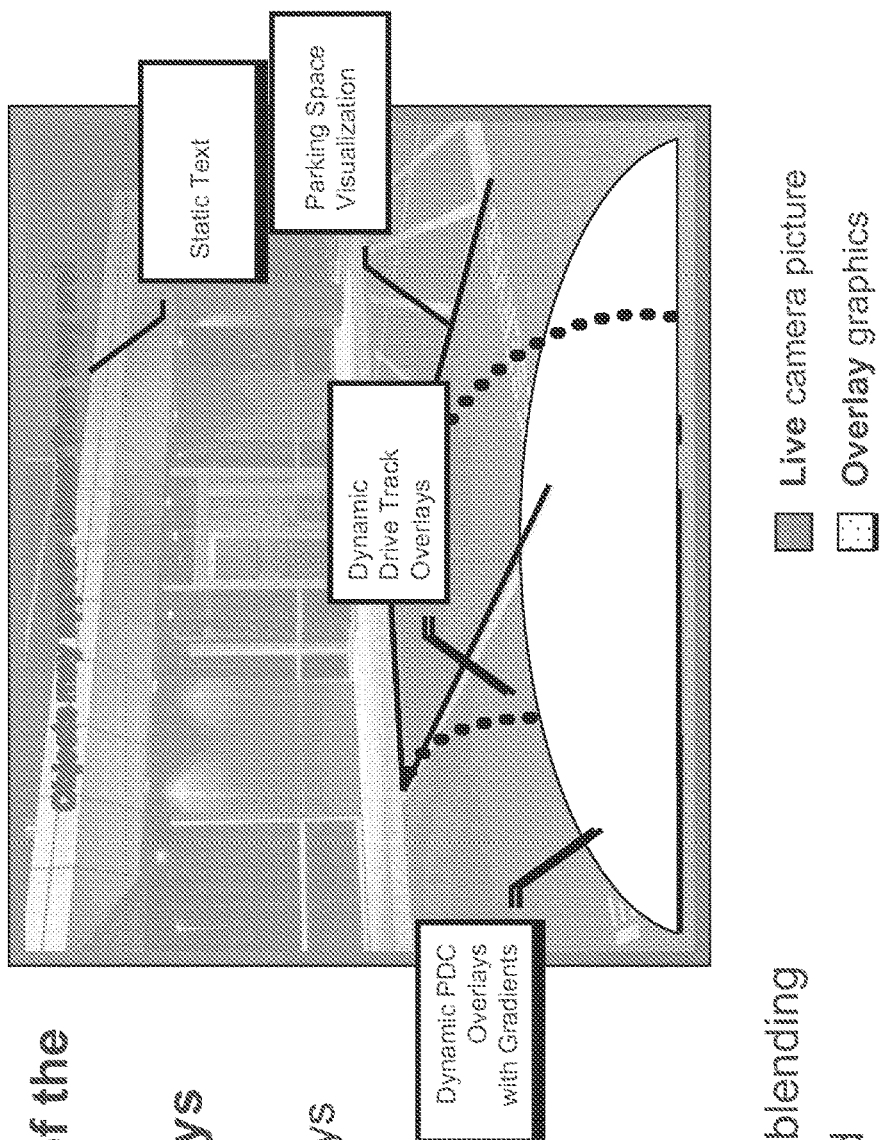
FIG. 42-44 show view transformation and machine vision capabilities of the smart camera of FIG. 41.
Figure 43:
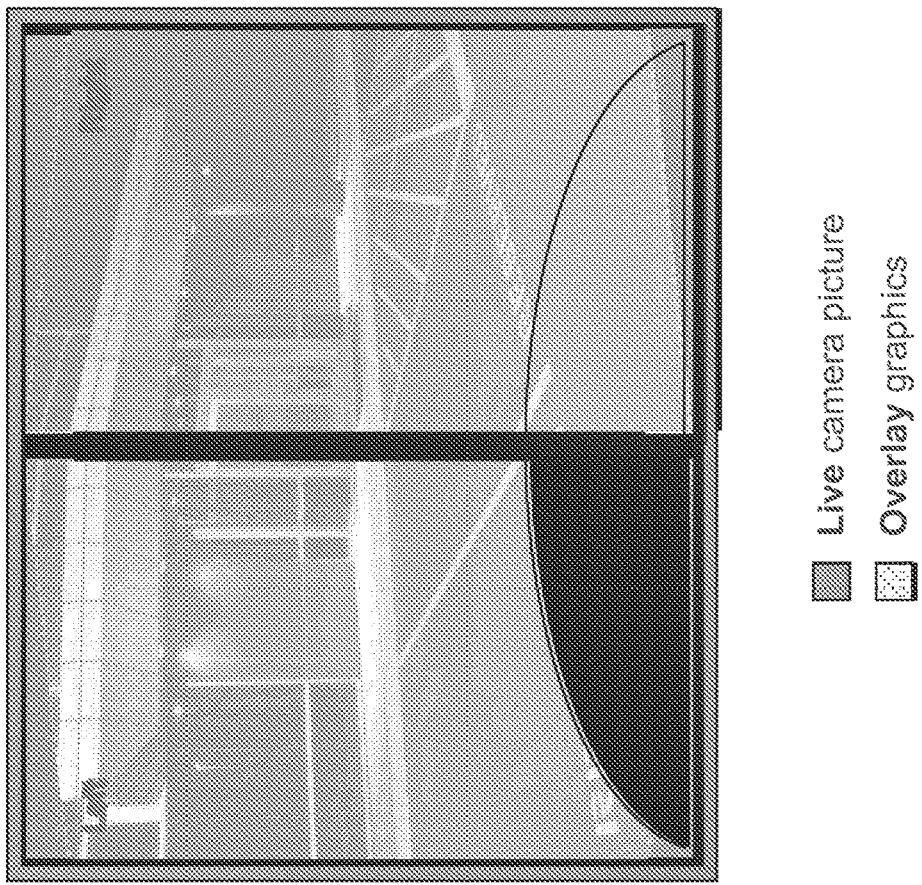
Figure 44:
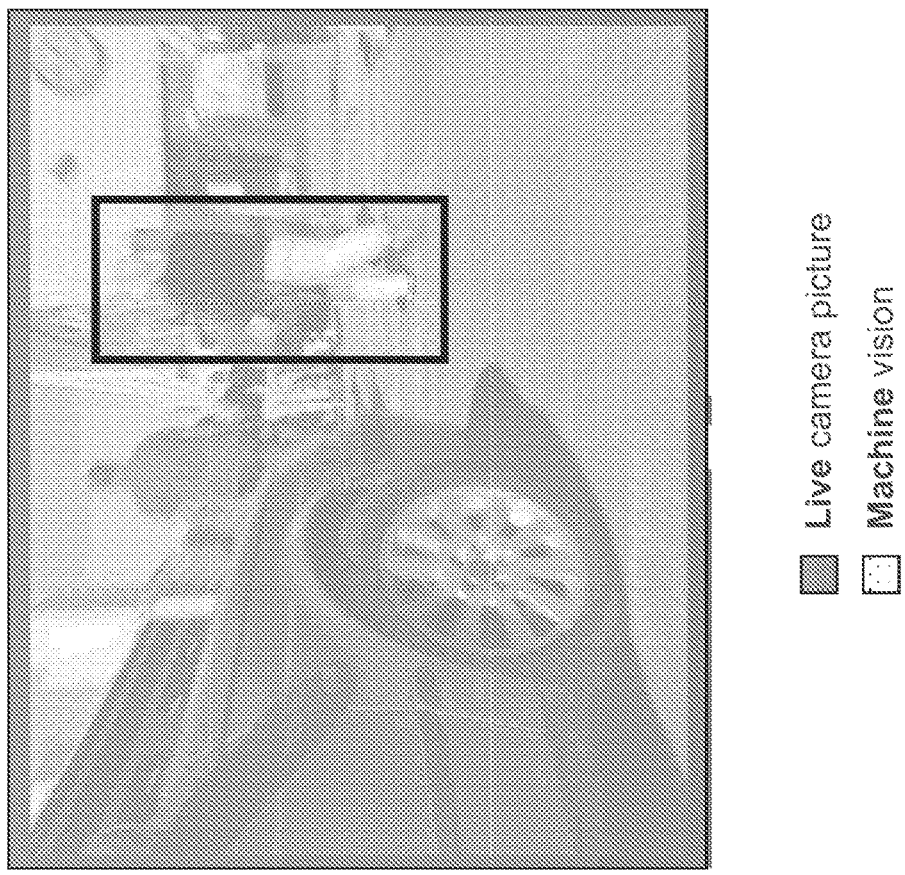
Figure 47:
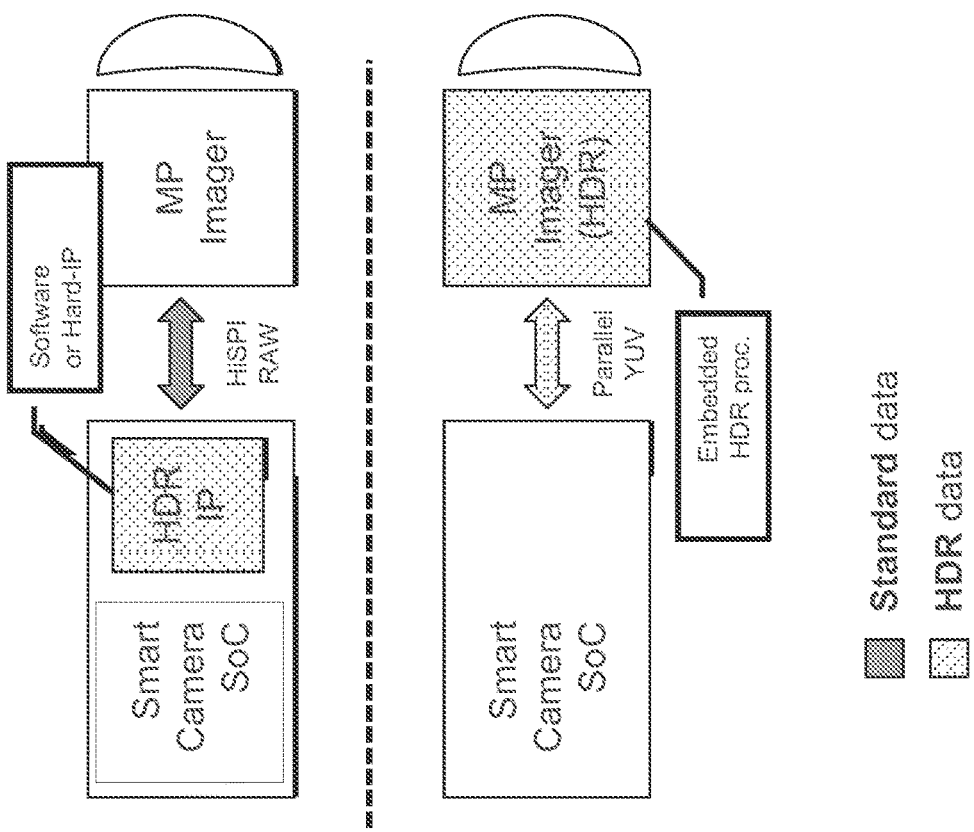
Figure 48:
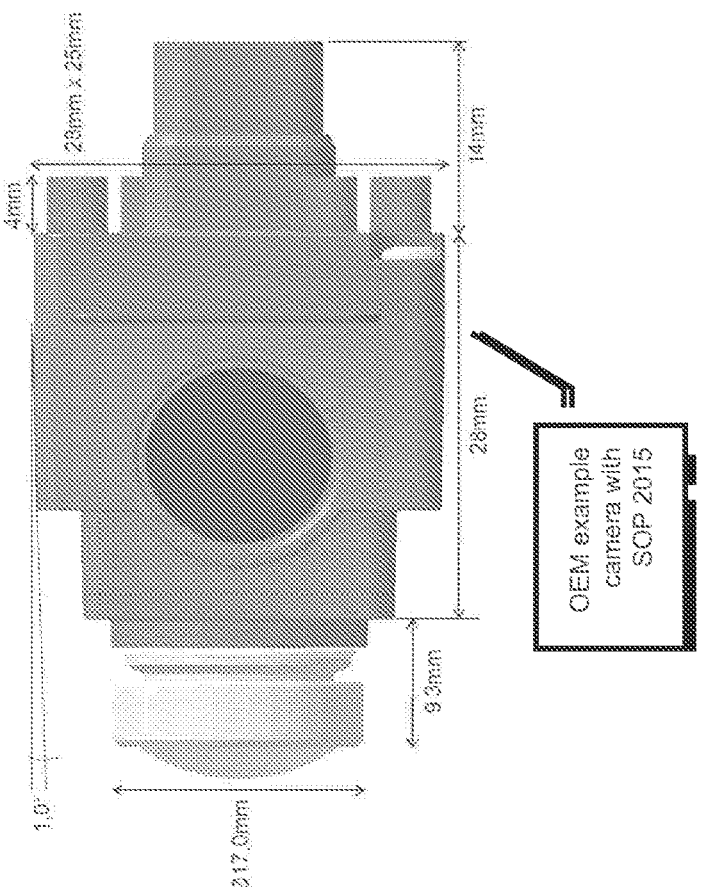
Figure 49:
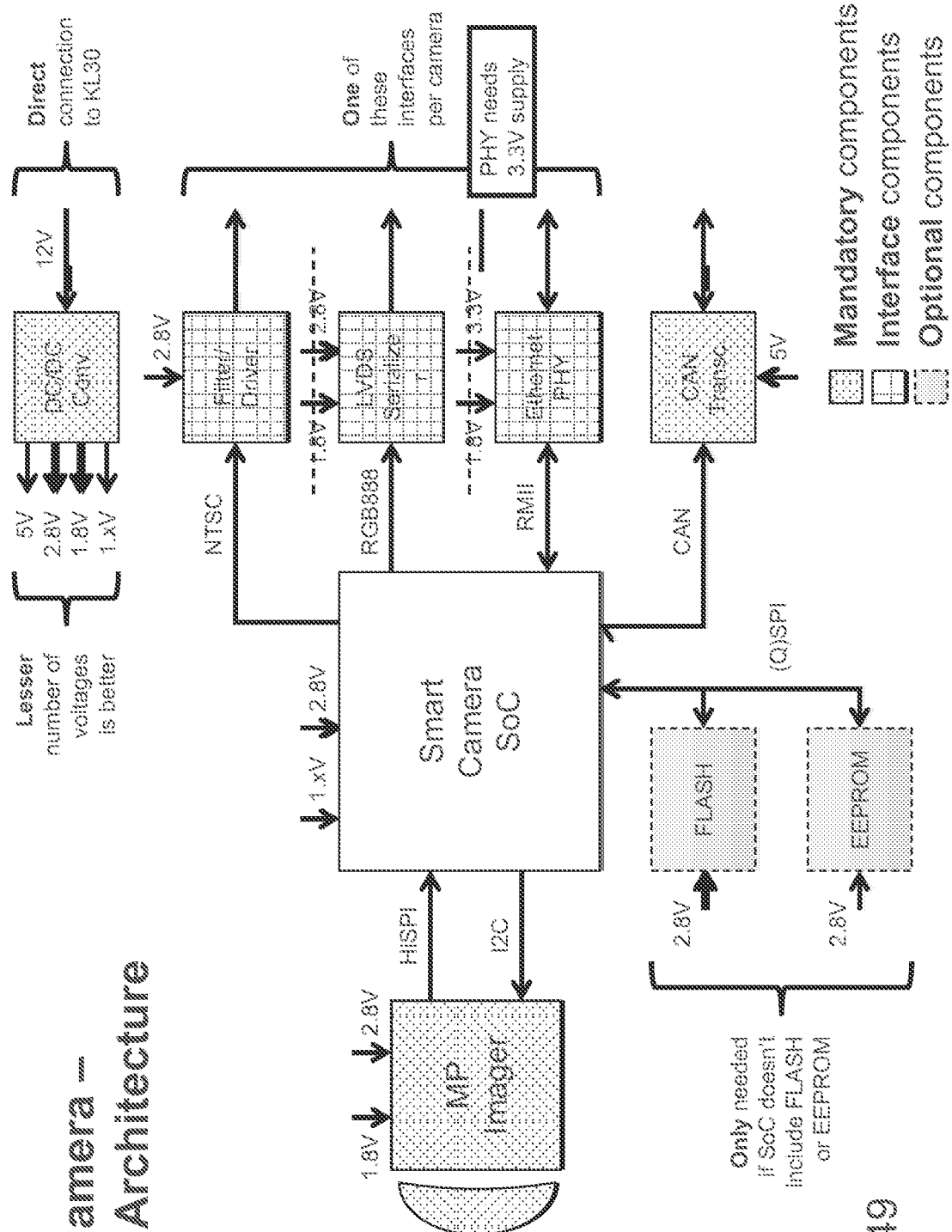
Figure 50:
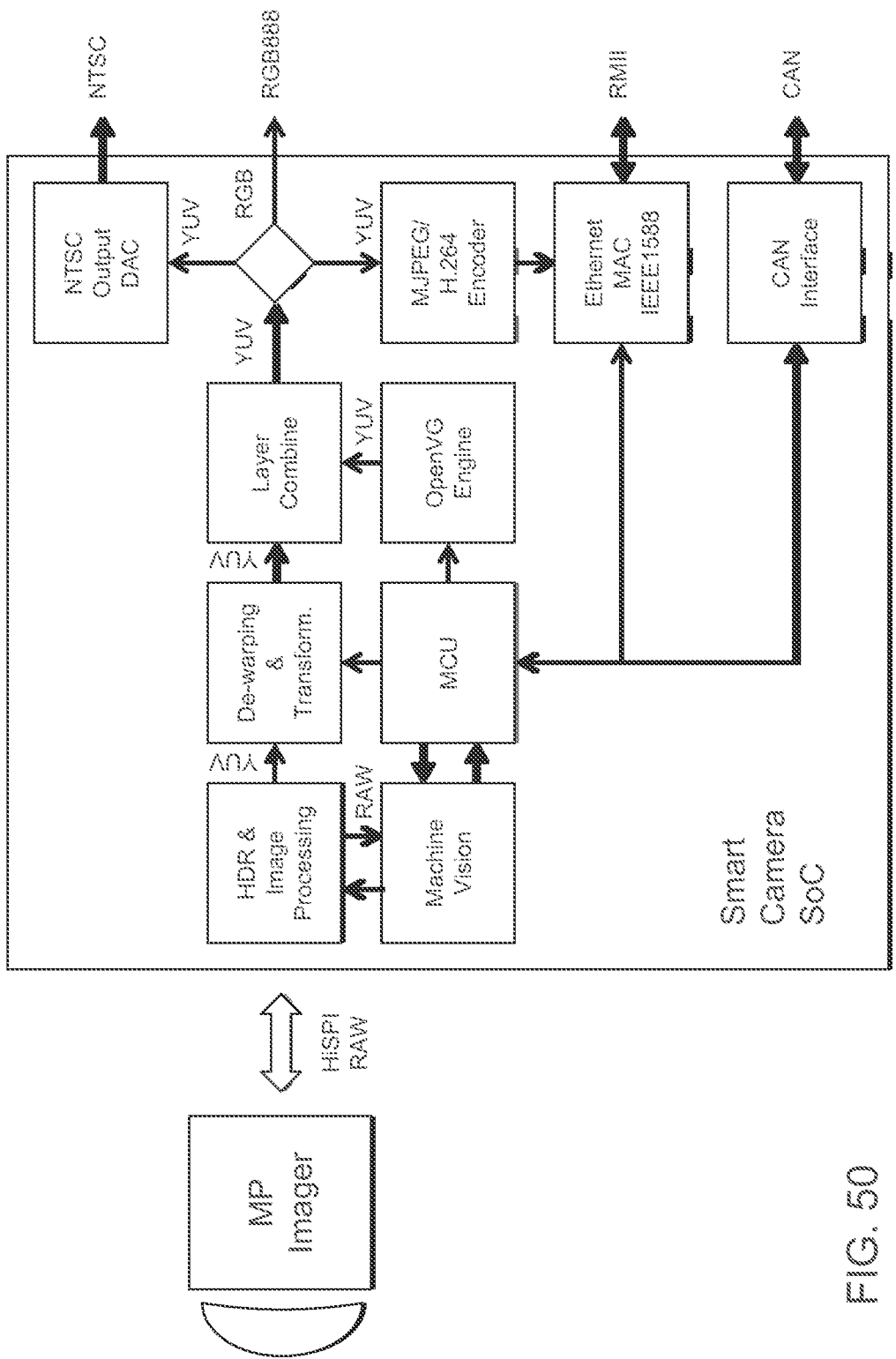
Figure 51:
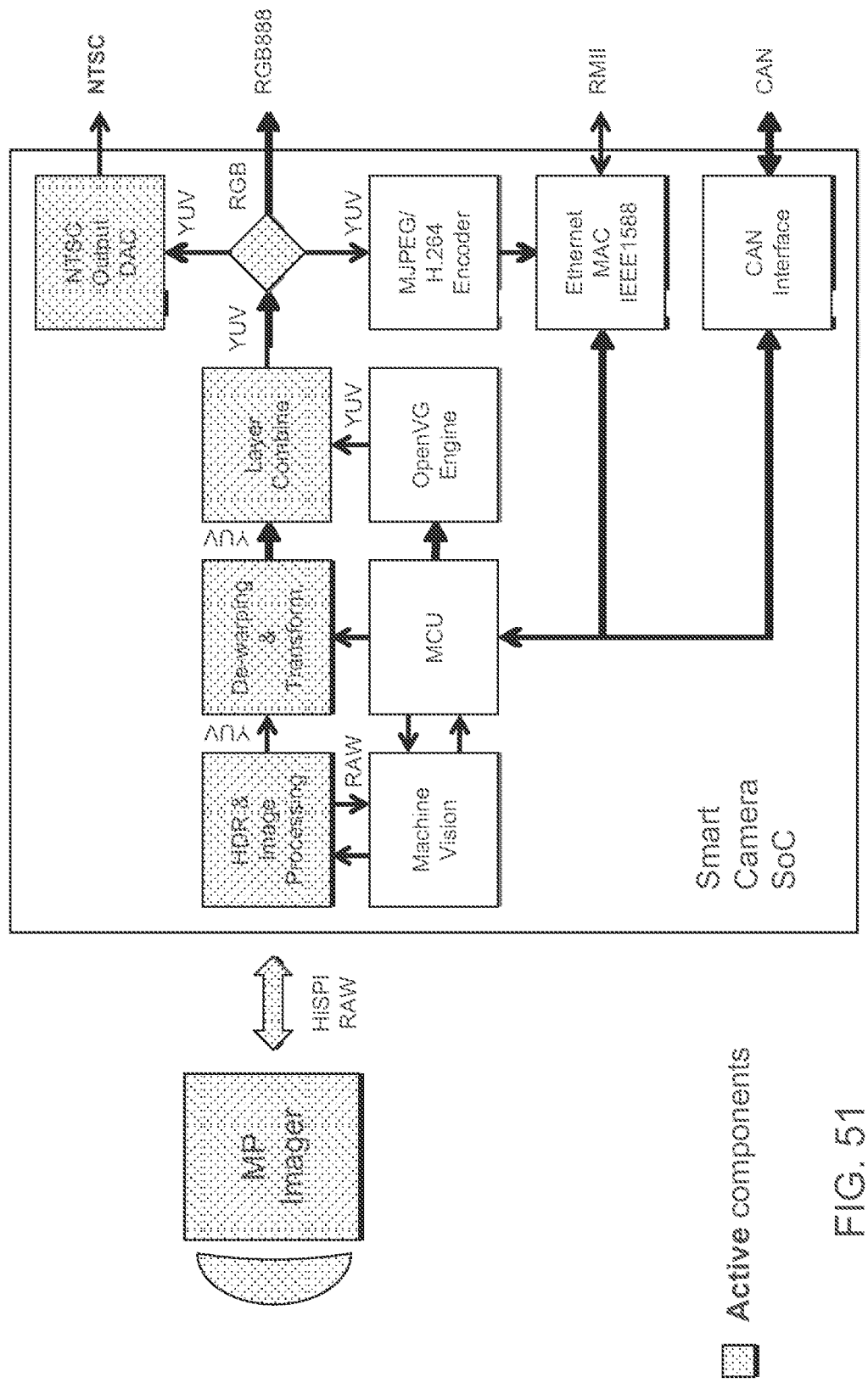
Figure 52:
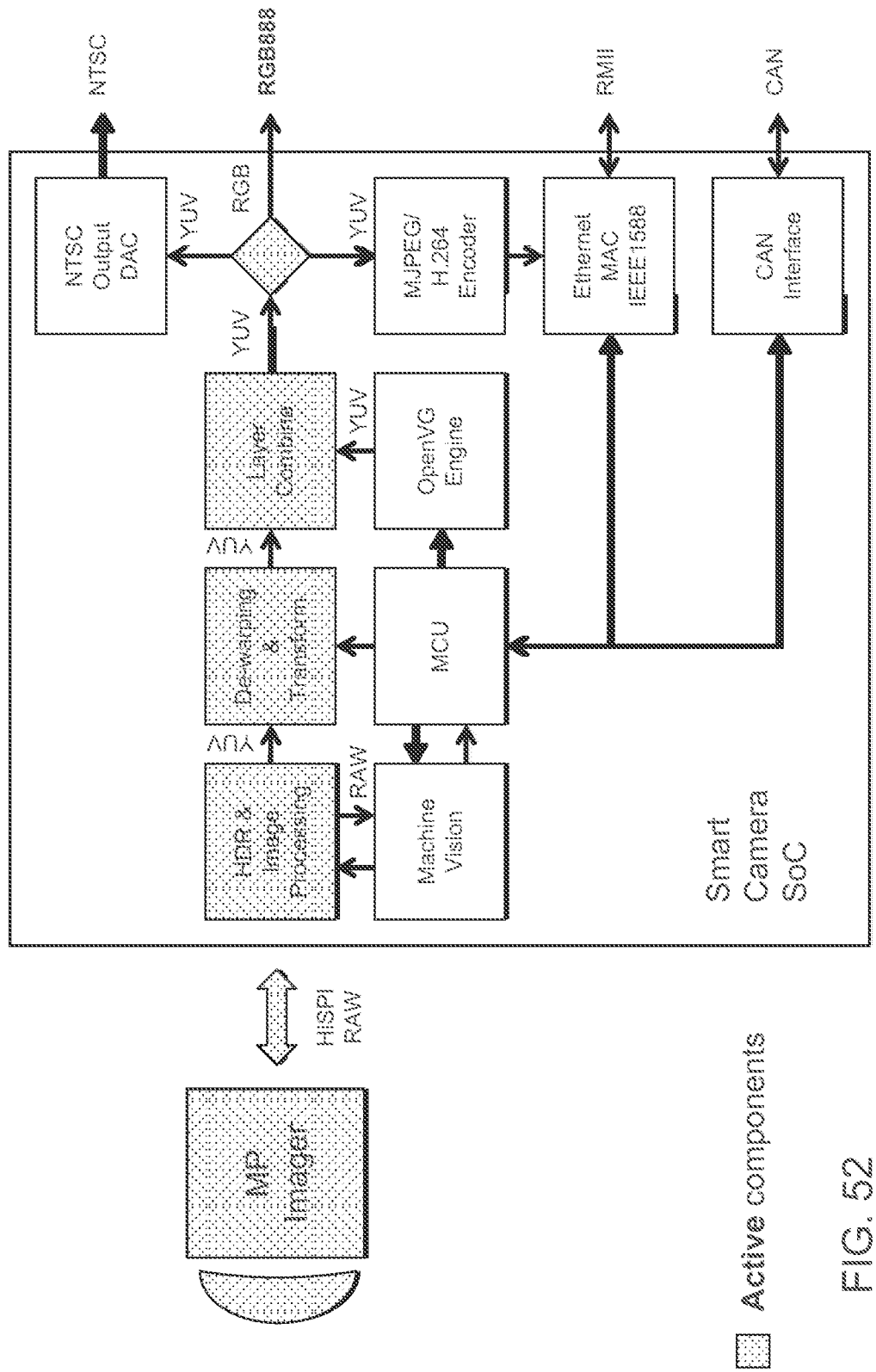
Figure 53:
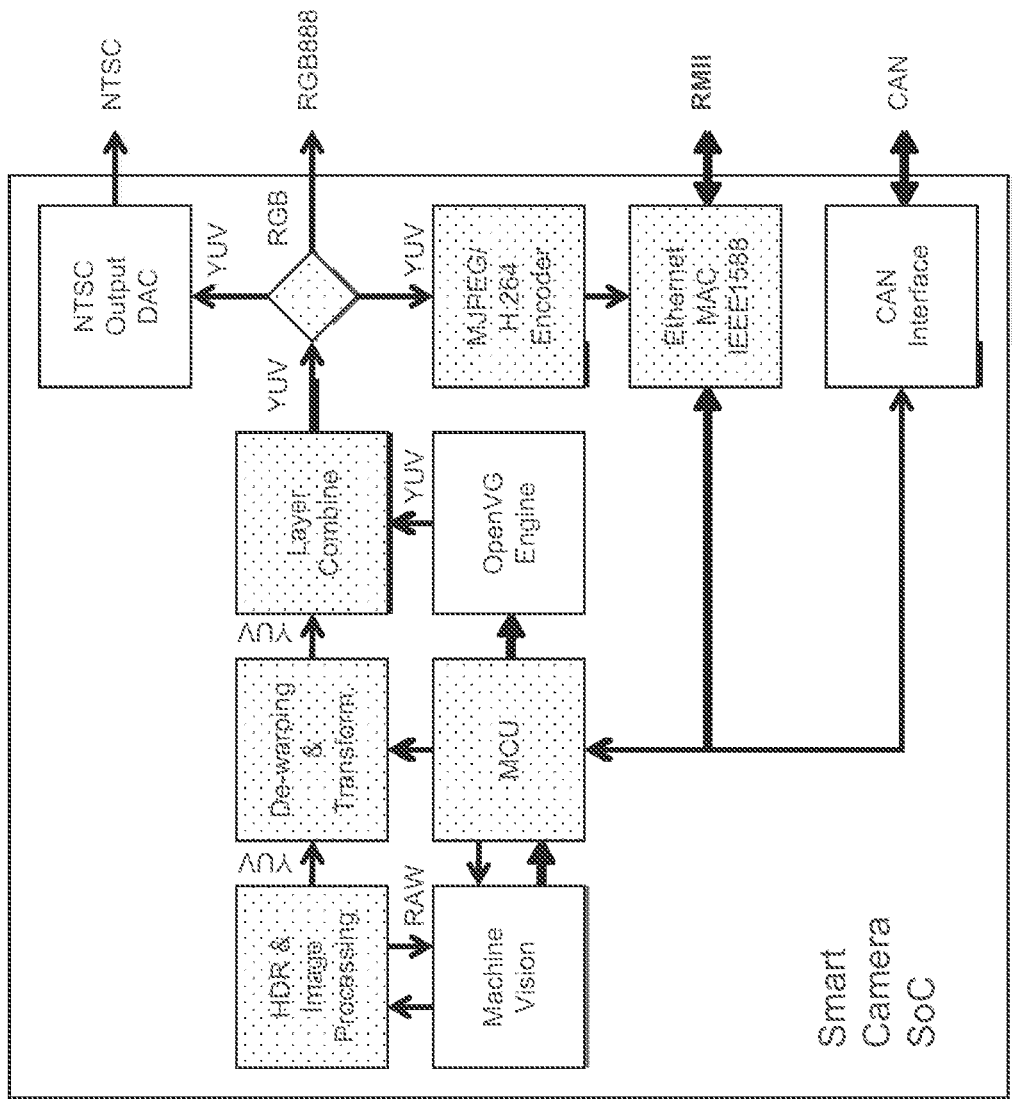
Figure 54:
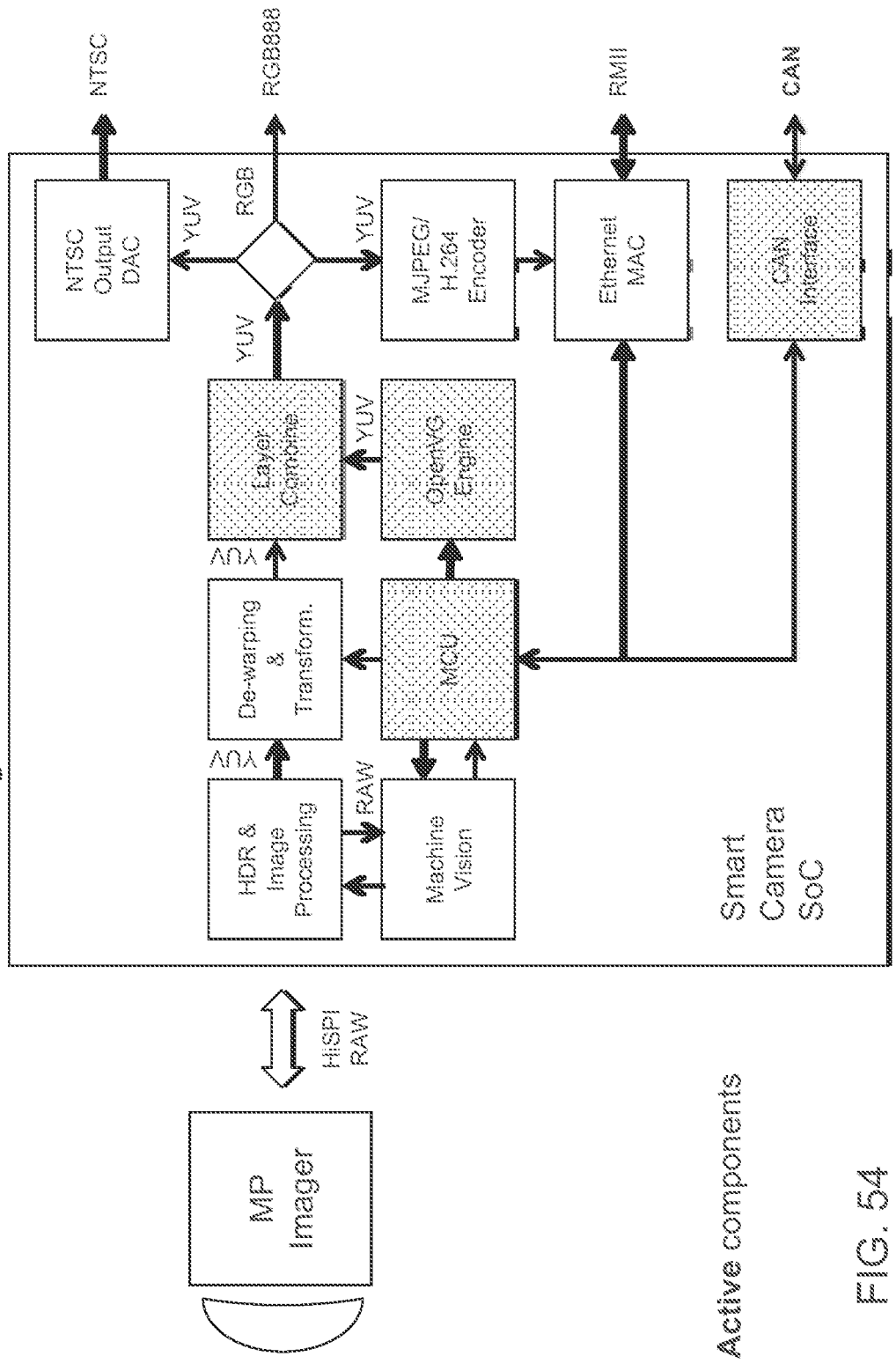
Figure 55:
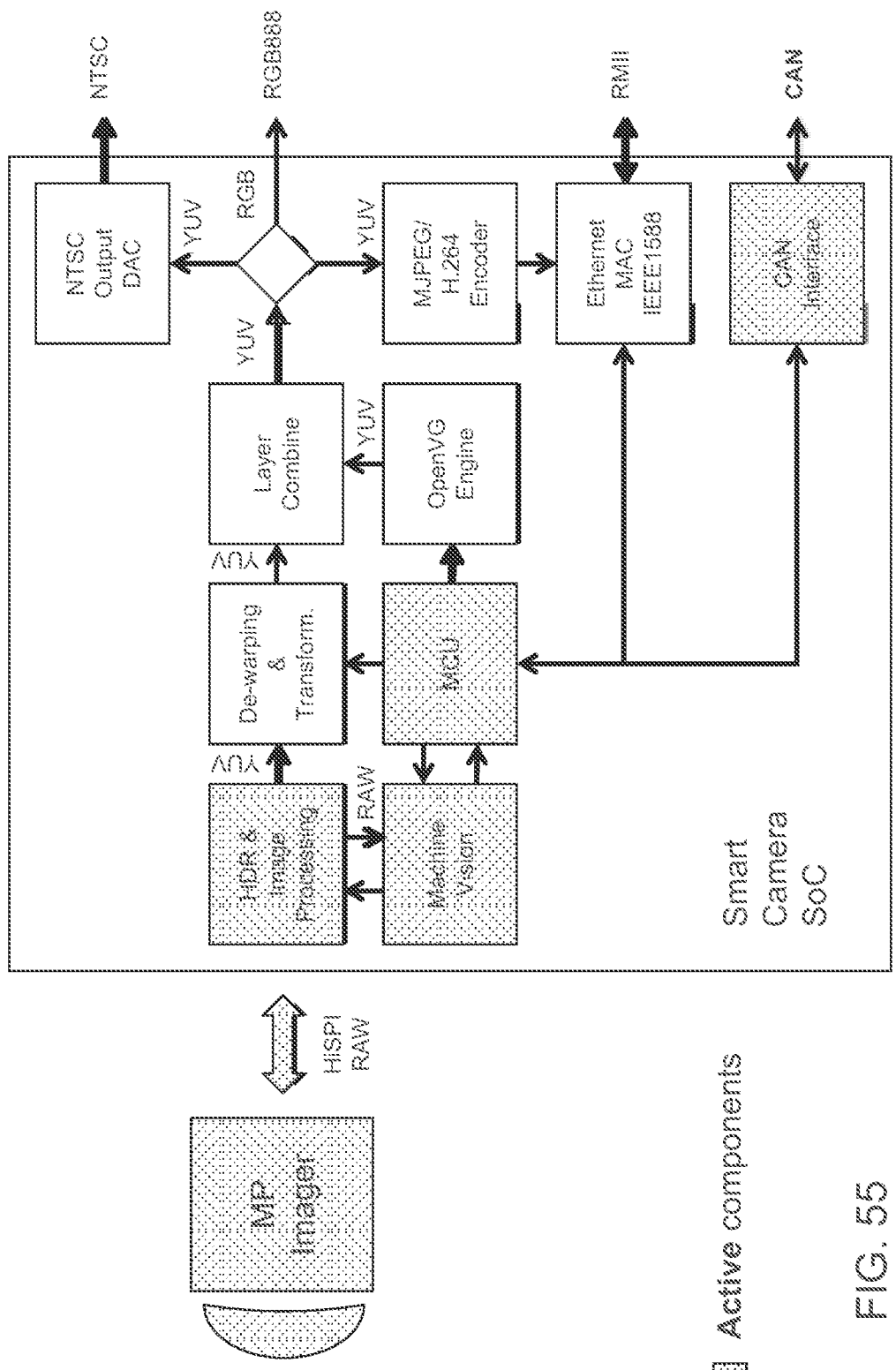
Figure 56:
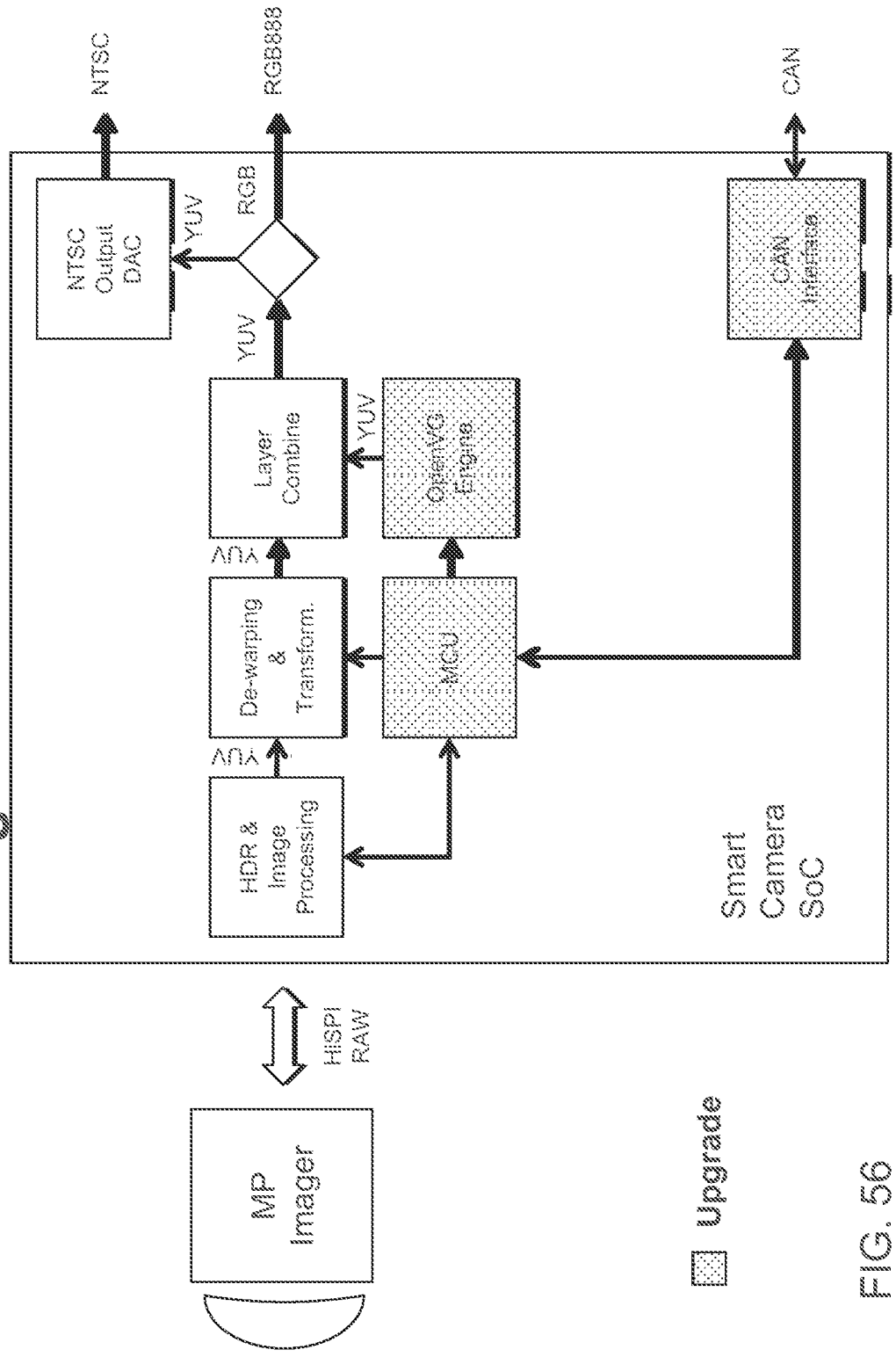
Figure 57:
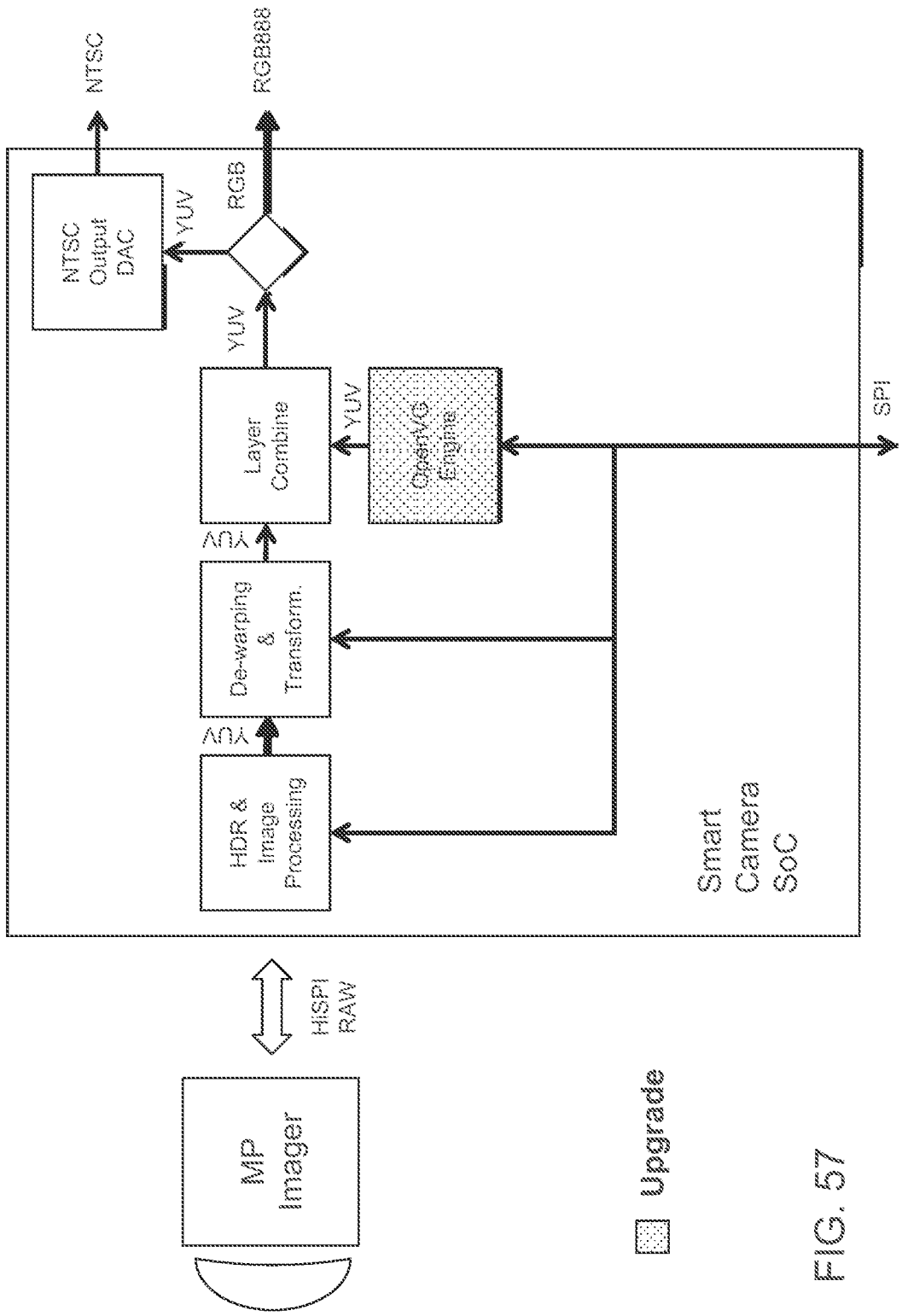
Figure 58:
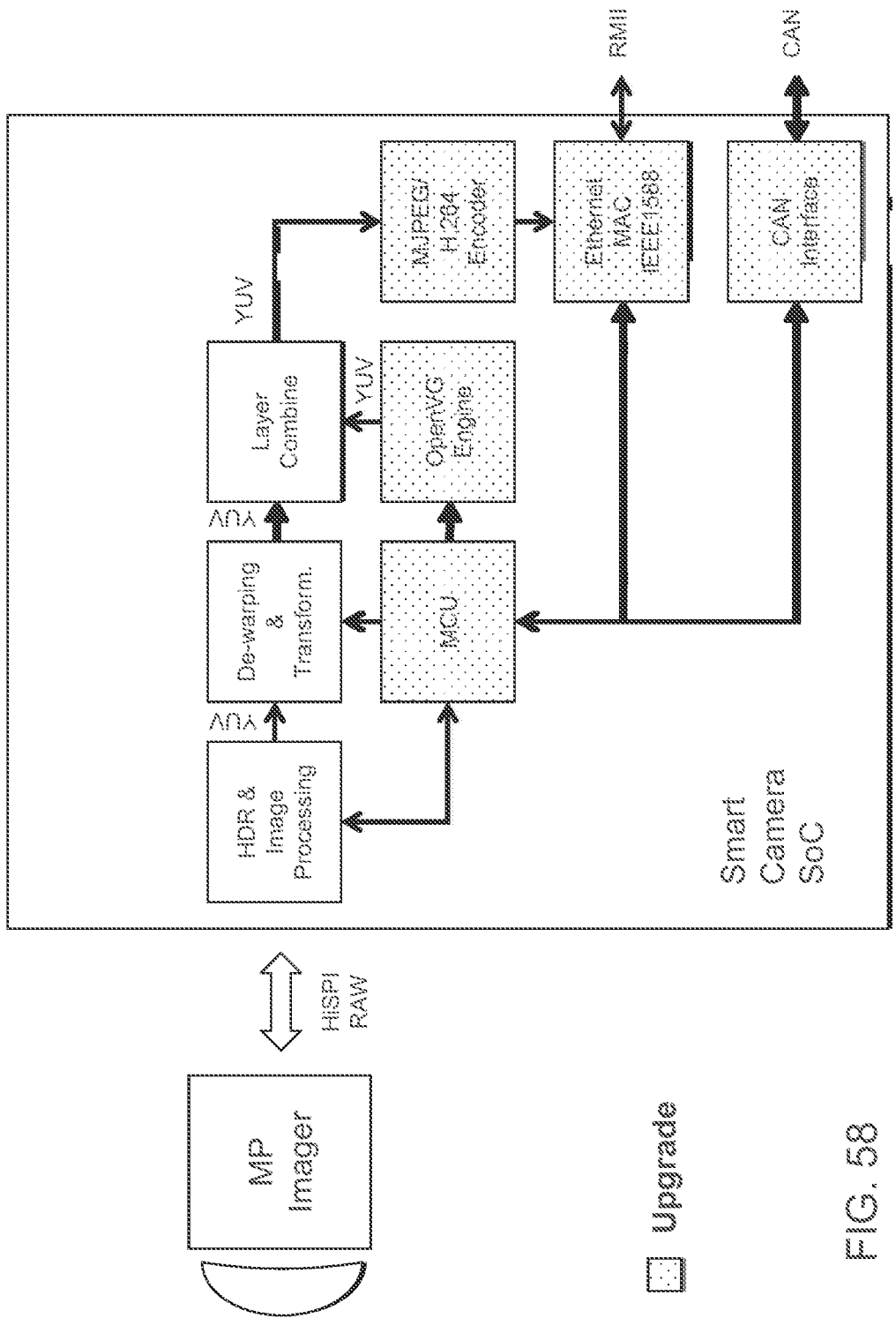
Figure 59:
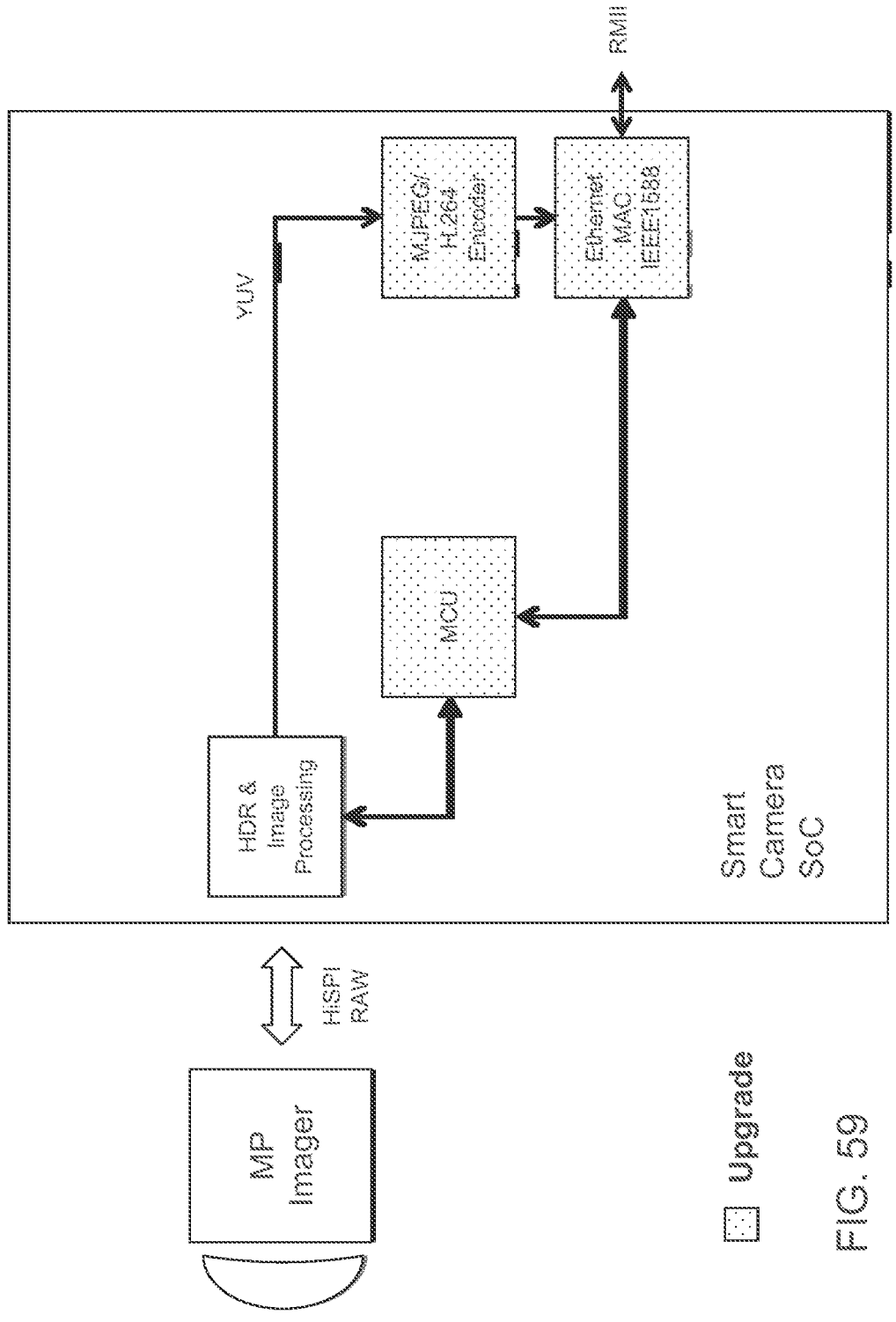
Figure 64:
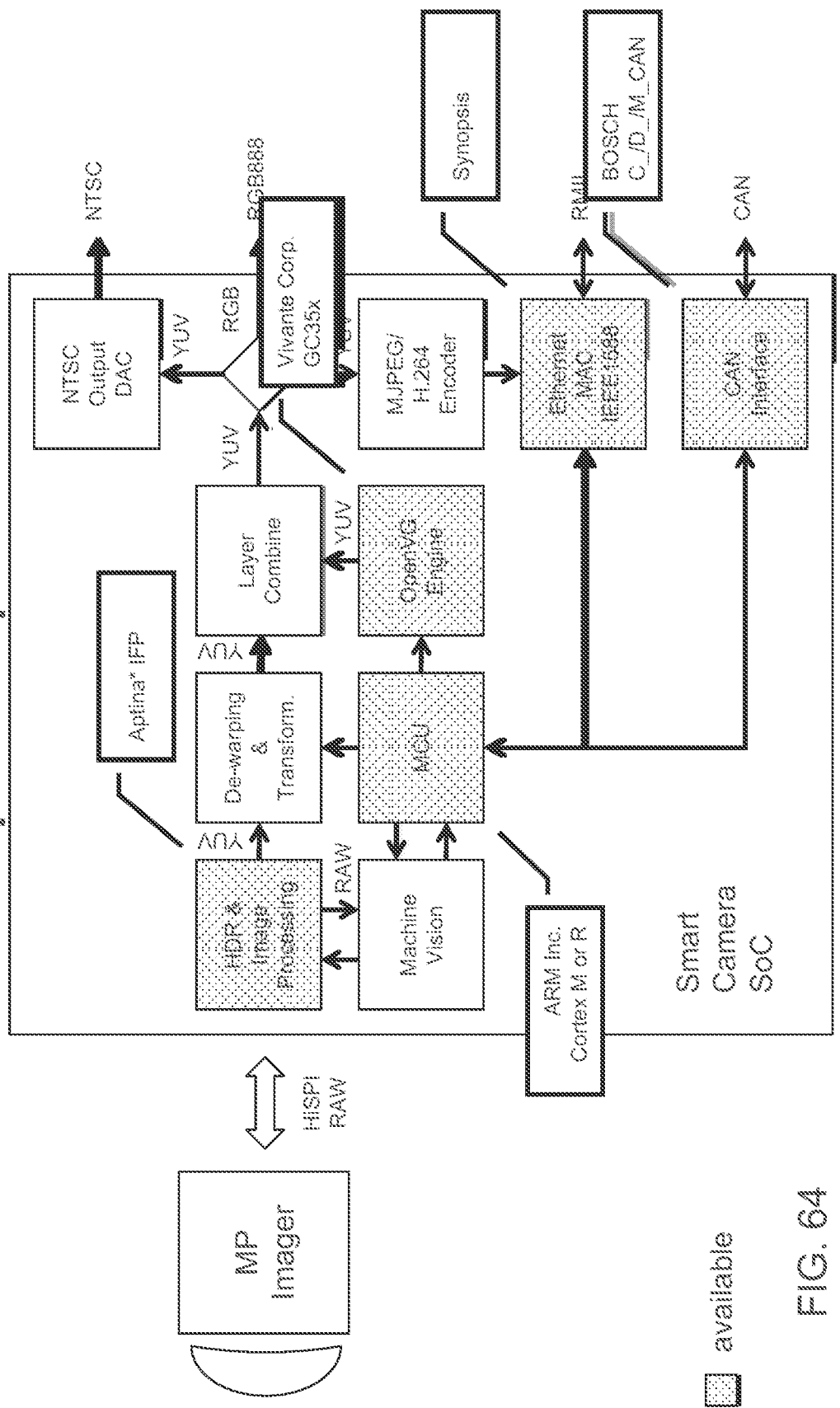
Figure 65:
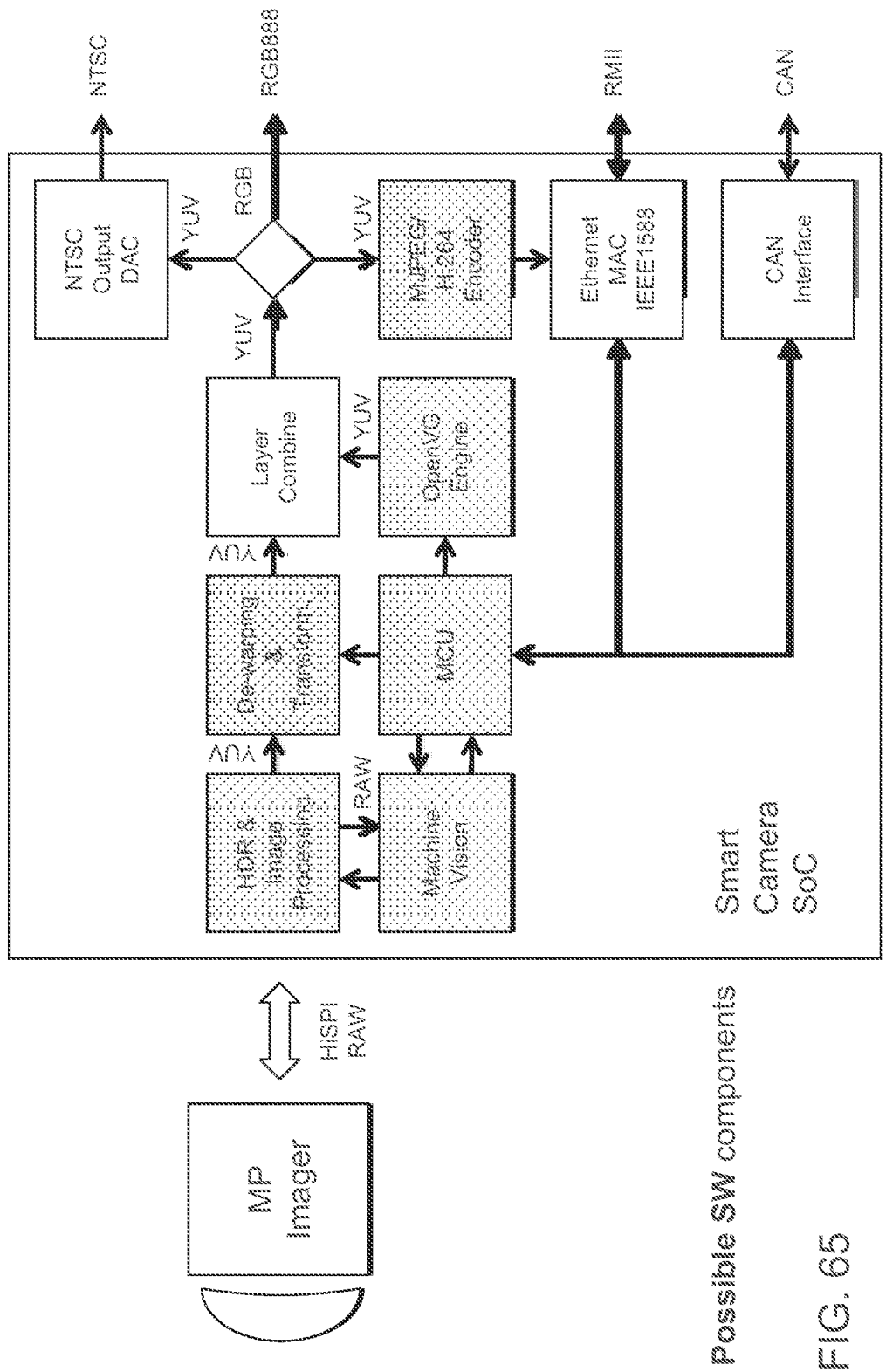

As an additional aspect to the inventive solution, one of the systems described above may supplement or substitute the vehicle inherent rear camera's image input by an attached (aftermarket) non vehicle inherent camera image. An exemplary use case is shown in FIG. 39, where a trailer camera 14a', which is attached to the rear of a trailer 20, and which camera's image is sent to the vehicle vision system or a non-vehicle display and/or communication device (such as a cell phone's display or the like) via wireless communication (such as, for example, via a Bluetooth communication or via a WLAN or NTSC communication or the like). The architecture may be similar to those shown in FIGS. 29B, 29E and 29G-M. In the cases where the vehicle vision system receives the wireless camera image, the vision system is displaying the trailer camera's image as well. The system may switch to use or display the image of the vehicle rear camera 14a, such as for (machine vision) trailer (side) blind spot detection and trailer angle detection. The area where usually the rear camera is placed within top view (mode) may be filled with the image from the wireless camera so as to be seen in the display (FIG. 40). Since the wireless trailer camera 14a' may not be calibrated and some area between the vehicle rear camera 14a and the trailer camera 14a' may not be captured by any camera there may be voids or black bars in the top view images between the areas encompassed by the vehicle inherent cameras and the area encompassed by trailer camera. The trailer camera may be acquired with the trailer, or may be purchased independently (aftermarket) and then attached to the trailer or may be an optional delivery content from the OEM distributer.

Figure 32:
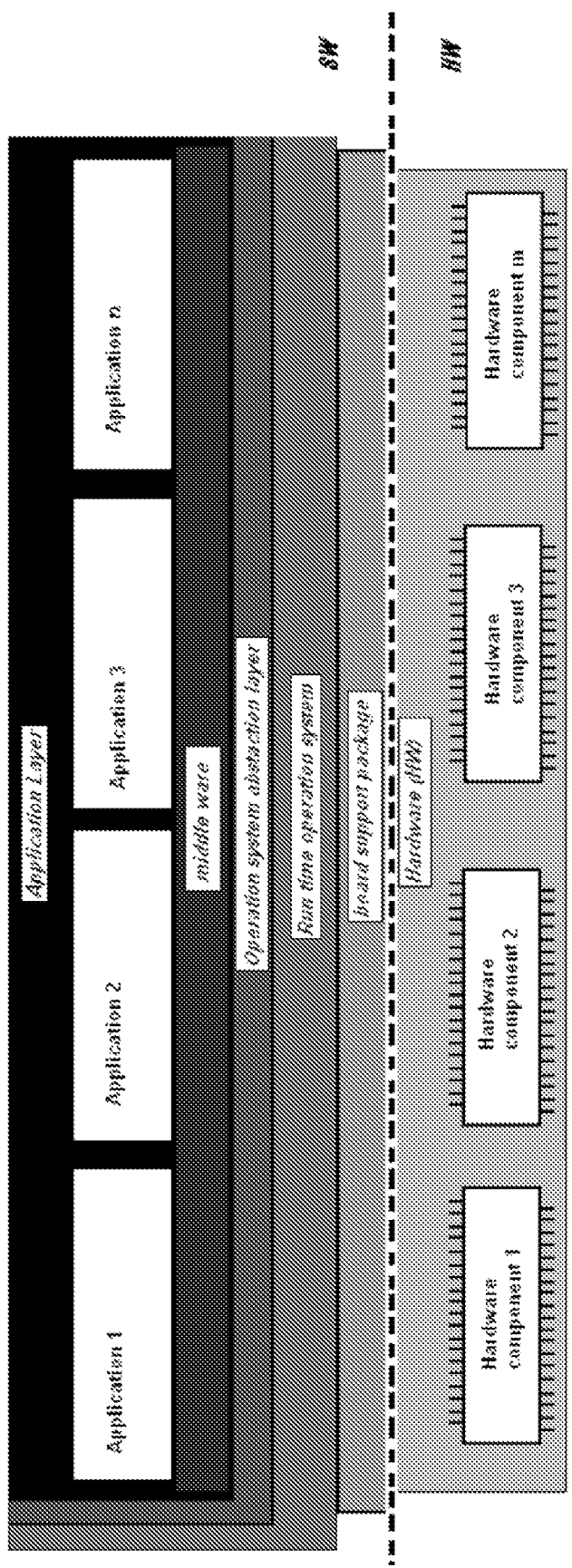
FIG. 32 is a schematic of an automotive vision system of the present invention, where the communication between head units or other display devices and mobile phones may use a layer based model, and such layer based models may be used in the driver assistant and safety vision system's cameras.

(11) Optionally, the system may use layer based models in the communication architecture between head units, actuators, sensors, communication devices, image processing and/or driver assistant devices, and mobile phones, and may use such layer based models in the driver assistant and safety vision system's cameras this might be new (see FIG. 32). The devices may be interconnected by one or more data lines, busses or backbones (see FIG. 29L), or may be interconnected over other devices and or gateways (see FIG. 29M). The proposed model contains an "Application layer" in which the application's semaphores run, a "Middle (soft-) ware" (MW) which adapts to the operation system and provides the communication between the application components, an "Operation System Abstraction Layer" (OSAL) which provides the abstracted base services of the Operation system as like LINUX which has configurable tasks and events and controls the communication behavior. Also, there is a "Run time operation system" (RTOS) which is the operation system itself and the "Board support package" (BSP) which adapts the operation system to the specific hardware.

Figure 33:
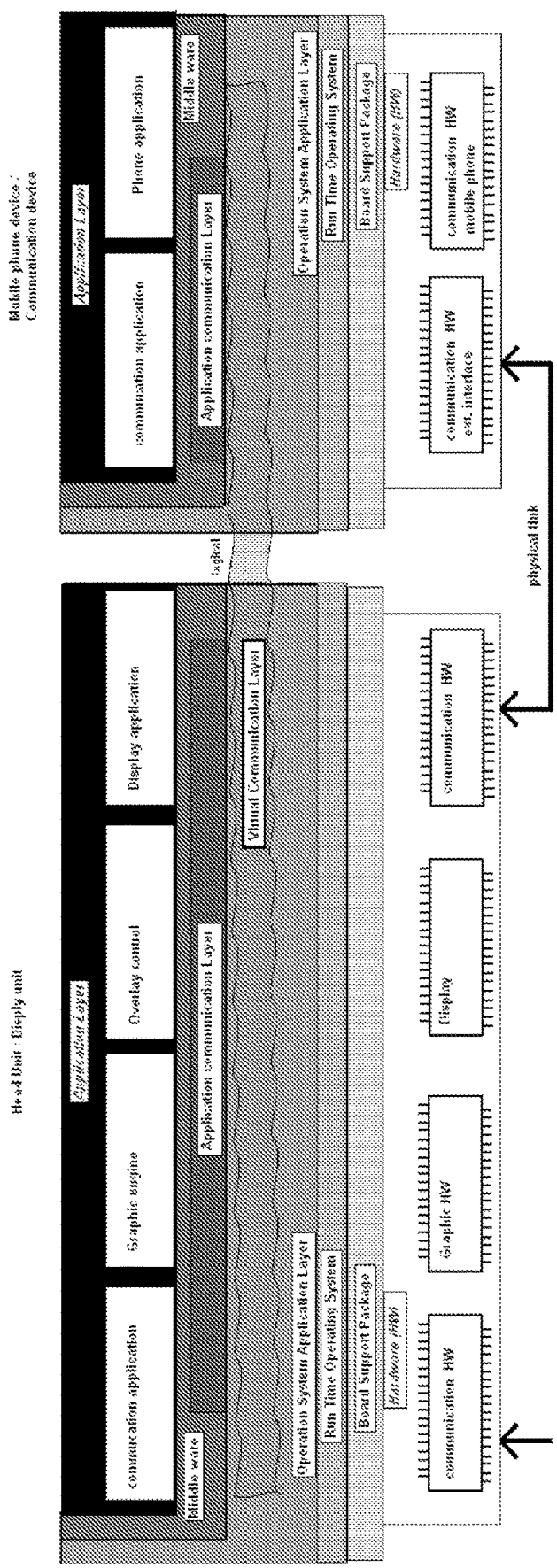
Figure 34:
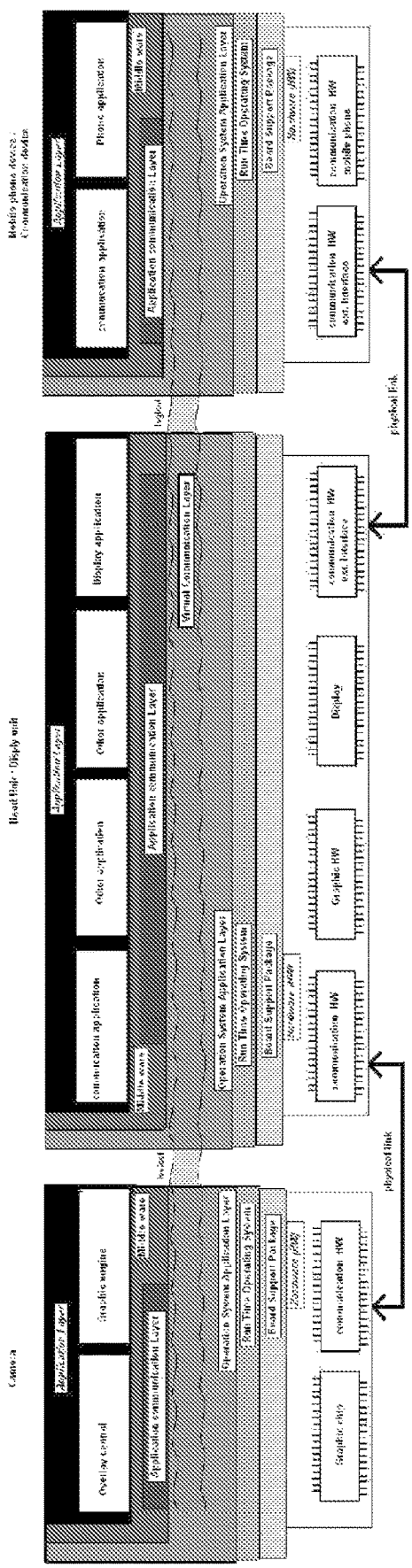
Figure 35:
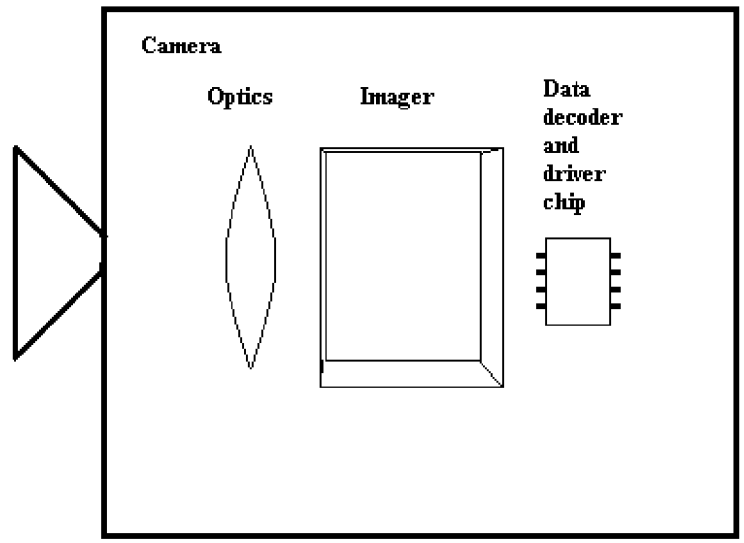
FIG. 35 is a schematic of an automotive vision system that uses data decoders and/or line drivers in automotive vision camera systems, in accordance with the present invention.
Figure 36:
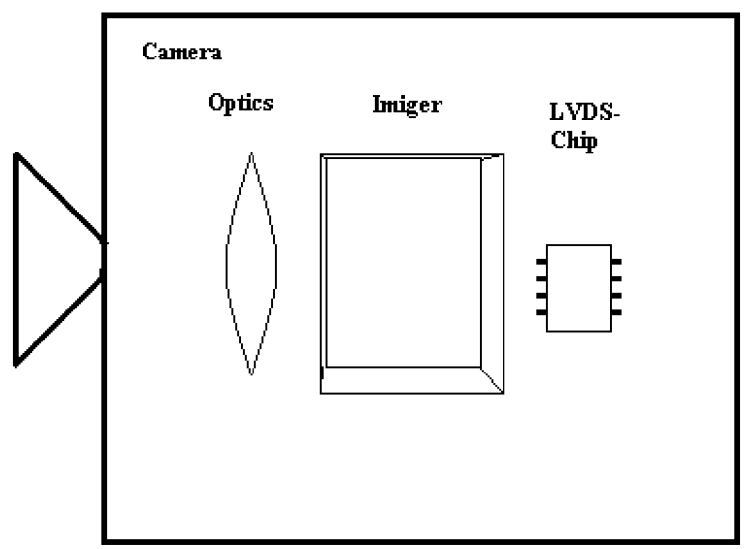
FIG. 36 is a schematic of an automotive vision system that uses LVDS/Ethernet data decoders for driving in automotive vision camera images in accordance with the present invention.
Figure 37:
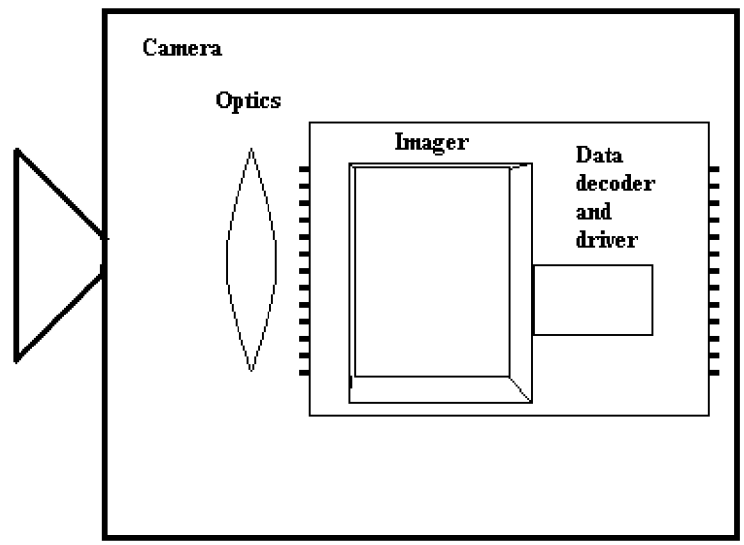
FIG. 37 is a schematic of an automotive vision system according to FIGS. 9 and 10, with the LVDS/Ethernet (or other bus) driver chip sharing one device with the imager, and with the optics comprising a separate component, in accordance with the present invention.
Figure 38:
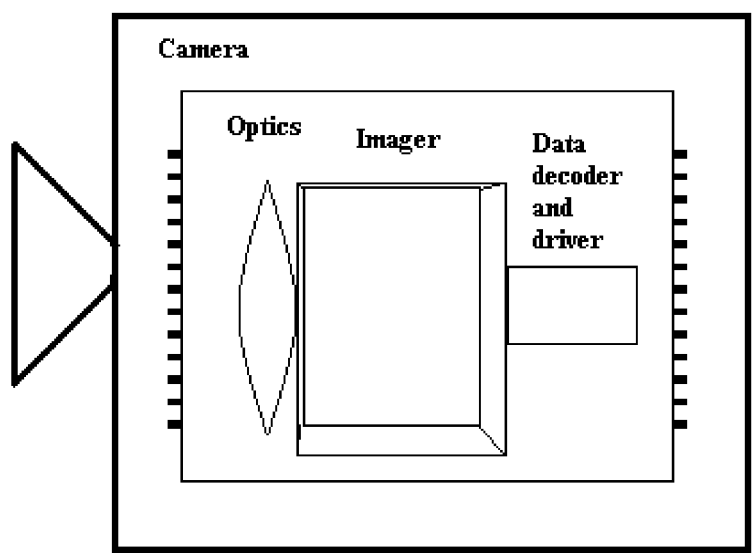
FIG. 38 is a schematic of an automotive vision system according to FIG. 37, with the LVDS/Ethernet (or other bus) driver chip sharing one device with the imager, and with the optics incorporated to the substrate to provide a single compact assembly in accordance with the present invention, and with the so called wafer level cameras incorporating the bus driver, with an optical assembly or lens assembly that may comprise a single optic or lens or multiple optics or lenses.

(12) The present invention provides for DAS systems to establish a virtual communication layer, which expands over several devices having the same layer structure, and is connected via the communication hardware physically. The application communication layer communicates via virtual communication layer to other applications which are located on the same or other devices in a manner as if all applications would be on the local device (see FIGS. 33 and 34). Graphic capturing or processing applications might connect to each other by this. The hardware link may comprise removable ports (mentioned in (7), above), data buses or channels, such as CAN, LIN, LVDS/Ethernet, Bluetooth, NFC (Near Field Communication), and the like.

(13) Using the layer model from (12), above, a continuative idea is to transport data containers (from 7) from one device to the other.

(14) The virtual communication layer may have security tasks as well for doing that.

(15) Over these layers (from (12), above) there may become image data, camera control, parameters from sensors and other devices, driver assistant controls exchanged.

(16) Optionally, and as an alternative to (5), above, the graphic engine (or the image processing) of a mono or multi camera car vision system could be part of the head unit's software in full extend or partially, so a routine which preferably is served in real time may be provided. The processing performance and architecture of the head unit and peripheral interfaces has to be chosen or selected accordingly.

(17) Optionally, and as an alternative solution to (5) and (16), above, the head unit may be conjuncted to or connected to or in communication with a mobile device, such as, for example, a mobile infotainment device or a mobile phone. The graphic engine (or the image processing) may be running as an 'app' (application) on the mobile device and processing camera images which are not taken by the mobile phone's cameras but preferably taken or captured by a fixed mounted car vision camera or cameras, a wireless or wired aftermarket camera or cameras or a USB camera or cameras plugged into any USB port that is part of the car integrated bus architecture or other car based plug in bus.

(18) Optionally, and as an additional feature to (17), above, the app used in the mobile device is certified by according certification boards of governmental organs or (mobile device) companies and/or OEMs.

(19) Optionally, and as an additional feature to (17) or (18), above, the vision system's additional functions (value added) may be provided separate to the camera with the software installed on the head unit or on the app conjuncted to the head unit or from a cloud server or the like.

(20) Optionally, and as an additional solution to (19), above, the software (SW) or app may additionally compute additional parameters, and may consider or take into account various parameters, such as the steering angle of the vehicle or the like. This might be used for processing graphical steering aid overlays to a rear cameras displayed images while backing up the vehicle or for other driver assistant systems overlays.

(21) Optionally, and as an additional solution to (19) or (20), above, the SW (app) may additionally compute or process more than one camera, and also other driver assistant system sources like ultrasound sensors, Radar sensors, infrared or visual cameras, Lidar or Laser sensors.

(22) Optionally, and as an additional solution to (19) to (21), above, the app may not just visualize driver assistant functions, but may also control driving interventions or active warnings, such as haptic alerts or the like, such as, for example, steering wheel vibrations or foot pedal vibrations or the like.

(23) Optionally, and as an additional solution to (19) to (22), above, the app may be adaptable for being updated, debugged, licensed, remote controlled, purchased, sold on 'app-stores' or the like, leased, time limited tried, reimbursed when given back, transferred, and/or the like. Also, the camera or vision system calibration may be running on the app or as an app.

(24) Optionally, and as a consecutive solution to (4), above, the LVDS/Ethernet (or other bus) driver chip may share one device with the imager. Thus, the present invention may provide a nearly monolytic assembly.

(25) Optionally, and as a consecutive solution to (24), above, and instead of having a lens holder as a separate component, the optics of the camera or imager may be incorporated to the compact, monolytic design of the imager device. The lens assembly or optics may comprise one lens or lens optic or optical element, or a plurality of lenses or lens optics, such as many small ones. So called wafer level cameras are state of the art in automotive applications but also incorporating the bus driver is new to such automotive camera applications.

(26) Optionally, any kind of automotive camera including wafer level cameras from (25) above may comprise a tunable liquid (micro-) lens capable to adapt the focal length of the lens. Optionally, the viewing direction may also be tunable by a microelectronic mechanical (MEM) or other mechanical element, either by turning the camera or a mirror that the camera has in its optical path. Such an assembly may be capable to focus on specific details or objects of interest within the field of view to enhance the performance of the object detection of the driver assistant system. Instead of using wide angle cameras (such as like fish eye lens cameras and the like), a focus tunable camera with a generally longer focus band may be used. The full area may be detectable by 'scanning' through all of the extensions of the mechanics' displacement angles. By that the same area as that provided by a fisheye lens may be covered but with the ability to perceive the area much better and evenly. The focus point to objects in the area or field of view may be a degree to determine or at least to estimate the distance between the focused object and the camera's imager (as like the eye of a chameleon does). For example, an exterior viewing camera with a relatively narrow field of view (for example, a horizontal field of view of about 40 degrees) can be mechanically moved rapidly so that its field of view scans or senses or rasters across a wider field of view (for example, a horizontal field of view of about 200 degrees). If this mechanical motion of the principal viewing direction of the subject camera is executed fast enough (for example, if an entire scan can be executed in about 30 ms or lower, video captured by the rastering camera, as displayed to the driver on an in-cabin video screen, will be usable to that driver as the rate of movement of the rastering camera exceeds the rate at which the eye perceives.

Also, if the focus of the camera can be varied, this can be used to estimate or determine distance to an object, such as discussed below. For illustrative purposes, assume that the focus-variable lens has a five meter focal point/length and assume that a person is standing 10 meters away from the subject lens/camera. The image of the person as captured by that camera will be out of focus. Then, as the focal point/length is progressively increased to six meters, then seven meters and then eight meters and then nine meters, the person ten meters away from the camera remains out of focus and comes into focus only when the variable-focus lens is set to have an about ten meter focal point/length. Thus, the distance from the camera can be determined or estimated based on varying the focal point/length of the lens and determining when the imaged object comes into focus in the captured images.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described above and shown in FIGS. 41-65.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, an array of a plurality of photosensor elements arranged in at least 640 columns and 480 rows (at least a 640×480 imaging array), with a respective lens focusing images onto respective portions of the array. The photosensor array may comprise a plurality of photosensor elements arranged in a photosensor array having rows and columns. The logic and control circuit of the imaging sensor may function in any known manner, and the image processing and algorithmic processing may comprise any suitable means for processing the images and/or image data. For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or PCT Application No. PCT/US2010/047256, filed Aug. 31, 2010 and published Mar. 10, 2011 as International Publication No. WO 2011/028686 and/or International Publication No. WO 2010/099416, published Sep. 2, 2010, and/or PCT Application No. PCT/US10/25545, filed Feb. 26, 2010 and published Sep. 2, 2010 as International Publication No. WO 2010/099416, and/or PCT Application No. PCT/US2012/048800, filed Jul. 30, 2012, and published on Feb. 7, 2013 as International Publication No. WO 2013019707, and/or PCT Application No. PCT/US2012/048110, filed Jul. 25, 2012, and published Jan. 31, 2013 as International Publication No. WO 2013016409, and/or PCT Application No. PCT/CA2012/000378, filed Apr. 25, 2012, and published on Nov. 1, 2012 as International Publication No. WO 2012145822, and/or PCT Application No. PCT/US2012/056014, filed Sep. 19, 2012, and published on Mar. 28, 2013 as International Publication No. WO 2013043661, and/or PCT Application No. PCT/US12/57007, filed Sep. 25, 2012, and published on Apr. 4, 2013 as International Publication No. WO 2013/048994, and/or PCT Application No. PCT/US2012/061548, filed Oct. 24, 2012, and published May 2, 2013 as International Publication No. WO 2013063014, and/or PCT Application No. PCT/US2012/062906, filed Nov. 1, 2012, and published May 10, 2013 as International Publication No. WO 2013067083, and/or PCT Application No. PCT/US2012/063520, filed Nov. 5, 2012, and published May 16, 2013 as International Publication No. WO 2013070539, and/or PCT Application No. PCT/US2012/064980, filed Nov. 14, 2012, and published May 23, 2013 as International Publication No. WO 2013074604, and/or U.S. patent application Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published on Jan. 3, 2013 as U.S. Patent Publication No. US-2013-0002873, and/or U.S. provisional applications, Ser. No. 61/710,924, filed Oct. 8, 2012; Ser. No. 61/696,416, filed Sep. 4, 2012; Ser. No. 61/682,995, filed Aug. 14, 2012; Ser. No. 61/682,486, filed Aug. 13, 2012; Ser. No. 61/680,883, filed Aug. 8, 2012; Ser. No. 61/678,375, filed Aug. 1, 2012; Ser. No. 61/676,405, filed Jul. 27, 2012; Ser. No. 61/666,146, filed Jun. 29, 2012; Ser. No. 61/653,665, filed May 31, 2012; Ser. No. 61/653,664, filed May 31, 2012; Ser. No. 61/648,744, filed May 18, 2012; Ser. No. 61/624,507, filed Apr. 16, 2012; Ser. No. 61/616,126, filed Mar. 27, 2012; Ser. No. 61/615,410, filed Mar. 26, 2012; Ser. No. 61/613,651, filed Mar. 21, 2012; Ser. No. 61/607,229, filed Mar. 6, 2012; Ser. No. 61/602,878, filed Feb. 24, 2012; Ser. No. 61/602,876, filed Feb. 24, 2012; Ser. No. 61/600,205, filed Feb. 17, 2012; Ser. No. 61/588,833, filed Jan. 20, 2012; Ser. No. 61/583,381, filed Jan. 5, 2012; Ser. No. 61/570,017, filed Dec. 13, 2011; Ser. No. 61/568,791, filed Dec. 9, 2011; Ser. No. 61/567,446, filed Dec. 6, 2011; and/or Ser. No. 61/567,150, filed Dec. 6, 2011, which are all hereby incorporated herein by reference in their entireties. The system may communicate with other communication systems via any suitable means, such as by utilizing aspects of the systems described in PCT Application No. PCT/US10/038477, filed Jun. 14, 2010, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,123,168; 7,004,606; 6,946,978; 7,038,577; 6,353,392; 6,320,176; 6,313,454 and 6,824,281, and/or International Publication No. WO 2010/099416, published Sep. 2, 2010, and/or PCT Application No. PCT/US10/47256, filed Aug. 31, 2010 and published Mar. 10, 2011 as International Publication No. WO 2011/028686, and/or U.S. patent application Ser. No. 12/508,840, filed Jul. 24, 2009, and published Jan. 28, 2010 as U.S. Pat. Publication No. US 2010-0020170, and/or PCT Application No. PCT/US2012/048110, filed Jul. 25, 2012, and published Jan. 31, 2013 as International Publication No. WO 2013016409, and/or U.S. patent application Ser. No. 13/534,657, filed Jun. 27, 2012, and published Jan. 3, 2013 as U.S. Patent Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent application Ser. No. 12/091,359, filed Apr. 24, 2008 and published Oct. 1, 2009 as U.S. Publication No. US-2009-0244361, and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606 and/or 7,720,580, and/or U.S. patent application Ser. No. 10/534,632, filed May 11, 2005, now U.S. Pat. No. 7,965,336; and/or PCT Application No. PCT/US2008/076022, filed Sep. 11, 2008 and published Mar. 19, 2009 as International Publication No. WO 2009/036176, and/or PCT Application No. PCT/US2008/078700, filed Oct. 3, 2008 and published Apr. 9, 2009 as International Publication No. WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. patent application Ser. No. 10/538,724, filed Jun. 13, 2005 and published Mar. 9, 2006 as U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. patent application Ser. No. 11/226,628, filed Sep. 14, 2005 and published Mar. 23, 2006 as U.S. Publication No. US-2006-0061008, and/or Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. patent application Ser. No. 11/226,628, filed Sep. 14, 2005 and published Mar. 23, 2006 as U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in PCT Application No. PCT/US2011/056295, filed Oct. 14, 2011 and published Apr. 19, 2012 as International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in PCT Application No. PCT/US10/25545, filed Feb. 26, 2010 and published on Sep. 2, 2010 as International Publication No. WO 2010/099416, and/or PCT Application No. PCT/US10/47256, filed Aug. 31, 2010 and published Mar. 10, 2011 as International Publication No. WO 2011/028686, and/or PCT Application No. PCT/US2011/062834, filed Dec. 1, 2011 and published Jun. 7, 2012 as International Publication No. WO 2012/075250, and/or PCT Application No. PCT/US2012/048993, filed Jul. 31, 2012, and published Feb. 7, 2013 as International Publication No. WO 2013019795, and/or PCT Application No. PCT/US11/62755, filed Dec. 1, 2011 and published Jun. 7, 2012 as International Publication No. WO 2012-075250, and/or PCT Application No. PCT/CA2012/000378, filed Apr. 25, 2012, and published Nov. 1, 2012 as International Publication No. WO 2012145822, and/or U.S. patent application Ser. No. 13/333,337, filed Dec. 21, 2011, now U.S. Pat. No. 9,264,672, and/or U.S. provisional applications, Ser. No. 61/615,410, filed Mar. 26, 2012; Ser. No. 61/588,833, filed Jan. 20, 2012; Ser. No. 61/570,017, filed Dec. 13, 2011; and/or Ser. No. 61/568,791, filed Dec. 9, 2011, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. patent application Ser. No. 12/091,525, filed Apr. 25, 2008, now U.S. Pat. No. 7,855,755; Ser. No. 11/226,628, filed Sep. 14, 2005 and published Mar. 23, 2006 as U.S. Publication No. US-2006-0061008; and/or Ser. No. 10/538,724, filed Jun. 13, 2005 and published Mar. 9, 2006 as U.S. Publication No. US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. patent application Ser. No. 10/538,724, filed Jun. 13, 2005 and published Mar. 9, 2006 as U.S. Publication No. US-2006-0050018, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular vision system, said vehicular vision system comprising:
   a plurality of cameras disposed at a vehicle equipped with said vehicular vision system, each viewing exterior of the equipped vehicle;
   said plurality of cameras comprising a forward viewing camera disposed at and viewing at least forward through a windshield of the equipped vehicle, said forward viewing camera comprising an imaging sensor having a plurality of photosensor elements arranged in an array of multiple columns and multiple rows, said forward viewing camera operable to capture image data;
   said plurality of cameras comprising a rear camera disposed at a rear portion of the equipped vehicle, said rear camera comprising an imaging sensor having a plurality of photosensor elements arranged in an array of multiple columns and multiple rows, said rear camera viewing at least rearward of the equipped vehicle and operable to capture image data;
   said forward viewing camera and said rear camera each comprising at least one selected from the group consisting of (i) a respective Low Voltage Differential Signaling (LVDS) chip and (ii) a respective Ethernet chip;
   a control disposed at the equipped vehicle, said control comprising an image processor, wherein said forward viewing camera communicates with said control via a first image data transfer channel, and wherein said rear camera communicates with said control via a second image data transfer channel;
   wherein image data captured by said forward viewing camera is communicated by the first image data transfer channel via a first coaxial cable;
   wherein image data captured by said rear camera is communicated by the second image data transfer channel via a second coaxial cable;
   wherein image data captured by said forward viewing camera and carried to said control by said first coaxial cable is processed at said image processor of said control for object detection;
   wherein said control generates an output provided to a video display device of the equipped vehicle, said video display device comprising a video display screen viewable by a driver of the equipped vehicle; and
   wherein said video display screen displays video images of an area rearward the equipped vehicle derived from image data captured by said rear camera and carried to said control by said second coaxial cable.

2. The vehicular vision system of claim 1, wherein image data captured by at least said rear camera of said plurality of cameras is processed at said image processor of said control to detect an object present rearward of the equipped vehicle.

3. The vehicular vision system of claim 2, wherein, responsive to said processing of captured image data at said image processor of said control, said vehicular vision system determines movement vectors, and wherein, responsive to determination of movement vectors, said vehicular vision system determines that the detected object is an object of interest rearward of the equipped vehicle.

4. The vehicular vision system of claim 2, wherein, responsive at least in part to determining, via processing of captured image data at said image processor of said control, that the detected object is a hazardous object rearward of the equipped vehicle, an alert is provided to the driver of the equipped vehicle.

5. The vehicular vision system of claim 1, wherein said control is operable to process input from at least one selected from the group consisting of an ultrasound sensor, a radar sensor, an infrared sensor and a Lidar sensor.

6. The vehicular vision system of claim 1, wherein said control receives input from at least one non-permanently mounted device.

7. The vehicular vision system of claim 6, wherein at least one selected from the group consisting of (i) said non-permanently mounted device is plugged into a port attached to a bus architecture of the equipped vehicle, (ii) said non-permanently mounted device is wirelessly connected to a bus architecture of the equipped vehicle, (iii) said non-permanently mounted device comprises a mobile phone device and (iv) said non-permanently mounted device comprises a camera.

8. The vehicular vision system of claim 6, wherein said non-permanently mounted device comprises a camera that is wirelessly linked to the equipped vehicle.

9. The vehicular vision system of claim 1, wherein each camera of said plurality of cameras comprises a wafer level camera.

10. The vehicular vision system of claim 1, wherein said control is disposed at a head unit of the equipped vehicle.

11. The vehicular vision system of claim 1, wherein said control comprises a graphic engine.

12. The vehicular vision system of claim 1, wherein said rear camera comprises a rear backup camera of the equipped vehicle.

13. The vehicular vision system of claim 1, wherein said plurality of cameras comprises (i) a driver-side camera disposed at a driver side of the equipped vehicle, said driver-side camera comprising an imaging sensor having a plurality of photosensor elements arranged in an array of multiple columns and multiple rows, said driver-side camera viewing at least sideward of the driver side of the equipped vehicle and operable to capture image data, and wherein said driver-side camera has at least one selected from the group consisting of (i) an LVDS chip and (ii) an Ethernet chip, and wherein said driver-side camera connects with said control via a third coaxial cable, and wherein said third coaxial cable carries control data from said control to said driver-side camera and carries image data captured by said driver-side camera from said driver-side camera to said control, and (ii) a passenger-side camera disposed at a passenger side of the equipped vehicle, said passenger-side camera comprising an imaging sensor having a plurality of photosensor elements arranged in an array of multiple columns and multiple rows, said passenger-side camera viewing at least sideward of the passenger side of the equipped vehicle and operable to capture image data, and wherein said passenger-side camera has at least one selected from the group consisting of (i) an LVDS chip and (ii) an Ethernet chip, and wherein said passenger-side camera connects with said control via a fourth coaxial cable, and wherein said fourth coaxial cable carries control data from said control to said passenger-side camera and carries image data captured by said passenger-side camera from said passenger-side camera to said control.

14. The vehicular vision system of claim 13, wherein said driver-side camera disposed at the driver side of the equipped vehicle is part of a driver-side exterior mirror assembly of the equipped vehicle, and wherein said passenger-side camera disposed at the passenger side of the equipped vehicle is part of a passenger-side exterior mirror assembly of the equipped vehicle.

15. The vehicular vision system of claim 13, wherein said video display screen is operable to display birds-eye view video images derived, at least in part, from image data captured by (i) said rear camera, (ii) said driver-side camera and (iii) said passenger-side camera.

16. The vehicular vision system of claim 13, wherein said plurality of cameras comprises a front camera disposed at a front portion of the equipped vehicle, said front camera comprising an imaging sensor having a plurality of photosensor elements arranged in an array of multiple columns and multiple rows, said front camera viewing at least forward of the equipped vehicle and operable to capture image data, and wherein said front camera connects with said control via a fifth coaxial cable, and wherein said fifth coaxial cable carries control data from said control to said front camera and carries image data captured by said front camera from said front camera to said control.

17. A vehicular vision system, said vehicular vision system comprising:
   a plurality of cameras disposed at a vehicle equipped with said vehicular vision system, each viewing exterior of the equipped vehicle;
   said plurality of cameras comprising a forward viewing camera disposed at and viewing at least forward through a windshield of the equipped vehicle, said forward viewing camera comprising an imaging sensor having a plurality of photosensor elements arranged in an array of multiple columns and multiple rows, said forward viewing camera operable to capture image data;
   said plurality of cameras comprising a rear camera disposed at a rear portion of the equipped vehicle, said rear camera comprising an imaging sensor having a plurality of photosensor elements arranged in an array of multiple columns and multiple rows, said rear camera viewing at least rearward of the equipped vehicle and operable to capture image data, wherein said rear camera comprises a rear backup camera of the equipped vehicle;
   said forward viewing camera and said rear camera each comprising at least one selected from the group consisting of (i) a respective Low Voltage Differential Signaling (LVDS) chip and (ii) a respective Ethernet chip;
   a control disposed at the equipped vehicle, said control comprising an image processor, wherein said forward viewing camera communicates with said control via a first image data transfer channel, and wherein said rear camera communicates with said control via a second image data transfer channel;
   wherein image data captured by said forward viewing camera is communicated by the first image data transfer channel via a first coaxial cable;
   wherein image data captured by said rear camera is communicated by the second image data transfer channel via a second coaxial cable;
   wherein image data captured by said forward viewing camera and carried to said control by said first coaxial cable is processed at said image processor of said control for object detection;
   wherein image data captured by at least said rear camera of said plurality of cameras is processed at said image processor of said control to detect an object present rearward of the equipped vehicle;
   wherein said control is operable to process input from a radar sensor;
   wherein said control generates an output provided to a video display device of the equipped vehicle, said video display device comprising a video display screen viewable by a driver of the equipped vehicle; and
   wherein, during a reversing maneuver of the equipped vehicle, said video display screen displays video images of an area rearward the equipped vehicle derived from image data captured by said rear camera and carried to said control by said second coaxial cable.

18. The vehicular vision system of claim 17, wherein said control determines, via processing of captured image data at said image processor of said control, that the detected object is a hazardous object rearward of the equipped vehicle.

19. The vehicular vision system of claim 18, wherein, responsive at least in part to determination that the detected object is a hazardous object rearward of the equipped vehicle, an alert is provided to the driver of the equipped vehicle.

20. The vehicular vision system of claim 17, wherein said control receives input from at least one non-permanently mounted device, and wherein at least one selected from the group consisting of (i) said non-permanently mounted device is plugged into a port attached to a bus architecture of the equipped vehicle, (ii) said non-permanently mounted device is wirelessly connected to a bus architecture of the equipped vehicle, (iii) said non-permanently mounted device comprises a mobile phone device and (iv) said non-permanently mounted device comprises a camera.

21. A vehicular vision system, said vehicular vision system comprising:
   a plurality of cameras disposed at a vehicle equipped with said vehicular vision system, each viewing exterior of the equipped vehicle;
   said plurality of cameras comprising a forward viewing camera disposed at and viewing at least forward through a windshield of the equipped vehicle, said forward viewing camera comprising an imaging sensor having a plurality of photosensor elements arranged in an array of multiple columns and multiple rows, said forward viewing camera operable to capture image data;
   said plurality of cameras comprising a rear camera disposed at a rear portion of the equipped vehicle, said rear camera comprising an imaging sensor having a plurality of photosensor elements arranged in an array of multiple columns and multiple rows, said rear camera viewing at least rearward of the equipped vehicle and operable to capture image data;
   said plurality of cameras comprising a driver-side camera disposed at a driver side of the equipped vehicle, said driver-side camera comprising an imaging sensor having a plurality of photosensor elements arranged in an array of multiple columns and multiple rows, said driver-side camera viewing at least sideward of the driver side of the equipped vehicle and operable to capture image data;
   said plurality of cameras comprising a passenger-side camera disposed at a passenger side of the equipped vehicle, said passenger-side camera comprising an imaging sensor having a plurality of photosensor elements arranged in an array of multiple columns and multiple rows, said passenger-side camera viewing at least sideward of the passenger side of the equipped vehicle and operable to capture image data;
   said plurality of cameras comprising a front camera disposed at a front portion of the equipped vehicle, said front camera comprising an imaging sensor having a plurality of photosensor elements arranged in an array of multiple columns and multiple rows, said front camera viewing at least forward of the equipped vehicle and operable to capture image data;

each camera of said plurality of cameras comprising at least one selected from the group consisting of (i) a respective Low Voltage Differential Signaling (LVDS) chip and (ii) a respective Ethernet chip;

a control disposed at the equipped vehicle, said control comprising an image processor, wherein said forward viewing camera communicates with said control via a first image data transfer channel, and wherein said rear camera communicates with said control via a second image data transfer channel, and wherein said driver-side camera communicates with said control via a third image data transfer channel, and wherein said passenger-side camera communicates with said control via a fourth image data transfer channel, and wherein said front camera communicates with said control via a fifth image data transfer channel;

wherein image data captured by said forward viewing camera is communicated by the first image data transfer channel via a first coaxial cable;

wherein image data captured by said rear camera is communicated by the second image data transfer channel via a second coaxial cable;

wherein image data captured by said driver-side camera is communicated by the third image data transfer channel via a third coaxial cable;

wherein image data captured by said passenger-side camera is communicated by the fourth image data transfer channel via a fourth coaxial cable;

wherein image data captured by said front camera is communicated by the fifth image data transfer channel via a fifth coaxial cable;

wherein image data captured by said forward viewing camera and carried to said control by said first coaxial cable is processed at said image processor of said control for object detection;

wherein said control generates an output provided to a video display device of the equipped vehicle, said video display device comprising a video display screen viewable by a driver of the equipped vehicle; and wherein said video display screen displays birds-eye view video images derived, at least in part, from (i) image data captured by said rear camera and carried to said control by said second coaxial cable, (ii) image data captured by said driver-side camera and carried to said control by said third coaxial cable, (iii) image data captured by said passenger-side camera and carried to said control by said fourth coaxial cable and (iv) image data captured by said front camera and carried to said control by said fifth coaxial cable.

22. The vehicular vision system of claim 21, wherein image data captured by at least said rear camera of said plurality of cameras is processed at said image processor of said control to detect an object present rearward of the equipped vehicle.

23. The vehicular vision system of claim 22, wherein, responsive at least in part to determining, via processing of captured image data at said image processor of said control, that the detected object comprises a hazardous object rearward of the equipped vehicle, an alert is provided to the driver of the equipped vehicle.

24. The vehicular vision system of claim 21, wherein said driver-side camera disposed at the driver side of the equipped vehicle is part of a driver-side exterior mirror assembly of the equipped vehicle, and wherein said passenger-side camera disposed at the passenger side of the equipped vehicle is part of a passenger-side exterior mirror assembly of the equipped vehicle.

* * * * *